(12) United States Patent
Roy et al.

(10) Patent No.: US 11,122,587 B2
(45) Date of Patent: Sep. 14, 2021

(54) APPARATUS AND METHODS FOR SCHEDULING RESOURCES IN MESH NETWORKS

(71) Applicant: InterDigital Patent Holdings, Inc., Wilmington, DE (US)

(72) Inventors: Arnab Roy, East Norriton, PA (US); Yugeswar Deenoo, King of Prussia, PA (US); Ravikumar V. Pragada, Collegeville, PA (US); Onur Sahin, Brooklyn, NY (US); Philip J. Pietraski, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 13 days.

(21) Appl. No.: 14/766,075

(22) PCT Filed: Feb. 7, 2014

(86) PCT No.: PCT/US2014/015295
§ 371 (c)(1),
(2) Date: Aug. 5, 2015

(87) PCT Pub. No.: WO2014/124251
PCT Pub. Date: Aug. 14, 2014

(65) Prior Publication Data
US 2016/0029403 A1 Jan. 28, 2016

Related U.S. Application Data

(60) Provisional application No. 61/761,852, filed on Feb. 7, 2013, provisional application No. 61/874,704, filed on Sep. 6, 2013.

(51) Int. Cl.
*H04W 72/12* (2009.01)
*H04W 72/04* (2009.01)
(Continued)

(52) U.S. Cl.
CPC ....... *H04W 72/1226* (2013.01); *H04W 16/28* (2013.01); *H04W 28/0278* (2013.01);
(Continued)

(58) Field of Classification Search
CPC ... H04B 7/2643; H04L 47/10; H04W 72/0406
See application file for complete search history.

(56) References Cited

U.S. PATENT DOCUMENTS 8,989,169 B2* 3/2015 Kwon .................. H04L 1/0004
370/344
9,225,062 B2* 12/2015 Trainin .................... H01Q 3/26
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
(Continued)

*Primary Examiner* — Jae Y Lee
*Assistant Examiner* — Chuong M Nguyen
(74) *Attorney, Agent, or Firm* — Volpe Koenig

(57) ABSTRACT

Methods and apparatuses are described herein that facilitate mesh network communication by a millimeter wave base stations (mBs) or WTRUs as nodes of a directional mesh network with other nodes of the directional mesh network. The mB or WTRU may include a directional antenna configured to transmit and receive signals in specific directions during the mesh network communication to define a directional mesh network. The mBs or WTRUs may transmit transmission request messages to neighbor nodes, wherein the transmission request messages include transmission slot allocation bitmaps and channel quality indicator information (CQI). Then response messages from the neighbor nodes may be received, wherein the response messages
(Continued)

include receive slot allocation bitmaps and resource allocation decisions. The mBs or WTRUs may then update their transmission slot allocation bitmaps based on the received response messages and transmit data packets in specific directions based on the updated transmission slot allocation bitmap.

14 Claims, 39 Drawing Sheets

(51) Int. Cl.
*H04W 16/28* (2009.01)
*H04W 28/02* (2009.01)
*H04W 84/18* (2009.01)
*H04W 88/08* (2009.01)

(52) U.S. Cl.
CPC ... *H04W 72/0406* (2013.01); *H04W 72/0446* (2013.01); *H04W 84/18* (2013.01); *H04W 88/08* (2013.01)

(56) References Cited

U.S. PATENT DOCUMENTS

| | | | |
|---|---|---|---|
| 2006/0223573 A1* | 10/2006 | Jalali | H04W 36/0055 |
| | | | 455/552.1 |
| 2007/0274320 A1 | 11/2007 | Joshi et al. | |
| 2008/0064386 A1 | 3/2008 | Nibe | |
| 2008/0112371 A1* | 5/2008 | Joshi | H04W 74/02 |
| | | | 370/337 |
| 2009/0154407 A1* | 6/2009 | Jeong | H04W 48/08 |
| | | | 370/329 |
| 2009/0232109 A1 | 9/2009 | Nandagopalan et al. | |
| 2009/0316807 A1* | 12/2009 | Kim | H04L 1/0606 |
| | | | 375/260 |
| 2010/0034159 A1 | 2/2010 | Shin et al. | |
| 2010/0097967 A1* | 4/2010 | Kwon | H04L 1/1614 |
| | | | 370/310 |
| 2010/0322187 A1 | 12/2010 | Tani et al. | |
| 2011/0080898 A1* | 4/2011 | Cordeiro | H04W 72/0446 |
| | | | 370/338 |
| 2011/0149924 A1* | 6/2011 | Trainin | H04W 72/1252 |
| | | | 370/337 |
| 2011/0244908 A1* | 10/2011 | Morioka | H04W 72/1263 |
| | | | 455/509 |
| 2012/0082109 A1 | 4/2012 | Hong et al. | |
| 2013/0053079 A1* | 2/2013 | Kwun | H04J 11/0053 |
| | | | 455/509 |
| 2013/0121178 A1* | 5/2013 | Mainaud | H04W 40/12 |
| | | | 370/252 |
| 2014/0334368 A1* | 11/2014 | Zhou | H04W 48/10 |
| | | | 370/311 |
| 2015/0230170 A1* | 8/2015 | Jeong | H04L 5/0053 |
| | | | 370/311 |
| 2016/0021581 A1* | 1/2016 | Deenoo | H04W 36/0055 |
| | | | 370/331 |

OTHER PUBLICATIONS

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 28, 2012).

IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension, IEEE Std 802.15.3c-2009 (Oct. 12, 2009).

WirelessHD, "WirelessHD Specification Version 1.1 Overview," (May 2010).

* cited by examiner

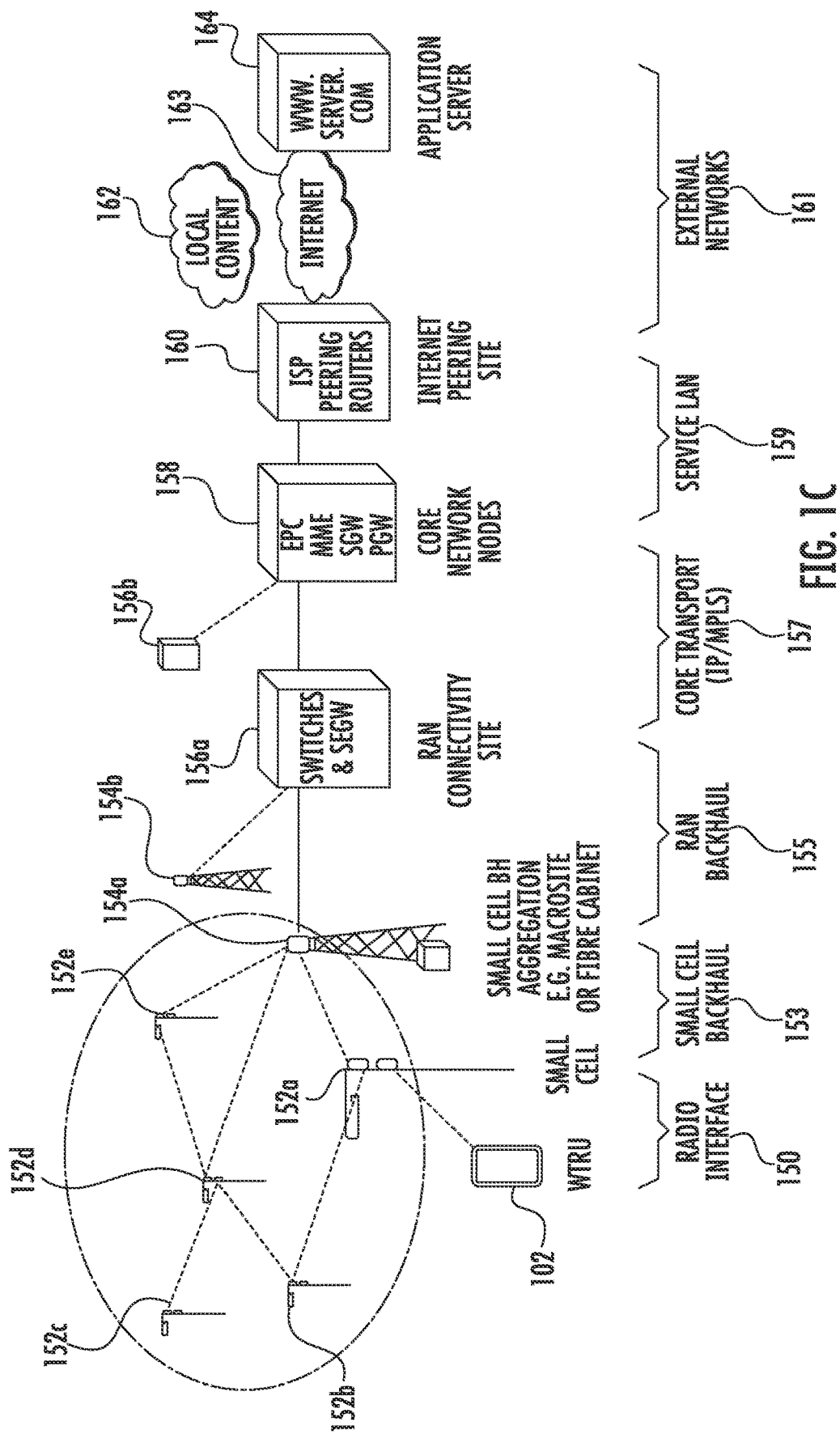

TO FIG. 28B

APPARATUS AND METHODS FOR SCHEDULING RESOURCES IN MESH NETWORKS

CROSS REFERENCE TO RELATED APPLICATIONS

This application claims the benefit of U.S. Provisional Application Ser. No. 61/761,852 filed Feb. 7, 2013 and U.S. Provisional Application Ser. No. 61/874,704 filed Sep. 6, 2013, the contents of which are hereby incorporated by reference.

BACKGROUND

The ultra high frequency band (e.g., 300 MHz to 3 GHz) and the extremely high frequency band (e.g., 30 GHz to 300 GHz) may be referred to as the millimeter wave (mmW) frequencies. As such, the mmW frequencies provide a huge amount of spectrum. The 60 GHz unlicensed spectrum, alone, is about 7 GHz (depending on the country). And there is potentially much more mmW spectrum that may become available either as licensed, lightly licensed or unlicensed spectrum.

In order to close the link budget for mmWs, highly directional antennas may be useful. There is a synergetic effect that may be exploited at higher frequencies that is not possible below sub-6 GHz. In particular, there is the potential of much greater spatial reuse. The higher gain antennas, when used for mmW communications, may have the associated benefit of greater directionality, which may reduce the interference seen by unintended receivers. At mmW frequencies, large carrier bandwidths may be achieved with comparatively low fractional bandwidths. This may enable single radio solutions capable of addressing a large amount of spectrum. Utilizing mmW frequencies may also lead to lower power consumption because of high directional antennas and by trading bandwidth for power (Shannon's law).

There may be, however, many challenges associated with using mmW frequencies. The mmW carriers have near optical properties with high penetration losses, high reflection losses, and little diffraction, which may lead to Line-Of-Sight (LOS) dominated coverage. Millimeter wave frequencies may also be subject to a host of propagation challenges, especially high oxygen absorption concern for the 60 GHz band.

SUMMARY

Methods and apparatuses are described herein that facilitate mesh network communication by a millimeter wave base stations (mBs) or WTRUs as nodes of a directional mesh network with other nodes of the directional mesh network. The mB or WTRU may include a directional antenna configured to transmit and receive signals in specific directions during the mesh network communication to define a directional mesh network. The mBs or WTRUs may transmit transmission request messages to neighbor nodes, wherein the transmission request messages include transmission slot allocation bitmaps and channel quality indicator information (CQI). Then response messages from the neighbor nodes may be received, wherein the response messages include receive slot allocation bitmaps and resource allocation decisions. The mBs or WTRUs may then update their transmission slot allocation bitmaps based on the received response messages and transmit data packets in specific directions based on the updated transmission slot allocation bitmap.

BRIEF DESCRIPTION OF THE DRAWINGS

A more detailed understanding may be had from the following description, given by way of example in conjunction with the accompanying drawings wherein:

FIG. 1C is a system diagram of a small cell backhaul in an end-to-end mobile network infrastructure used within the communications system illustrated in FIG. 1A;

DETAILED DESCRIPTION

Figure 1A:
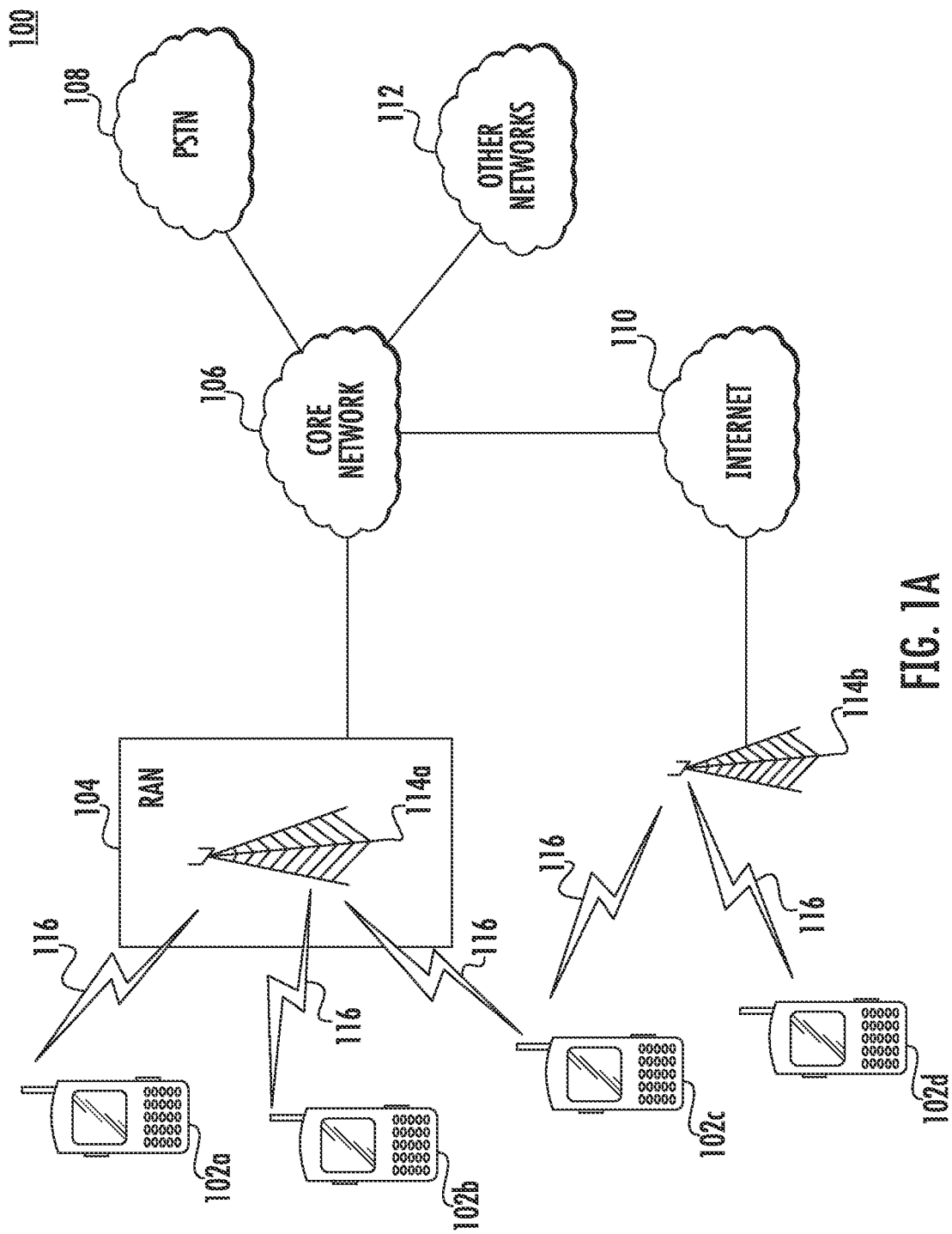
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
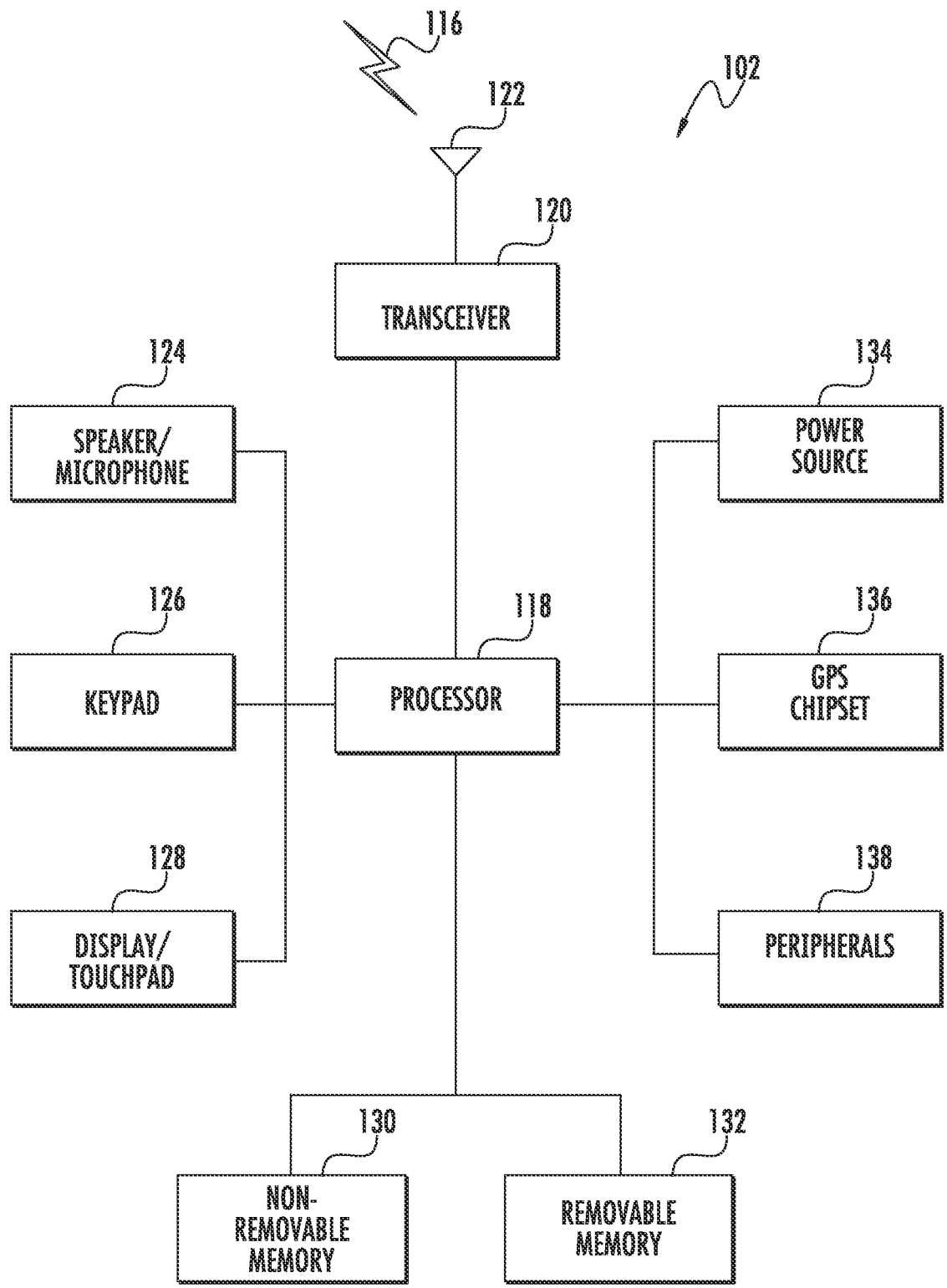
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of a small cell backhaul in an end-to-end mobile network infrastructure according to an embodiment. A set of small cell (SC) nodes 152a, 152b, 152c, 152d, and 152e and aggregation points 154a and 154b interconnected via directional millimeter wave (mmW) wireless links may comprise a "directional-mesh" network and provide backhaul connectivity. For example, the WTRU 102 may connect via the radio interface 150 to the small cell backhaul 153 via small cell node 152a and aggregation point 154a. In this example, the aggregation point 154a provides the WTRU 102 access via the RAN backhaul 155 to a RAN connectivity site 156a. The WTRU 102 therefore then has access to the core network nodes 158 and 156b via the core transport 157 and to an internet service provider (ISP) 160 via the service LAN 159. The WTRU also has access to external networks 161 including but not limited to local content 162, the Internet 163, and application server 164. It should be noted that for purposes of example, the number of SC nodes is five; however, any number of nodes may be included in the set of SC nodes.

Figure 1D:
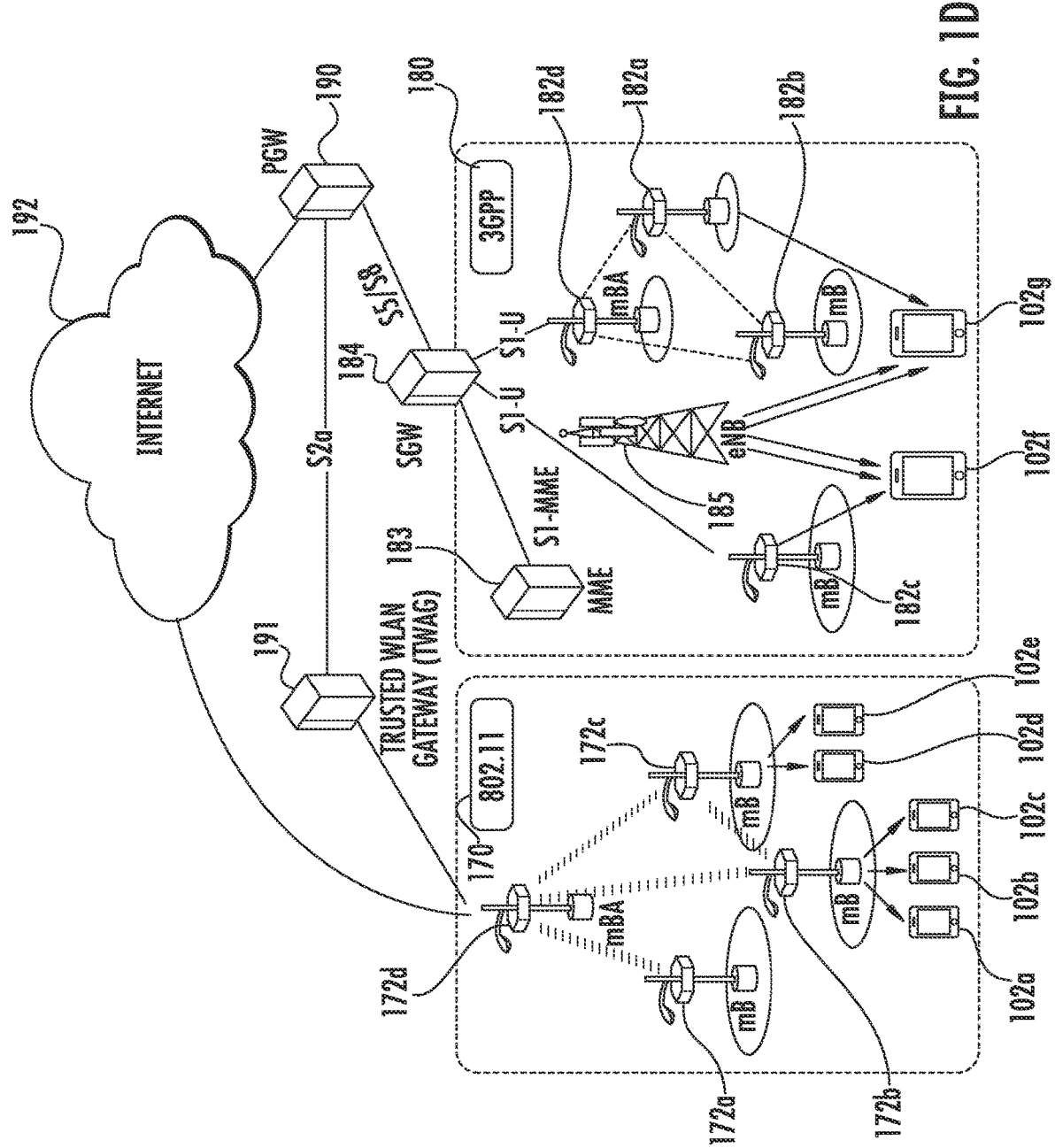
FIG. 1D is a system diagram of a mmW backhaul applied to both a 3GPP cellular network and a non-3GPP network access infrastructure according to an embodiment.

FIG. 1D is a system diagram of a mmW backhaul applied to both a 3GPP cellular network and a non-3GPP network access infrastructure according to an embodiment. In this example, the non-3GPP network is IEEE 802.11 based. The WTRUs 102a, 102b, 102c, 102d, and 102e may have access via millimeter wave base stations (mBs) 172a, 172b, and 172c in an 802.11 network 170 to a millimeter wave base station aggregator (mBA) 172d. The mBA 172d may provide access to external networks such as the Internet 192, and to the cellular network via a trusted WLAN gateway (TWAG) 191.

Also, in this example, WTRU 102f in the 3GPP network 180 may have access via mBs 182a and 182c to a mobility management entity (MME) 183 and a serving gateway (SGW) 184, which may provide access to public data network gateway (PGW) 190 and the Internet 192.

WTRUs 102f and 102g may also have access via mBs 182a and 182b via mBA 182d to SGW 184, which may provide access to public data network gateway (PGW) 190 and the Internet 192.

WTRUs 102f and 102g may also have access via an evolved Node B (eNB) 185 to the MME 183 and SGW 184, which may provide access to the public data network gateway (PGW) 190 and the Internet 192.

As shown in the examples of FIG. 1C and FIG. 1D, wireless mesh networks (WMNs) operating at mmW frequencies may be used, for example, to serve as backhaul networks for cellular or WLAN SCs such as those based on, for example, LTE or IEEE 802.11. An mmW directional mesh network may be an economical solution to provide backhaul connectivity to several cheaply deployed SCs. Directional links using highly directional antennas may be used to close the link budget at mmW frequencies. A directional mesh network may also provide a flexible topology by requiring Line-Of-Sight (LOS) with only immediate neighbors. A directional mesh network may provide easy scalability in that new nodes may be added with minimal network planning. A directional mesh network may provide robustness in redundancy provided by multiple connectivity paths between mesh-nodes.

Wireless communication at mmW frequencies may allow for use of high gain antennas due to small wavelengths. This may enable transmitted power to be concentrated in the direction of the intended receiver, which may, in turn, use directional antennas for reception as well. This spatial containment of the signals may not only allow longer communication ranges but may also allow multiple spatially separated transceivers to operate simultaneously in sharing the medium. On the other hand, traditional multi-hop mesh networks may generally be limited in throughput due to channel access constraints resulting from omni-directional transmission. Therefore, the resulting network throughput of a directional mesh network may potentially be much larger due to efficient spatial reuse.

A directional mesh network may be configured with fully distributed scheduled, multi-hop, and time division multiple access (TDMA) based directional mesh medium access control (MAC) features to ensure fast scheduling and short queue times. A fully-scheduled distributed MAC architecture designed for a directional multi-hop mesh network is described herein along with associated transmission scheduling procedures. In the example distributed architecture, each node may be responsible for local radio resource allocations. The MAC architectures described herein may address the need for a reliable, high throughput, and low latency WMN. The MAC configurations may be compatible with any routing or path-selection and forwarding protocols based on link-state or distance vector principles. Additionally, the MAC layer may reside on top of a physical (PHY) layer derived from any of the present or evolving mmW standards for unlicensed frequency bands, such as IEEE 802.11ad, IEEE 802.11aj, IEEE 802.15.3c, WiGig, or WirelessHD or future directional communication standards for licensed spectrum.

A fully distributed, synchronized, directional TDMA Medium Access Control (MAC) layer and scheduling functions may be configured to be independent of the lower PHY layer functions as well as routing or path-selection procedures. Path-selection or routing procedures may determine a path taken by data packets from a source node to a destination node while traversing the mesh network. The MAC designs described herein may also be made to be compatible with any path-selection protocol. A distributed scheduling function may determine a transmission schedule for each node and may distribute it to its neighbors. This distributed scheduling function may be designed to schedule resources and to be interference and traffic aware. Completely scheduled transmissions may be accomplished by dividing the available time into a control or scheduling period, wherein scheduling decisions may be exchanged between nodes and followed by a data transmission period.

The MAC examples for implementing a directional mesh network may differ from an omni-directional mesh, such as an IEEE 802.11s based network in several ways. While IEEE 802.11s assumes that each node communicates with every other node within communication range, a directional mesh network may be designed for directional communications. With a fully scheduled TDMA MAC structure, a directional mesh network may be significantly different than the contention based channel access mechanisms associated with IEEE 802.11s without severely constraining system throughput.

Example MAC frame structures may include three major components: device discovery intervals during which new nodes may be discovered by mesh nodes, scheduling intervals when time allocations for subsequent data packet transmissions are exchanged between nodes, and data transmission intervals. A device discovery interval may include a beacon transmission interval (BTI) during which the mesh nodes transmit multiple beacon frames in different directions to enable new nodes to discover network presence. In addition to BTIs, some periods within the device discovery interval may be left vacant for reception and may be designated as beacon response intervals (BRIs) that allow new nodes to respond back to nodes already communicating in the mesh network.

Due to directional transmissions, neighboring nodes may simultaneously align their transmit and receive beams appropriately for successful data transmission and reception. A schedule for this may be previously established between the communicating nodes. This may be accomplished, for example, via a short schedule/control period when each mesh node exchanges the schedule for subsequent data transfer with each of its neighbors. The scheduling interval may be divided into several time slots, and each node may use one scheduling time slot to communicate with a neighboring node. The order of transmissions in the schedule transmission interval may generally be a function of network topology. For the order to be known to all nodes, the schedule time slot order may be locally determined each time a node joins the mesh network.

The MAC layer that facilitates mesh communications may be configured such that each node is capable of granting portions of its receive data transmission interval to neighbor nodes to transmit data to it. This decision may be based on factors such as link and path metrics, individual buffer occupancy status, and others. The specific metrics and the exchange mechanisms may be determined by the chosen path selection and forwarding protocols. The actual transmission time allocations by the receiver for each neighbor may also depend on previously allocated transmissions for the neighbors. The time split and actual time allocations by the receiver based on inputs from its neighbors may be performed in various manners.

As used in the embodiments described herein, the terms slot and time slot may be used interchangeably.

As used in the embodiments described herein, the terms control slot, schedule slot, control/schedule slot, and schedule/control slot may be used interchangeably.

As used in the embodiments described herein, the terms control period, schedule period, schedule/control period, control/schedule period, control region, schedule region, schedule/control region, control/schedule region, control schedule transmission interval, control interval, schedule interval, and control schedule interval may be used interchangeably.

As used in the embodiments described herein, the terms data period, and data region may be used interchangeably.

Any of the methods described herein may be implemented in a WTRU, base station, or mB.

With respect to device discovery intervals, the MAC layer that facilitates the mesh communications may be configured such that each mesh node transmits beacon frames in multiple directions to enable new nodes to discover the network. These transmissions may occur in the BTI during a device discovery period. The mesh nodes may listen in multiple directions during the BRI to receive responses from new nodes wishing to join the mesh. Examples of scheduling options for the BTI and BRI are described below.

Figure 2:
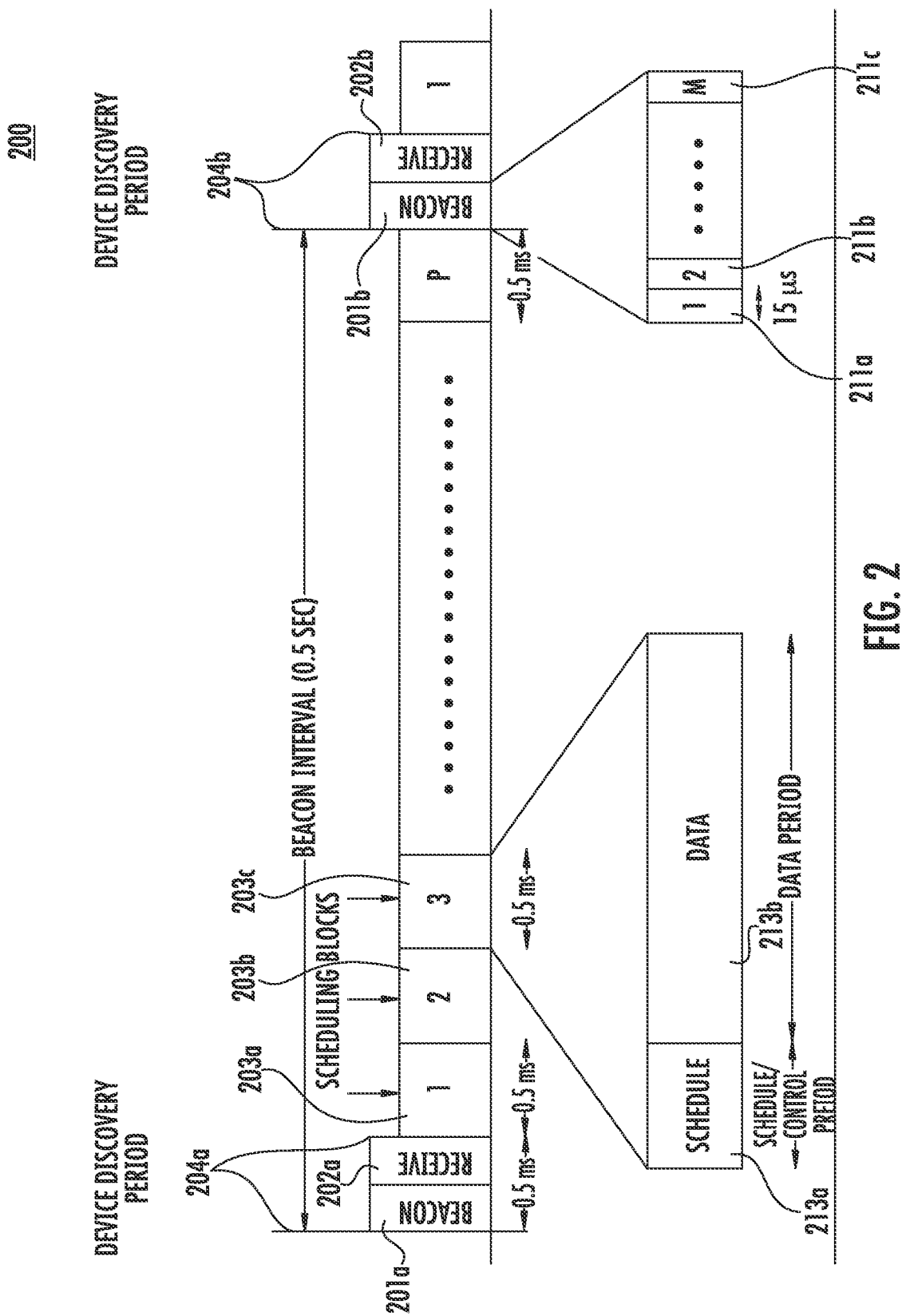
FIG. 2 is a diagram of an example medium access control (MAC) frame structure for an example schedule for beacon transmission intervals (BTIs) and beacon response intervals (BRIs)

FIG. 2 is a diagram of an example MAC frame structure 200 for an example schedule for BTIs and BRIs. In the example illustrated in FIG. 2, the BRIs 202*a* and 202*b* may immediately follow BTIs 201*a* and 201*b* respectively within the same device discovery period (DDP) 204*a* and 204*b* respectively. As shown in this example, BTI 201*b* may include a plurality of directional beacons 211*a*, 211*b* to 211*c*. This may allow a new node receiving one of the directional beacons to immediately respond during BRI 202*b* and start the association process. Also, shown are a plurality of scheduling blocks 203*a*, 203*b*, and 203*c*.

A scheduling block may include a schedule/control period 213*a* and a data period 213*b* that serves as a data transmission or reception interval. The schedule/control period may be used for scheduling data transmissions between mesh nodes in a next or other subsequent data transmission interval.

Figure 3:
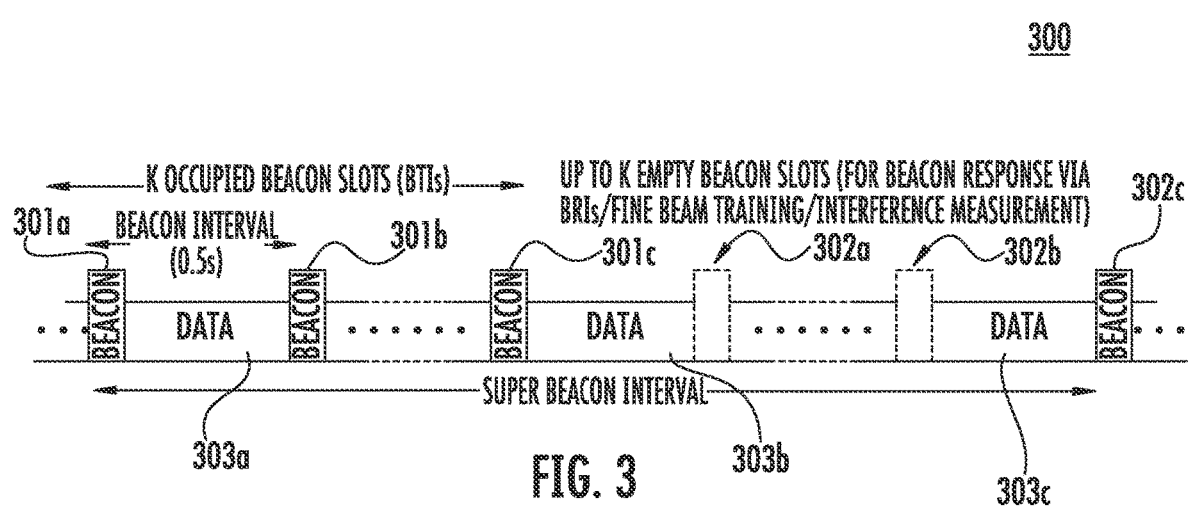
FIG. 3 is a diagram of another example schedule for BTIs and BRIs.

FIG. 3 is a diagram of another example schedule for BTIs and BRIs 300. In the example illustrated in FIG. 3, the BTI may occupy an entire DDP, and there may be several consecutive BTIs wherein beacons 301*a*, 301*b*, and 301*c* are transmitted. This period may then be followed by one or more vacant DDPs 302*a* and 302*b* wherein a node may respond to a beacon via BRIs in separate the DDPs. This may then be followed by additional BTIs wherein for example a beacon 302*c* may be transmitted. As shown in this example, data 303*a*, 303*b*, and 303*c* may be transmitted and received during each beacon interval. The example illustrated in FIG. 3 allows a new node to scan multiple directions for beacons and then respond during one of the BRIs in the direction of the strongest beacon reception. Further, in the example illustrated in FIG. 3, each of the vacant DDPs may be used for other purposes that may interfere with regular data transmissions, such as fine beam training or interference measurements.

FIG. 3 is for exemplary purposes and may be adapted to other scheduling arrangements. For example, another scheduling option may involve alternating BTI and BRI slots within a DDP. Here, the mesh node may transmit a directional beacon followed by a listening period in the same direction before transmitting another beacon in a new direction.

With respect to schedule/control intervals, the MAC layer that facilitates the mesh communications may be configured such that schedule/control periods are divided into P slots, where P is not less than the maximum permitted node connectivity. This over-provisioning may ensure that a new node joining a highly connected mesh may still find orthogonal scheduling slots corresponding to each of its neighbors. Instead of choosing a fixed number for the whole mesh, the number of slots in the schedule transmission interval may be variable, starting with a small number and increasing as new nodes join the network.

As aforementioned the schedule/control period may be used for scheduling data transmissions between mesh nodes in a next or other subsequent data transmission interval. As such, there are generally two primary steps for successful data transmissions: resource allocation (i.e. scheduling resources) and transmission schedule determination. Various implementation examples may be based on the choice of resource allocation and schedule determination procedures.

For example, in multi-neighbor resource allocation, each transmitting or receiving node may determine an appropriate allocation (i.e. split) of its transmission and reception resources among its neighbors. This decision may be based on an exchange of traffic information between corresponding nodes. One method for accomplishing this decision may be for each node to transmit its grant requests to each of its neighbors based on the occupancy of its internal buffers.

Such a request may include individual buffer information for different traffic categories, thereby enabling quality of service (QoS) aware resource allocation. Then each node may determine an appropriate allocation of its reception time based on all received grant requests. In one example, these decisions may be explicitly signaled to the transmitting nodes before moving to the transmission schedule determination. In another example, the resource allocation decisions may not be conveyed to the neighboring nodes but may instead be used for scheduling decisions in the transmission schedule determination upon receipt of previously scheduled transmissions from the neighbors.

In one example of multi-neighbor transmission schedule determination, after determining the appropriate allocation of transmission resources, each node determines transmission schedules for each of its neighbors and conveys the decision to them. This may be done sequentially for each neighbor so that the previously scheduled transmissions for each neighbor may be considered before a new transmission schedule determination by the receiver. This may be accomplished by exchanging transmit bitmaps between the mesh network nodes. A transmit bitmap may be sent by the transmitter of one mesh node to the receiver of another mesh node that contains information about the transmitting node's transmission availability. This may include information about previously scheduled transmissions with other mesh nodes, enabling the receiving mesh node to avoid those periods for transmission scheduling with the transmitting node.

Alternatively or additionally, the transmission schedule determination may be accomplished via transmission of receive bitmaps from the intended receiving mesh nodes to the transmitting mesh nodes. In such an example, prior resource allocation decisions may be explicitly signaled to the transmitting nodes.

Figure 4A:
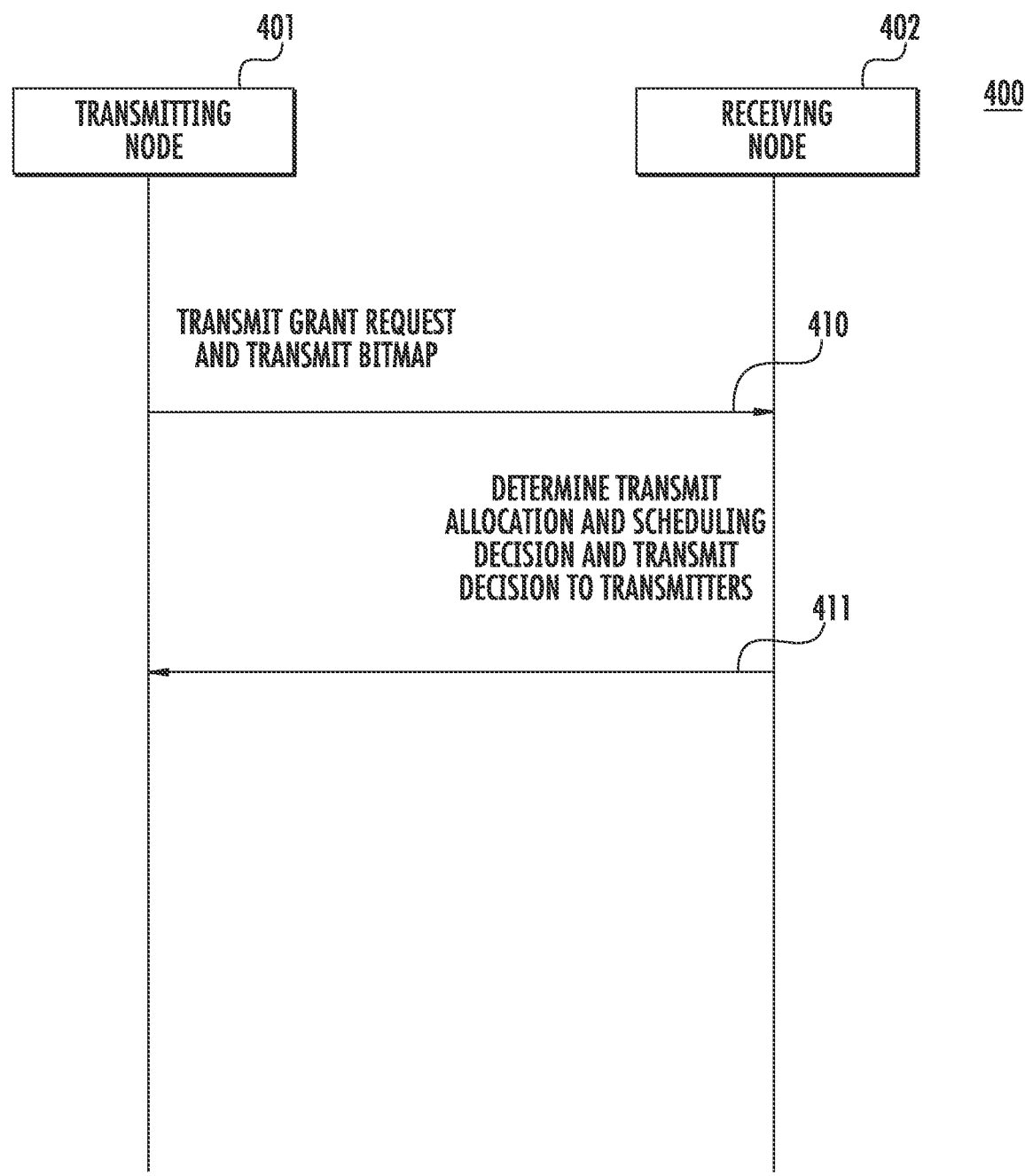
FIG. 4A is a signal flow diagram of an example a two-step procedure for one-phase scheduling in accordance with an embodiment.

FIG. 4A is a signal flow diagram of an example a two-step procedure for one-phase scheduling 400 in accordance with an embodiment, which may be used in combination with any of the embodiments described herein. In an example of a one phase resource allocation and scheduling procedure, transmission of individual buffer status and resource allocation is performed simultaneously for each link such that grant requests and allocations may be performed in a single step for each neighbor, and each neighbor may be considered sequentially.

In one-phase scheduling it may be possible that neighbor nodes that are scheduled later within the schedule/control period may be starved of transmission resources due to over-allocation to neighbors that have earlier scheduling slots. Relying on historical resource allocation information for each neighbor may alleviate this problem, although it may not be sufficient when incoming traffic is extremely sporadic or bursty in nature. However, the leftover traffic from a scheduling block may be accommodated in the following scheduling interval, and this may be thought of as an additional scheduling delay of one scheduling interval at each node. Moreover, by always prioritizing low latency traffic, the problems associated with this approach may be overcome for most cases.

In such an example, each transmitting node 401 transmits its grant request and transmit bitmap 410 (i.e. transmit a request message) together to each receiving node 402. Based on the combined information, the receiving node 402 may determine a transmit allocation determination and a scheduling decision and may transmit the scheduling decision to the respective transmitter 411 (i.e. transmit a response message).

Figure 4B:
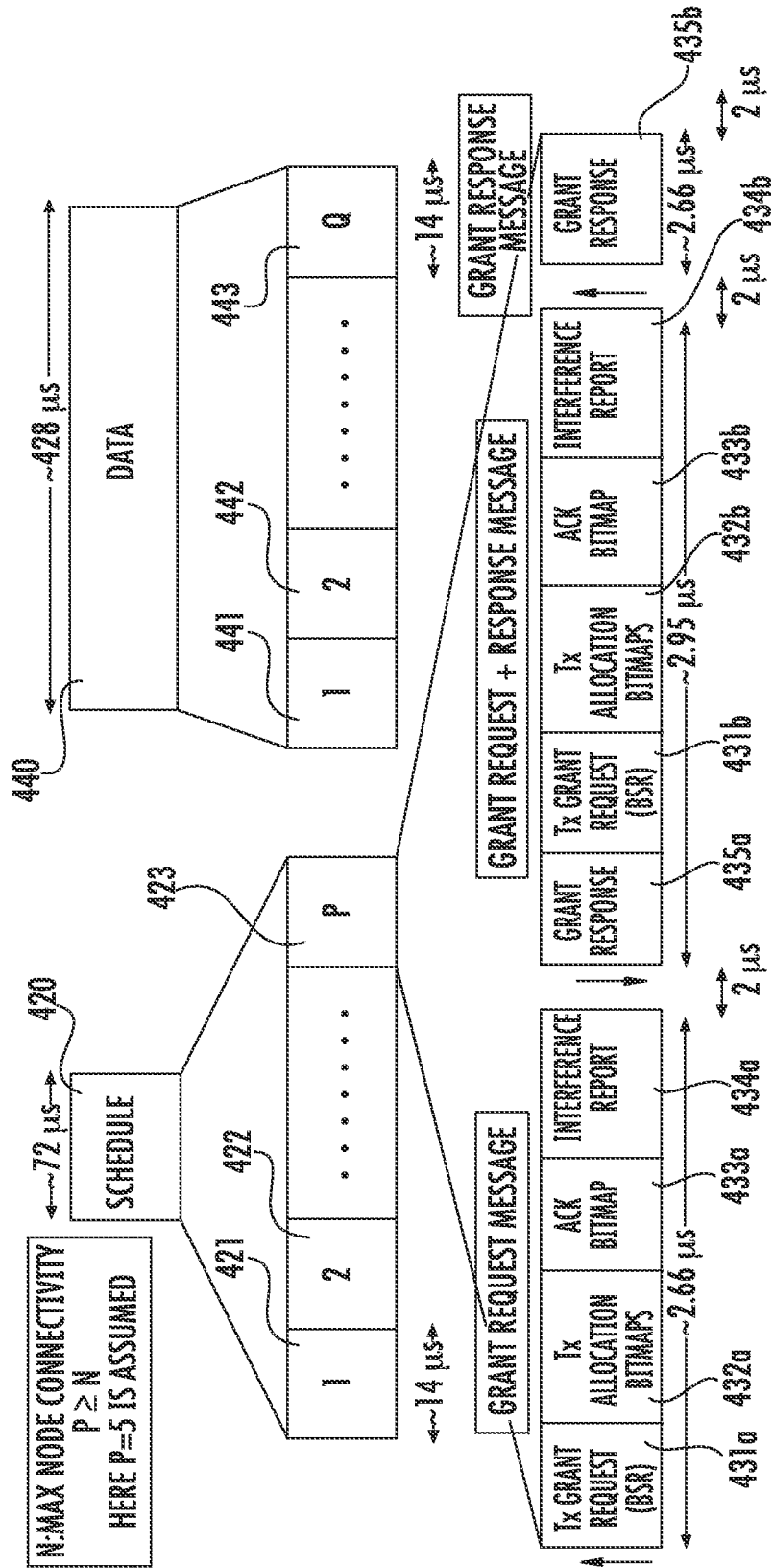
FIG. 4B is a diagram of an example frame format for one phase resource allocation and scheduling.

FIG. 4B is a diagram of an example frame format for one phase resource allocation and scheduling. The contents of the frames exchanged during the schedule period are also shown. During each of these slots, each node forming a link may exchange its transmit requirements and channel occupancy status with the other node. The other node may assign a transmission schedule to the first node and, in turn, send its transmit request and channel occupancy information. The transmission allocation may be communicated in the final frame transmission in the slot. Preceding the transmission of data 440, each schedule message 420 may include a plurality of slots 421, 422, and 423. Each slot in a schedule message may have the following elements: a transmit grant request (buffer status reports (BSR)) 431a with QoS-specific queue sizes intended for the addressed receiver, a transmit allocation bitmap 432a indicating previously allocated and unallocated data slots, an acknowledgement bitmap 433a wherein each bit corresponds to a MAC protocol data unit (MPDU) transmitted during a previous scheduling interval requiring acknowledgement, an interference report 434a with data slot allocations for interfering nodes, and a grant response 435a with data slot allocations during a current scheduling interval.

Transmission exchanges between neighboring first and second nodes of a link of the mesh network that have been assigned slot P are also illustrated in the example frame format of FIG. 4B. In this example, the first node sends its transmit grant request (BSR) 431a, transmit allocation bitmap 432a, acknowledge bitmap 433a, and interference report 434a to the second node of the link. The first node may then receive the second node's grant response 435a along with the second node's transmit grant request (BSR) 431b, transmit allocation bitmap 432b, acknowledgement bitmap 433b, and interference report 434b. In response, the first node may send its grant response 435b to the second node of the link.

During the data 440 interval, the network nodes may transmit data packets to their neighbors in a slot from a plurality of slots 441, 442, and 443 according to the schedule established during the previous schedule/control period. The interval may be divided into slots for ease of addressability during transmission scheduling, and each node may be allotted one or more slots in each scheduling interval according to resource allocation and scheduling decisions by the receiving node.

Figure 5A:
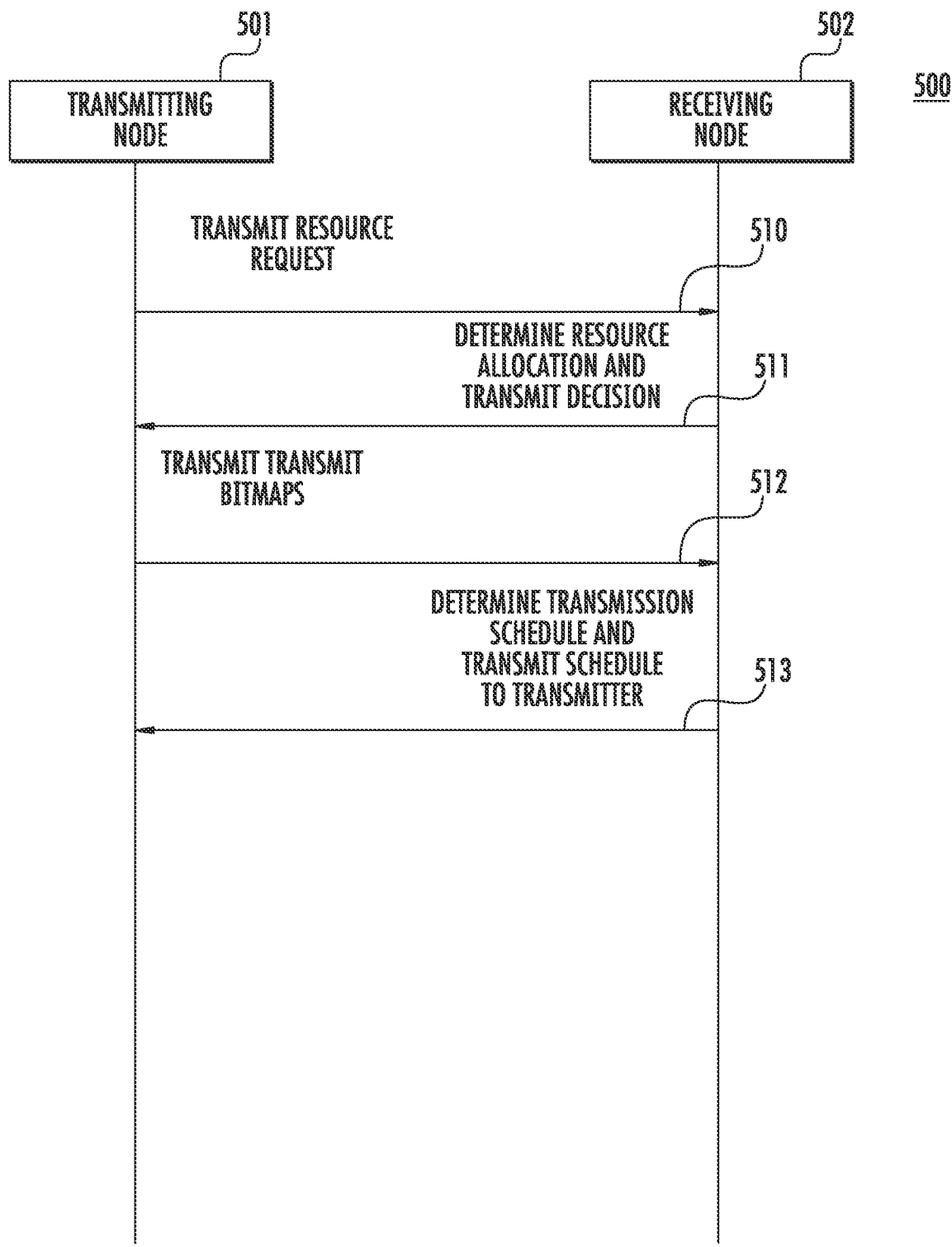
FIG. 5A is a signal flow diagram of an example four-step procedure 500 for two phase resource allocation and scheduling using transmit bitmaps.

FIG. 5A is a signal flow diagram of an example four-step procedure 500 for two phase resource allocation and scheduling using transmit bitmaps. In such an example, each transmitting node 501 transmits its grant request 510 to the intended receiving node 502. The receiving node 502 may determine a resource allocation decision and transmit the decision 511 to the transmitting node 501. The transmitting node 501 may then transmit their transmit bitmaps 512 to each receiving node 502 in the appropriate control slot. The receiving node 502 may then determine the transmission schedule and transmit the schedule 513 to the transmitting nodes 501.

Figure 5B:
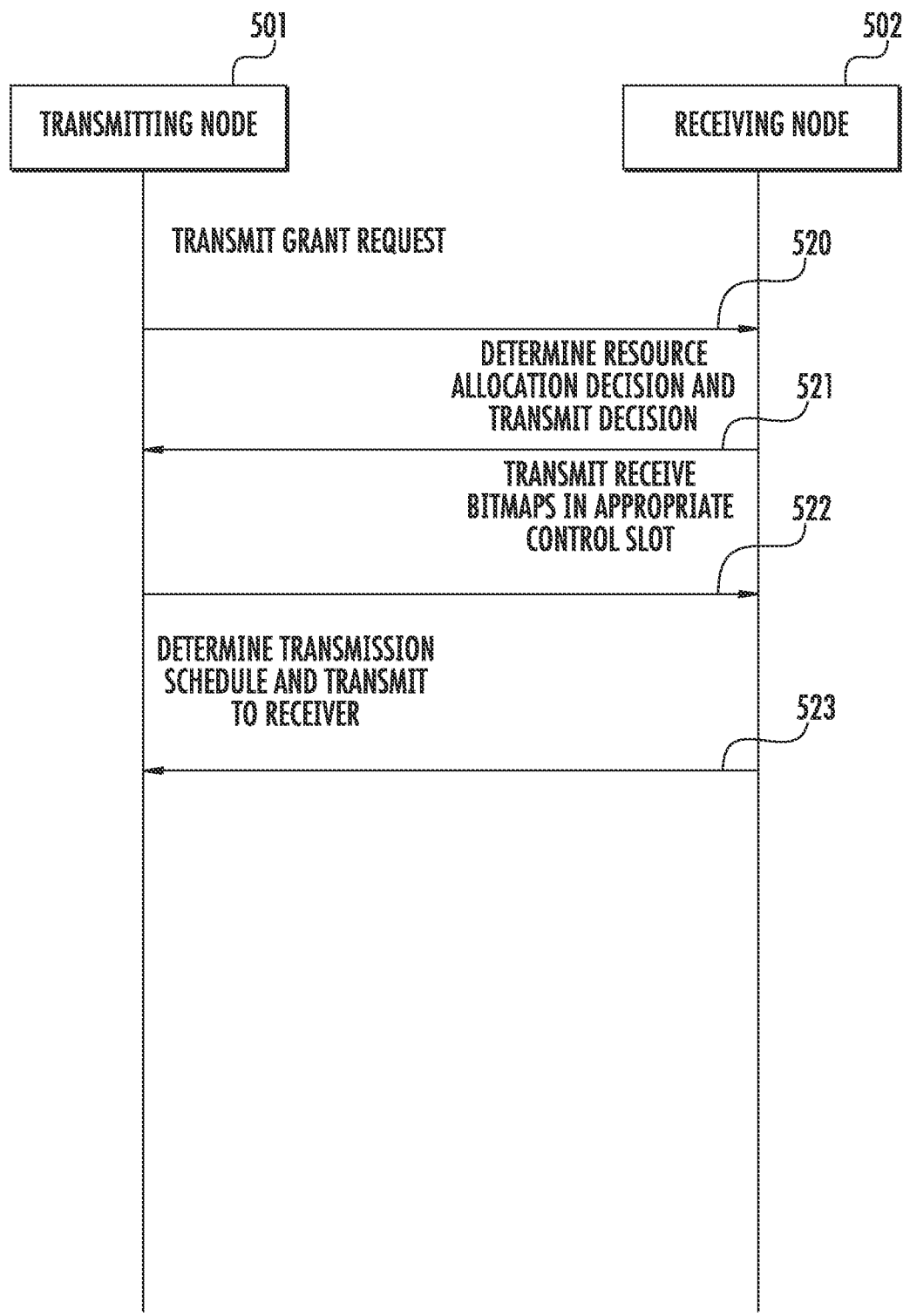
FIG. 5B is a signal flow diagram of another example four-step procedure for two phase resource allocation and scheduling using receive bitmaps.

FIG. 5B is a signal flow diagram of another example four-step procedure for two phase resource allocation and scheduling using receive bitmaps. In such example, each transmitting node 501 transmits its grant request 520 to the intended receiving node 502. The receiving node 502 may determine a resource allocation decision and transmit the decision 521 to the transmitting node 501. Then the receiving node 502 may transmit their receive bitmaps in the appropriate control slot 522 to each transmitter. The transmitting node 501 may then determine the transmit schedule and transmit it 523 to the receiving node.

Figure 5C:
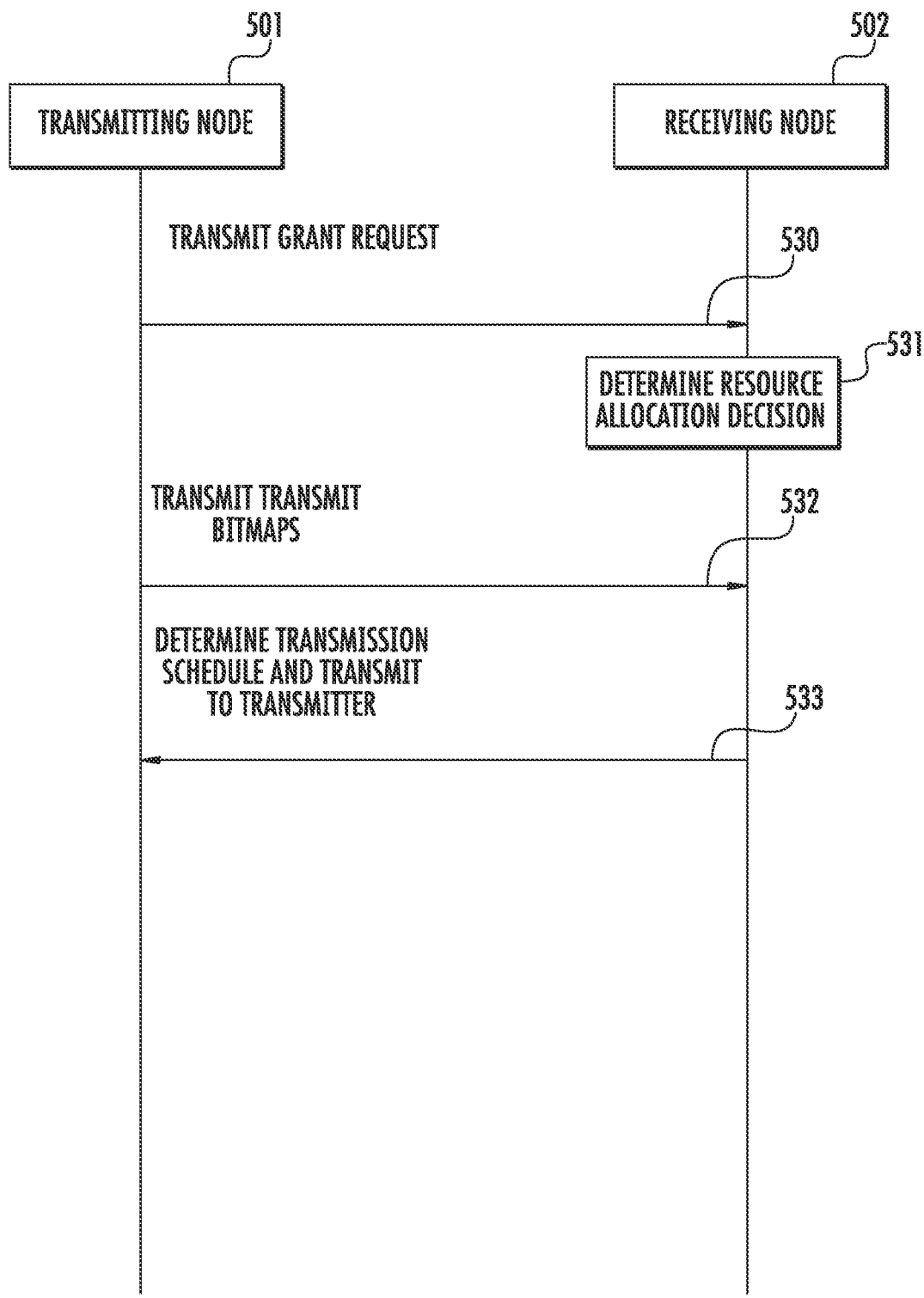
FIG. 5C is a signal flow diagram of an example three-step procedure for two phase resource allocation and scheduling.

FIG. 5C is a signal flow diagram of an example three-step procedure for two phase resource allocation and scheduling. In such example, each transmitting node 501 transmits its grant request 530 to the intended receiving node 502. The receiving node 502 may determine a resource allocation decision 531 but may not convey it to the transmitting nodes. The transmitting nodes 501 may then transmit their transmit bitmaps 532 to each receiving node 502 in the appropriate control slot. The receiving node 502 may then use the received transmit bitmap and previously computed resource allocation to determine the transmit schedule and may transmit it to the transmitter 533.

Figure 5D:
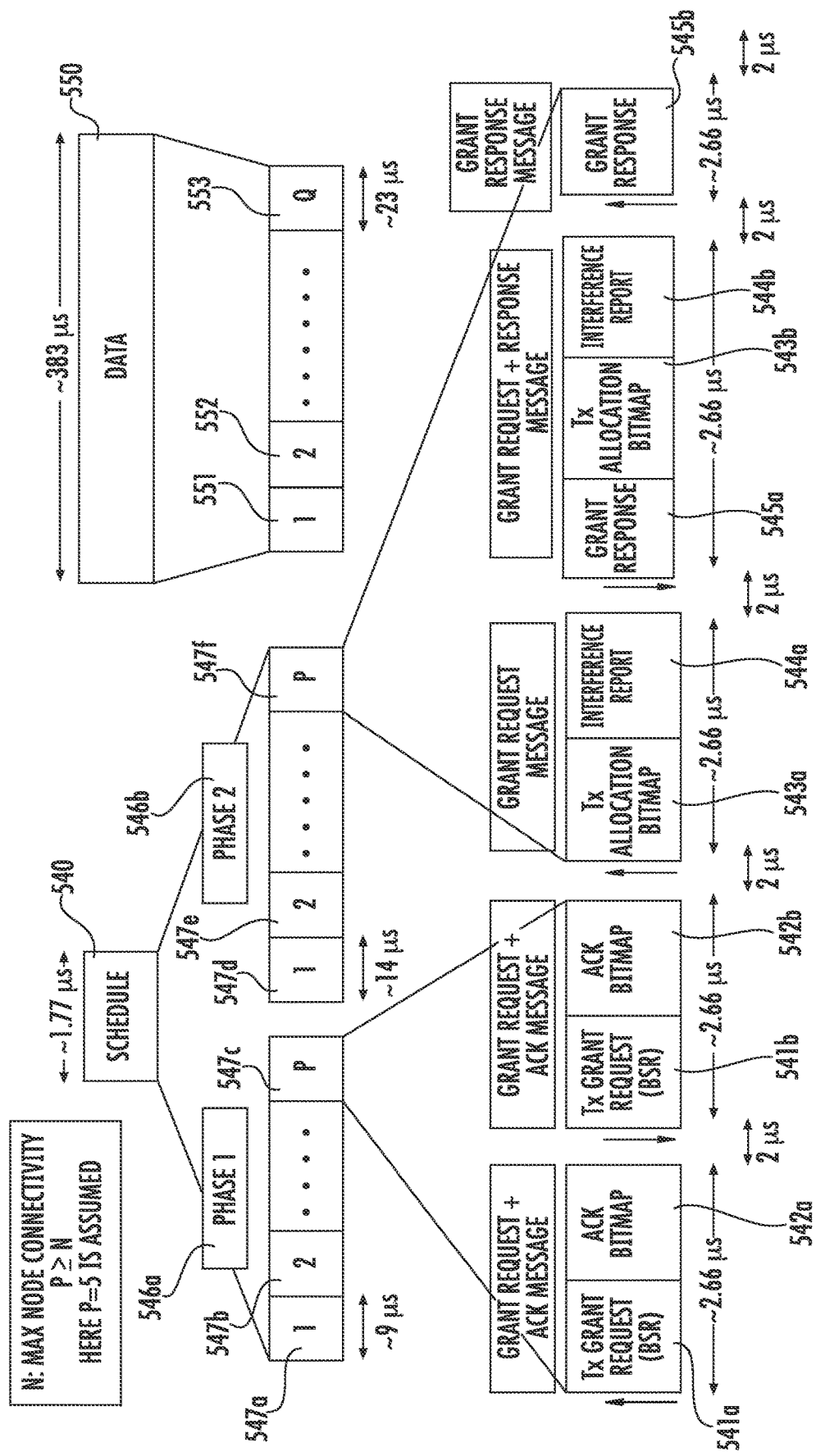
FIG. 5D is a diagram of an example frame format for a two phase resource allocation and scheduling.

FIG. 5D is a diagram of an example frame format for a two phase resource allocation and scheduling. In this example, the schedule/control period may be divided into two phases and may include a five message exchange procedure. In the first phase, Phase 1 546a, every node may send its individual buffer occupancy status to each of its neighbors during pre-determined transmission slots 547a, 547b, 547c. Once each node has collected the expected traffic information from all of its neighbors, it may distribute transmission allocations to them sequentially in slots 547d, 547e, and 547f of the second phase, Phase 2 546b, in the same order as before. With this two-step procedure, each node has a better understanding of the incoming traffic from all neighbors before allocating resources to each of them, thereby ensuring more equitable resource distribution among neighbors according to their current requirements. However, this may come at the expense of additional scheduling information exchange that may reduce the available data transmission time.

In this the example of FIG. 5D, a transmission exchange between neighboring first and second nodes of a link of the mesh network that have been assigned slot P are illustrated. In the Phase 1 546a of the scheduling period 540, a first node may send its transmit grant request (i.e. BSR) 541a and acknowledgment bitmap 542a to a second node of the link. The first node may then receive the second node's transmit grant request (i.e. BSR) 541b and acknowledge bitmap 542b. Each node may use the received transmit grant requests (i.e. BSRs) 541a and 541b to determine their transmit allocations for the second phase (Phase 2). In Phase 2 546b, the first node may send its transmit allocation bitmap 543a and interference report 544a to the second node of the link. The first node may then receive the second node's grant response 545a along with the second node's transmit allocation bitmap 543b and interference report 544b. In response, the first node may send its grant response 545b to the second node of the link. Following the scheduling period 540, data 550 may then be transmitted and received in the data slots 551, 552, and 553. During the data 550 interval, the network nodes may transmit data packets to their neighbors in time slots in accordance with the schedule established during the previous schedule/control period. The interval may be divided into slots for ease of addressability during transmission scheduling, and each node may be allotted one or more slots in each scheduling interval according to resource allocation and scheduling decisions by the receiving node.

Figure 6A:
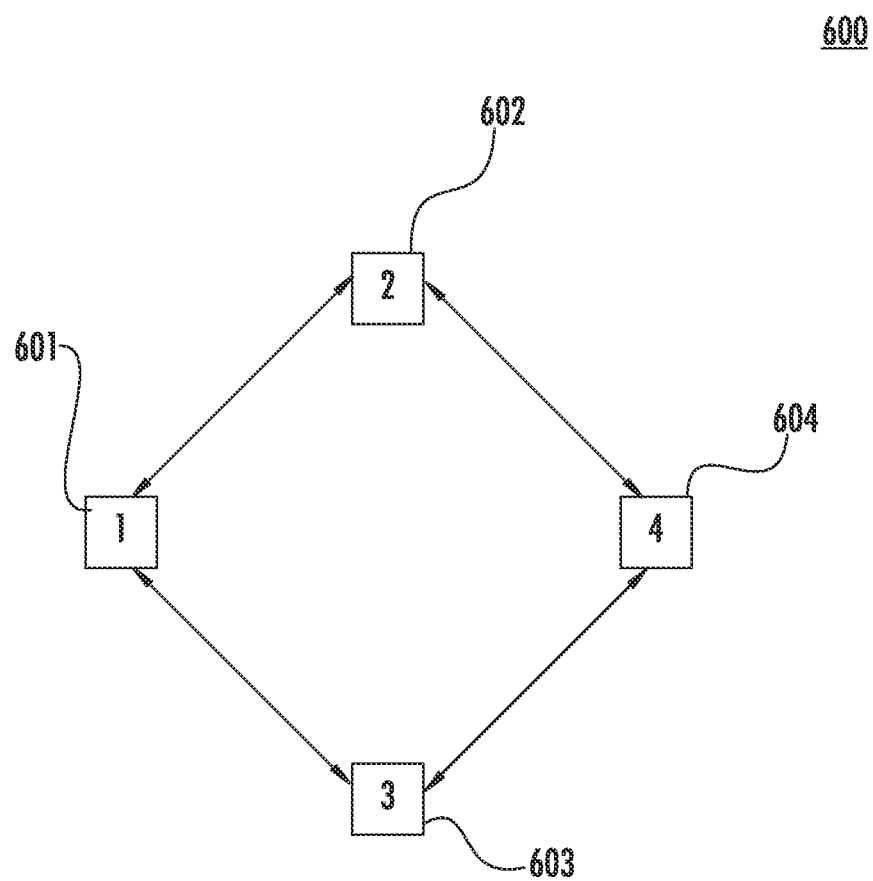
FIG. 6A is a diagram of an example mesh network with four nodes.

FIG. 6A is a diagram of an example mesh network 600 with four nodes. In the example illustrated in FIG. 6A, the four nodes are Node 1 601, Node 2 602, Node 3 603, and Node 4 604. As shown in this example, Node 1 601 neighbors Node 2 602 and Node 3 603 but not Node 4 604. Similarly, Node 4 604 neighbors Node 2 602 and Node 3 603 but not Node 1 601.

Figure 6B:
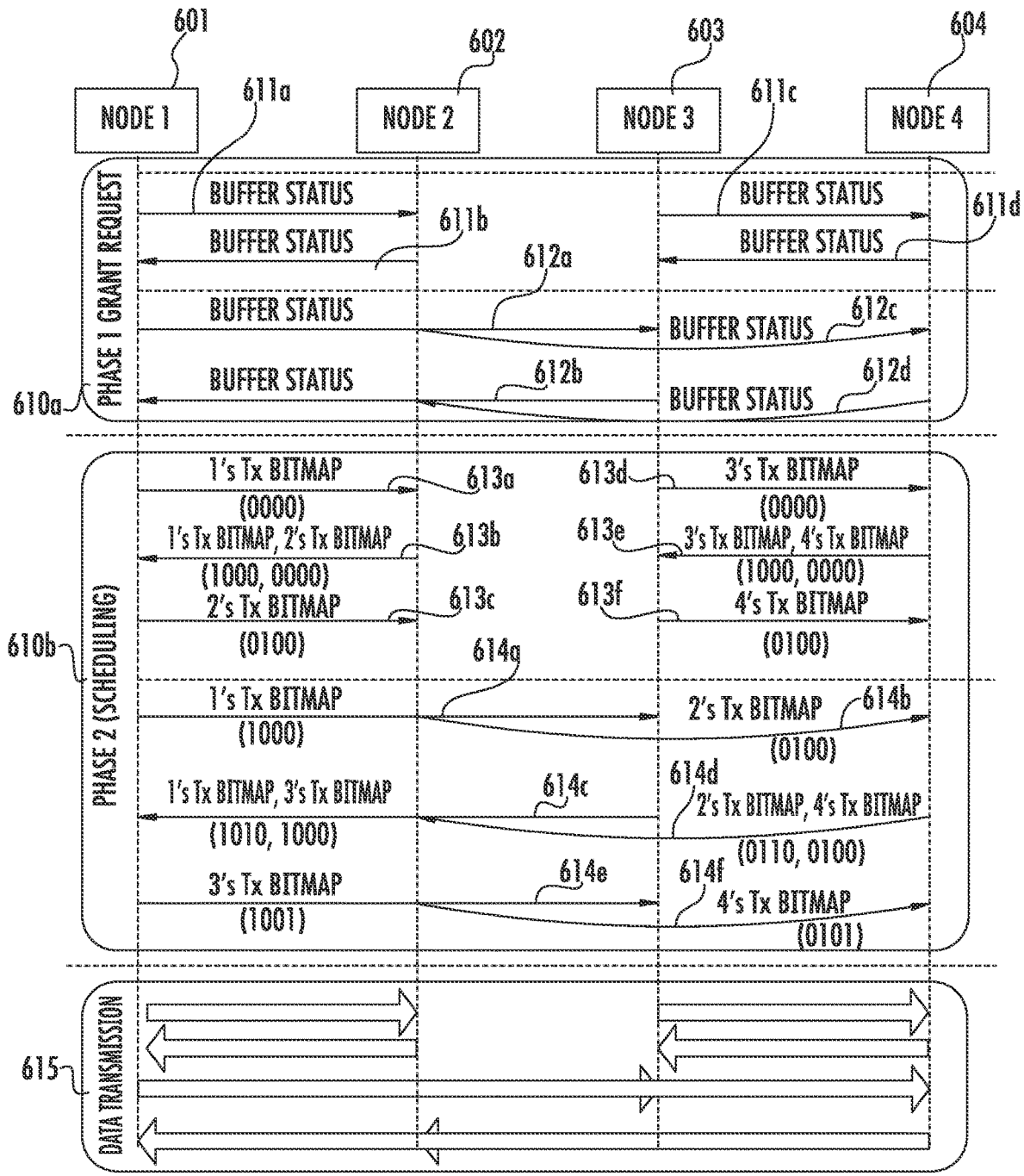
FIG. 6B is a signal flow diagram for the two-phase resource allocation and scheduling procedure.

FIG. 6B is a signal flow diagram for the two-phase resource allocation and scheduling procedure with respect to the example node configuration of FIG. 6A. In this example, each node only communicates with its neighboring nodes using the frame format illustrated in FIG. 5D.

Referring to FIG. 6B, in a first Phase 1 grant request 610a slot, Node 1 601 and Node 2 602 may exchange transmit grant requests that include buffer status 611a and 611b respectively. Node 3 603 and Node 4 604 may also exchange transmit grant requests that include buffer status 611c and 611d respectively. In a subsequent Phase 1 grant request 610a slot, Node 1 601 and Node 3 603 may exchange transmit grant requests including buffer statuses 612a and 612b respectively. Node 2 602 and Node 4 604 may also exchange transmit grant requests including buffer statuses 612c and 612d respectively.

Then, in a first Phase 2 scheduling 610b slot, Node 1 601 and Node 2 602 may exchange transmit allocation bitmaps 613a, 613b, and 613c as part of a three way handshake. This exchange may also include interference reports and grant responses.

Node 3 603 and Node 4 604 may also exchange transmit allocation bitmaps 613d, 613e, and 613f as part of a three way handshake. This exchange may also include interference reports and grant responses.

In a subsequent Phase 2 scheduling 610b slot, Node 1 601 and Node 3 603 may exchange transmit allocation bitmaps 614a, 614c, and 614e as part of a three way handshake. This exchange may also include interference reports and grant responses. Node 2 602 and Node 4 604 may also exchange transmit allocation bitmaps 614b, 614d, and 614f as part of a three way handshake. This exchange may also include interference reports and grant responses.

During data transmission 615, Node 1 601 and Node 2 602 may transmit data packets or receive data packets in a data transmission slot while Node 3 603 and Node 4 604 may also transmit data packets or receive data packets. Also, in a subsequent data transmission slot, Node 1 601 and Node 3 may transmit data packets or receive data packets and Nodes 2 and 4 also transmit data packets or receive data packets.

Notwithstanding the above example, where each node uses two respective Phase 1 and Phase 2 slots, generally, the schedule/control period has a number of slots that may be individually assigned for scheduling on each active link maintained by the node. The ordering may be made dependent on various factors, such as a number of free schedule/control slots at the time when a node joins the network or an interference pattern. A fixed ordering of control slots within a control period may result in a situation wherein the nodes that are scheduled during a later part of the control period are either more likely to be starved of resources, or resources reserved for them go unused. This may be reduced by setting up a rotating sequence of slot positions for all mesh nodes and stepping through the sequence on each scheduling interval.

One example is a cyclic shift where, at the start of a schedule/control period, each node circularly shifts the scheduling slot assignment for each of its neighbors. Since this shift is performed synchronously by all network nodes, mutual orthogonality between slots assigned by a node to each of its neighbors may be maintained. This may assume a fixed schedule transmission interval size throughout the network. The scheduling sequence may be negotiated among the mesh nodes and transmitted in the beacons. A simple cyclic shift may provide each link in the schedule with the same long term average preference. If a preference for some is desired, this may also be built into the sequence. Further, revisiting the same link more than once may also be enabled (e.g., an A-B link is scheduled in the first scheduling slot and also uses the last scheduling slot). The last extra slot may be used to reclaim any leftover data regions after one pass through all the links.

Figure 7:
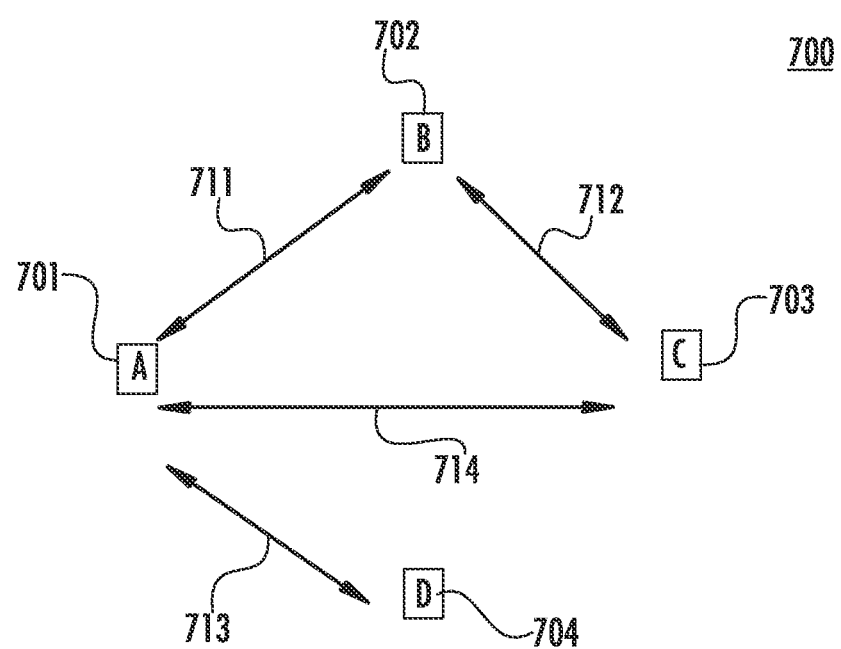
FIG. 7 is a diagram of an example system using a control slot rotation.

FIG. 7 is a diagram of an example system 700 using a control slot rotation method as described above. In the example illustrated in FIG. 7, node A 701 has node B 702, node C 703, and node D 704 as neighbors. In this example system there node A 701 has the following links between its neighbor nodes: a node A-node B link 711, a node B-node C link 712, a node A-node C link 714, and the node A-node D link 713. In this example, node A 701 may use the first three scheduling slots to schedule bi-directional transmissions on the node A-node B link 711, the node A-node C link 714, and the node A-node D link 713, respectively. In a second scheduling transmission interval, the order of scheduling slots may be circularly shifted, the node A-node C link 714 may be scheduled first, the node A-node D link 713 may be scheduled next, and node A-node B link 711 may be scheduled last. In another embodiment, node B 702, node C 703, and node D 704 may also synchronously shift their respective scheduling slots in the same manner, thereby ensuring correct slot alignment.

Figure 8:
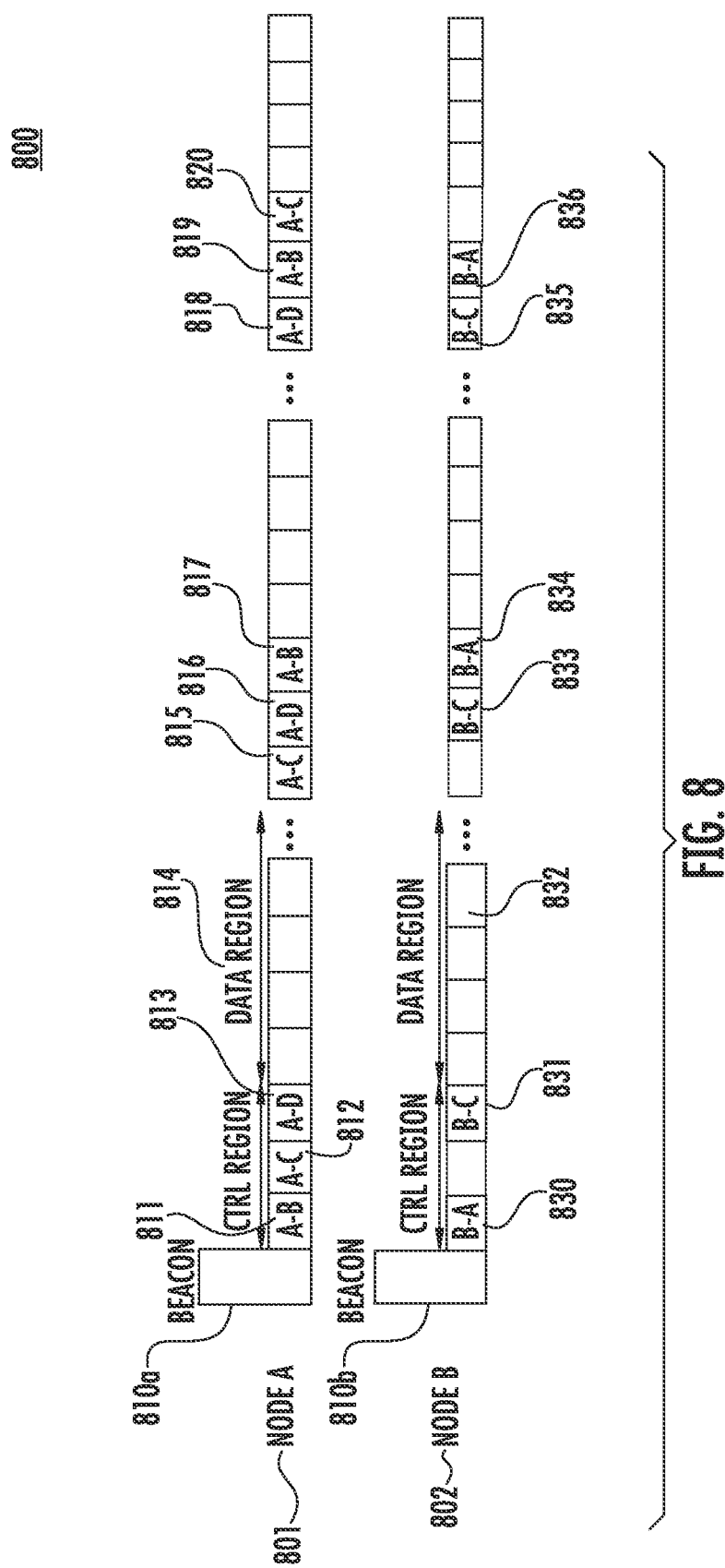
FIG. 8 is a diagram of an example slot rotation.

FIG. 8 is a diagram of an example slot rotation 800 for two nodes. In this example, following beacon 810a transmission, Node A 801 may have scheduling slots in a first control region for a node A-node B link 811, a node A-node C link 812, and a node A-node D link 813. Following data transmission in slots in the data region 814, the control region scheduling slots may rotate: the node A-node C link 815, may precede the node A-node D link 816, and the node A-node B link 817 and then rotate again in another round: a node A-node D link 818, a node A-node B link 819, and a node A-node C link 820.

Similarly, following beacon 810b transmission, Node B 802 may have scheduling slots in a first control region for a node B-node A link 830 and a node B-node C link 831. Following data transmission in slots in the data region 832, the control region scheduling slots may rotate: a node B-node C link 833 and a node B-node A link 834 and then be followed by another round: a node B-node C link 835 and a node B-node A link 836.

In another embodiment, a variable schedule/control period duration may be provided. The size of the schedule/control period or control region may be a major factor affecting network efficiency as it determines the time available for data transmissions. If all nodes in a mesh network use the same control region size, irrespective of node connectivity, there may be some unused control slots for nodes with lower connectivity. Network efficiency may be improved if the control region is allowed to vary from node to node, and each node chooses its control region size depending on its connectivity.

Use of a variable schedule/control period duration may enable the control region to grow dynamically when a new node joins the network, and this dynamic change may affect only the nodes that are directly using the link (e.g., the new node and the node to which the new node joins), and the rest of the network may use the smaller control region. This approach may reduce the signaling needed to communicate this control region change.

The control region growth may be accommodated by using up some slots originally meant for data transmissions. The nodes using the enlarged control region may indicate this to their neighbors by blocking out the corresponding slots in the transmit allocation bitmap sent to them. This may ensure that neighbors do not schedule any data transmissions during the control slot that actually coincides with their own data slots. For the dynamic control region to work effectively, the data slot duration may be chosen as an integer multiple of control slot durations. The impact of interference on the control message exchange by newer nodes, due to active data transmissions by neighboring nodes, may be handled in the same way as the interference due to data transmission on conflicting links.

FIGS. 9A-9D are diagrams of examples of dynamic control 900. In the examples illustrated in FIGS. 9A and 9B, node B 902 has two neighbors node A 901 and node C 903. The transmit bitmap 910a represents a four slot data region. In the example illustrated in FIG. 9B, following the beacon transmission 911, node B is using one control slot 912 to communicate on the node B-node A link and one control slot 913 to communicate on the node B-node C link to start. In this example, the data region 915 has 4 slots and is represented by a bitmap of length 4. During the scheduling transmission interval, node B marks all the four data slots as available for transmission to node A.

Figure 9A:
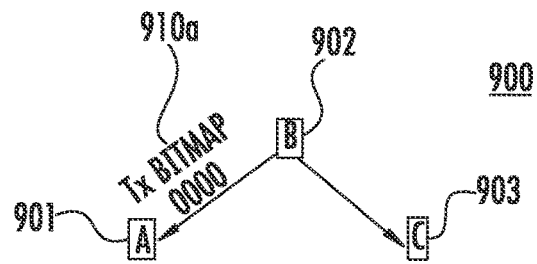
FIG. 9A is a diagram of an example of dynamic control.
Figure 9B:
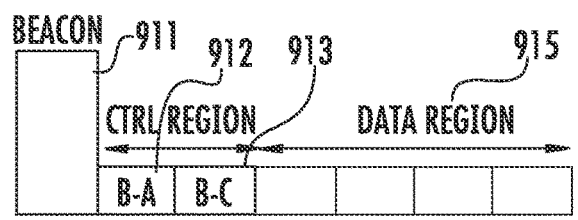
FIG. 9B is another a diagram of an example of dynamic control.
Figure 9C:
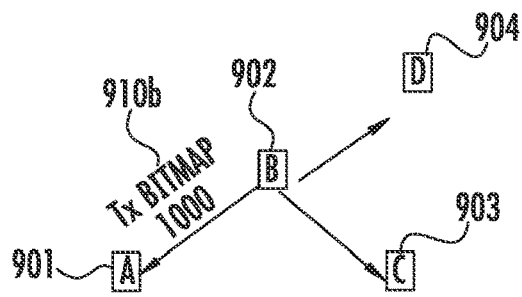
FIG. 9C is a another diagram of an example of dynamic control.
Figure 9D:
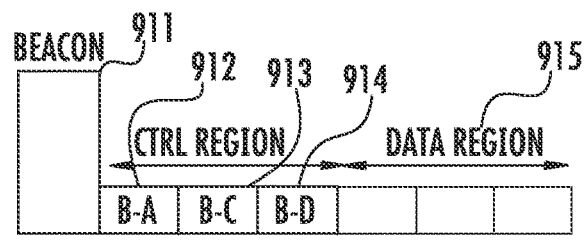
FIG. 9D is yet another diagram of an example of dynamic control.

FIGS. 9C and 9D illustrate an example for when a new node joins a network. As shown in FIG. 9C, new node D 904 joins the network and becomes the neighbor of node A 901, node B 902, and node C 903. Node B 902 and new node D 904 may then choose a third control slot 914 for scheduling the node B-node D link, as node B had previously allocated the first two control slots 912 and 913 to the other neighbors. The third control slot 914 was previously used as a data slot in the data region 915 by node B 902. During the scheduling transmission interval, node B 902 may now indicate to node A 901 that only 3 data slots are available for transmission, by marking the first data slot as busy as indicated by a 1 in that slot. This procedure may allow a node to dynamically increase the control region size when it increases its connectivity due to addition of a new node.

Floating scheduling of slots may be provided as an alternative. The scheduling slots may replace data slots in a floating scheduling slot configuration. Here, there may be no distinct schedule/control and data periods. Rather, the schedule slots may be interspersed with data slots. This may not cause a problem for control information because that may be more robustly encoded and is not expected to be affected by interference due to concurrent data transmissions. Moreover, strong interference from neighboring nodes may be scheduled to avoid scheduling slots.

Figure 10:
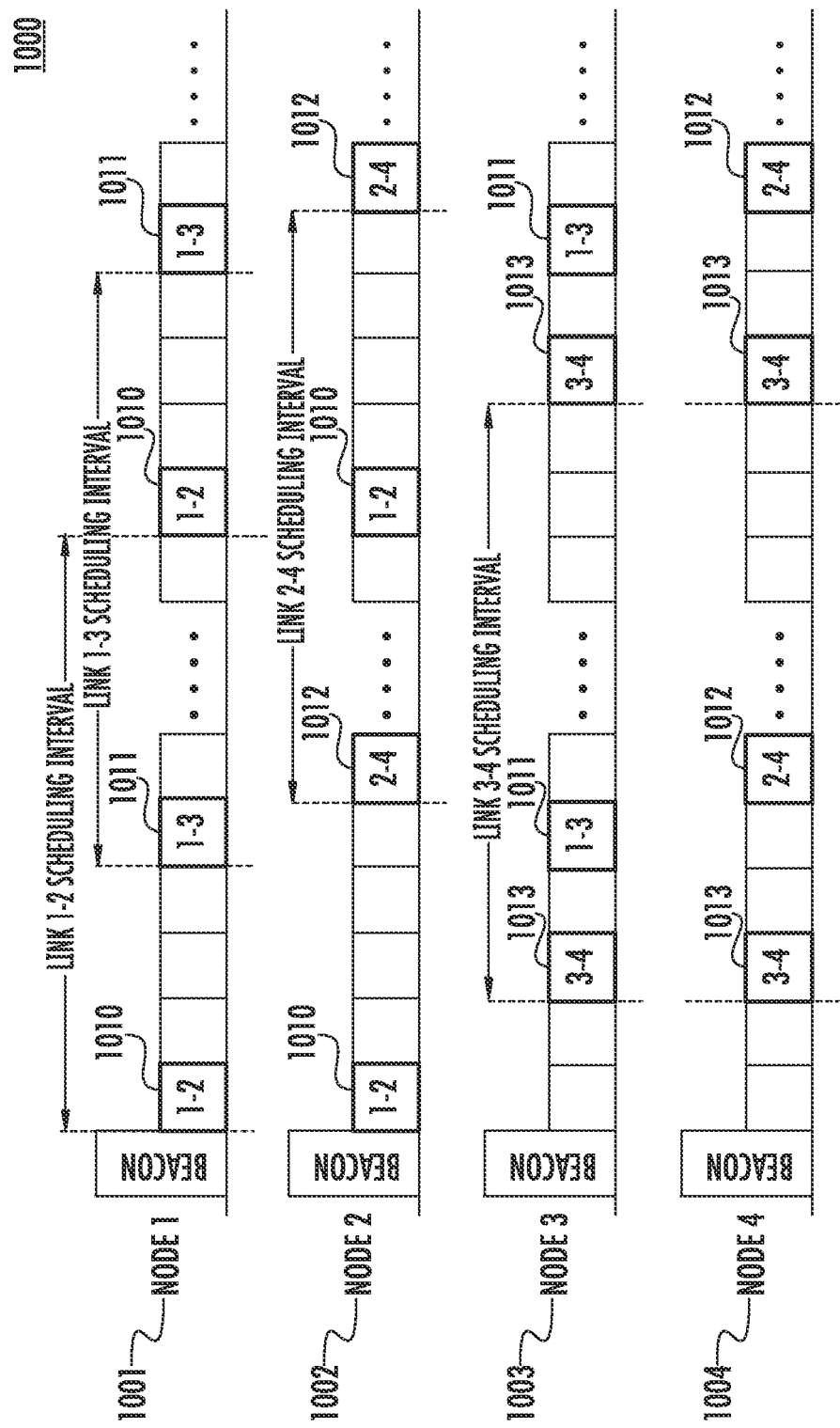
FIG. 10 is a diagram of an example of schedule slot location assignment in a floating scheduling slot configuration made randomly during initial node association.

FIG. 10 is a diagram of an example of schedule slot location assignment 1000 in a floating scheduling slot configuration made randomly during initial node association. The numbered slots in the example of FIG. 10 may represent bi-directional scheduling slots, while the blank slots may represent data slots.

The floating scheduling slots may enable more responsive data scheduling over multiple hops. Then the end-to-end packet delay may be reduced due the rolling scheduling intervals used by network nodes because packets may be scheduled for next hop transmission at the next scheduling slot for the link rather than waiting for a system-wide common schedule/control period. For example, if node 1 1001 wants to send a packet to node 4 1004 via node 2 1002, then, with the slot configuration shown in FIG. 10, a first hop may be scheduled during the bi-directional scheduling slot for link 1-2 1010, followed by a second hop during bi-directional scheduling the slot for link 2-4 1012. Thus, the two-hop packet transmission may be scheduled to be completed in less than the two scheduling intervals required in the fixed schedule/control period configuration.

In another example, if node 1 1001 wants to send a packet to node 4 1004 via node 3 1003, then, with the slot configuration shown in FIG. 10, a first hop may be scheduled during the bi-directional scheduling slot for link 1-3 1011, followed by a second hop during bi-directional scheduling the slot for link 3-4 1013.

Nodes using floating scheduling slots may also use variable scheduling periodicity (i.e., scheduling interval length) for its neighbors. This may be due to varying data traffic requirements on the link or other reasons. Nodes may modify their scheduling periodicity by exchanging control messages.

Figure 11:
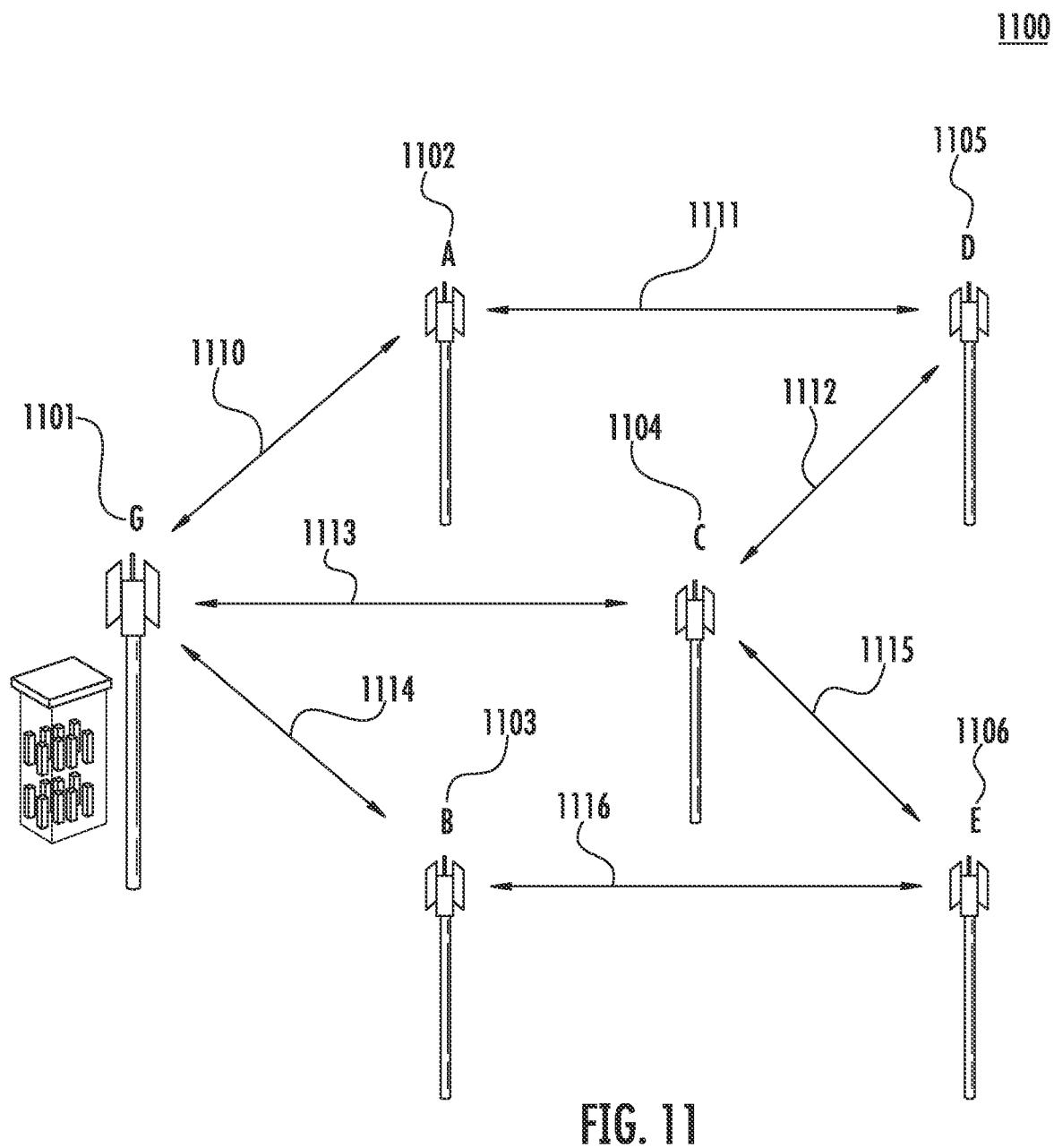
FIG. 11 is diagram of an example directional mesh network operation.

FIG. 11 is diagram of an example directional mesh network operation 1100. In the example configuration illustrated in FIG. 11, Node G 1101 is a gateway node (e.g., a WTRU, base station, or mB configured with ad hoc wireless communication functionality that also functions as, for example, a fiber-based point of presence (POP) access node for a fiber optic network). Node A 1102, node B 1103, node C 1104, node D 1105, and node E 1106 are other nodes within the mesh network that, as with node G 1101, utilize directional antennas for mesh network communication. Directional links 1110, 1111, 1112, 1113, 1114, 1115, and 1116 may be established between the nodes in the example mesh network.

Figure 12:
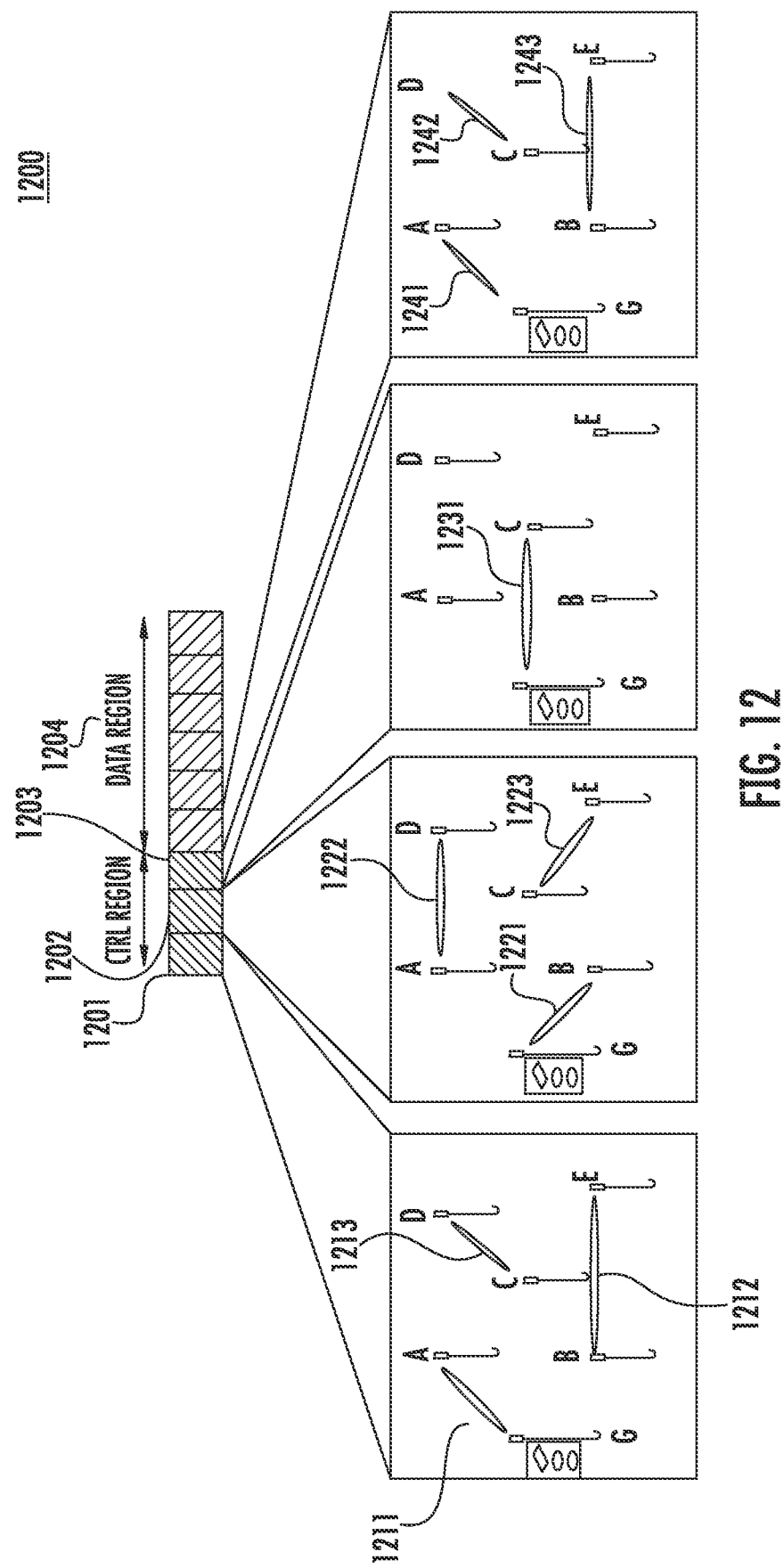
FIG. 12 is a diagram of an example operation during a control slot in a directional mesh network.

FIG. 12 is a diagram of an example operation during a control slot 1200 in a directional mesh network. Each node has one control slot allocated to each of its neighbors. This control slot may be used for the scheduling and other control signaling for that link. When a new node is admitted to the network, the control slot for each of its neighbors may be chosen such that the control slot is collision free. A control slot may be allocated via a beacon signal by each neighbor to the new node associating with that neighbor. In this example, the data region is completely scheduled by the corresponding control slot for that link. Nodes may exchange their transmit and receive bitmaps, indicating their transmission and reception schedules and buffer status of queues, to aid in scheduling during the control slot. As illustrated in FIG. 12, the control region is three control slots 1201, 1202, and 1203 followed by the data region 1204, although the actual sizes of these regions may be modified. The three control slots 1201, 1202, and 1203 may be used for each node to talk to all of its neighbors. Control slots may be chosen such that the conflicting links are not scheduled in the same slot. During the control slot, a schedule for bi-directional transmissions during the data transmission interval may be established via a three message exchange between the nodes. The scheduling may be guided by the buffers status for each quality of service (QoS) queue with which the nodes are configured. In this example, links for node G-node A 1211, node B-node E 1212, and node C-node D 1213 may be active in the first control slot 1201, followed by links for node G-node B 1221, node A-node D 1222, and node C-node E 1223 in the second control slot 1202, and a link for node G-node C 1231 in the third control slot 1203. Also shown in this example is a slot of the data region 1204, in which data is transmitted on the node G-node A 1241, node B-node E 1243, and node C-node D 1242 links.

Table 1 below notes the link status for both control and data regions with respect to the example operational mesh network of FIG. 12 described above.

TABLE 1

Link Status

| Link | Slot 1 | Slot 2 | Slot 3 | Slot 4 | Slot 5 | Slot 6 | Slot 7 | Slot 8 | Slot 9 |
|---|---|---|---|---|---|---|---|---|---|
| G-A | Ctrl | | | Data | | | | | |
| G-B | | Ctrl | | | Data | Data | Data | | |
| G-C | | | Ctrl | | | | | Data | Data |
| A-D | | Ctrl | | | Data | Data | Data | Data | Data |
| B-E | Ctrl | | | Data | Data | | | | |
| C-D | Ctrl | | | Data | | | | | |
| C-E | | | Ctrl | | Data | Data | Data | | |

As shown in the Table above, due to the directional nature of the transmission, not all links are active at the same time.

Table 2 below is an example of a bitmap status update during the control slots with respect to the example operational mesh network of FIG. 12 described above. The columns 1, 2, 3 indicate the status of receive and transmit bitmaps at the end of first, second, and third control slots, respectively.

TABLE 2

Bitmap Status During Control Slot

| Node | | Initial | 1 | 2 | 3 |
|---|---|---|---|---|---|
| G | Tx | 000000 | A00000 | ABB000 | ABB0CC |
| | Rx | 000000 | A00000 | A0BB00 | A0BBCC |
| A | Tx | 000000 | G00000 | GDDDDD | |
| | Rx | 000000 | G00000 | GDDDDD | |
| B | Tx | 000000 | E00000 | EGG000 | |
| | Rx | 000000 | EE0000 | EEGG00 | |
| C | Tx | 000000 | D00000 | DE0000 | DE00GG |
| | Rx | 000000 | D00000 | D0EE00 | D0EEGG |
| D | Tx | 000000 | C00000 | CAAAAA | |
| | Rx | 000000 | C00000 | CAAAAA | |
| E | Tx | 000000 | BB0000 | BBCC00 | |
| | Rx | 000000 | B00000 | BC0000 | |

In the example illustrated in Table 2, all the bitmaps are initialized to 0 at the start of each scheduling interval. Bitmap length 7 is used to map 7 data slots in this example.

In practice, the number of data slots may be much larger. The bitmaps may be replaced by node designations for illustration. These bitmaps may simply reflect the occupancy status of each slot in a data region.

Figure 13:
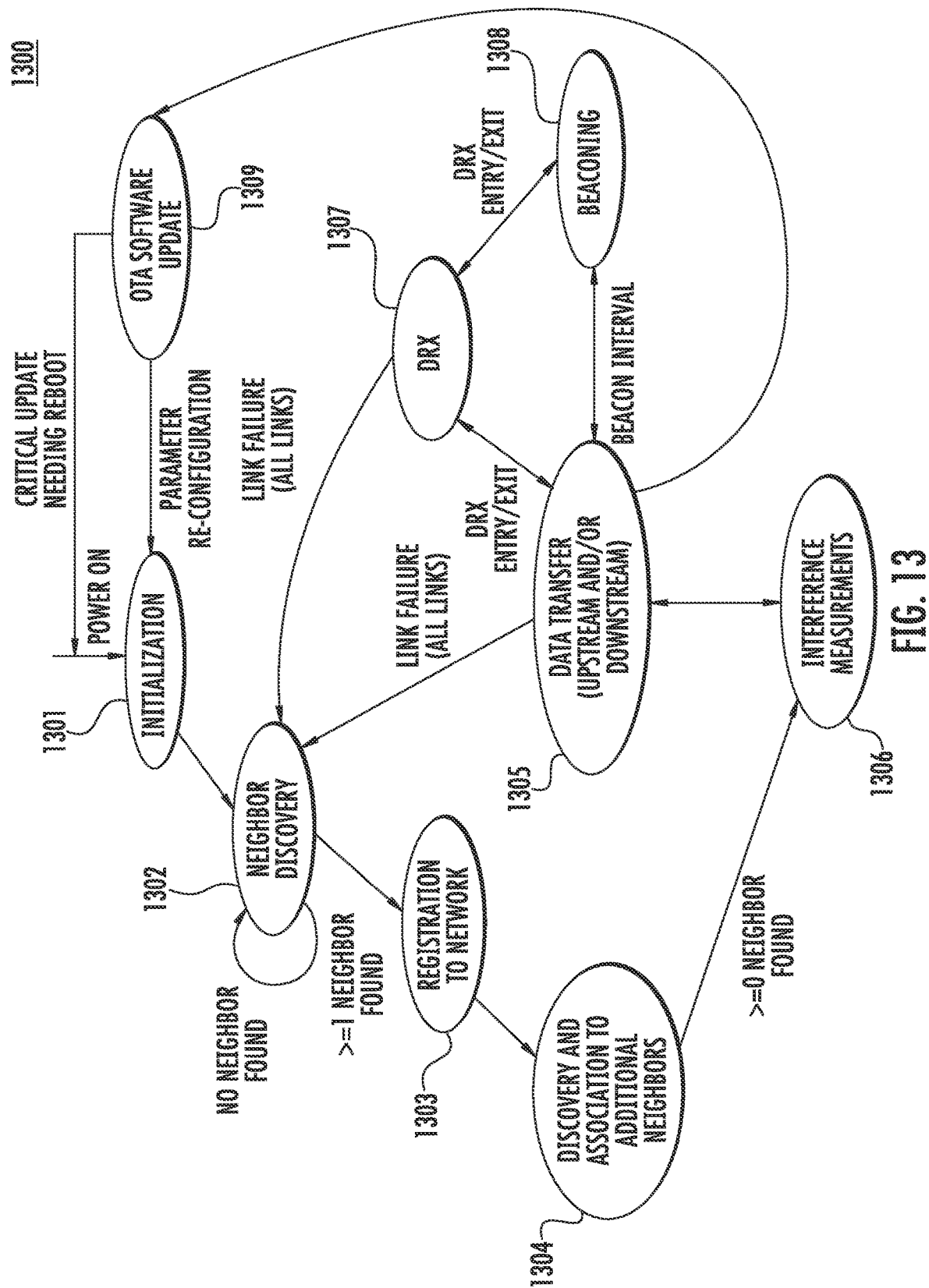
FIG. 13 is a diagram of an example of a group of high level MAC states that may be implemented.

The MAC layer may be implemented as a MAC state machine in which the node transitions through various states. FIG. 13 is a diagram of an example of a group of high level MAC states 1300 that may be implemented. The example group of high level MAC states that may be implemented, may include but are not limited to the following states: initialization 1301 (initial boot up sequence), neighbor discovery 1302 (read all the beacons and select first/best neighbor and associate with it), registration to network 1303 (registration, authentication/authorization to the network and configuration by operation, administration, and maintenance (OAM)), discovery and association to additional neighbors 1304 (find other neighbors and associate with them—during this phase, control slots are assigned by each of its neighbors), data transfer 1305 (both upstream and downstream traffic is sent/received in this state), interference measurements 1306 (interference measurements are performed in this state), discontinuous reception (DRX) 1307 (sleep mode for energy efficient operation), beaconing 1308 (in this state, beacons are sent at defined intervals for new neighbors to join the network, and over the air (OTA) software update 1309 (OAM may update software that may require a re-boot and other configuration parameters).

The MAC layer may be configured to implement a scheduler that is aware of QoS constraints set by an access network and may also differentiate different types of mesh related traffic. For example, each node in the mesh network may have one scheduling group for each of its neighbors. Each scheduling group may have four logical queues and one virtual queue. For example, the four logical queues may respectively serve semi-persistently scheduled traffic, high priority mesh signaling traffic (such as link metrics and DRX requests), 5 ms latency (such as access side gaming traffic), X2 and S1 signaling traffic, 10 ms latency (such as all other access side, including QoS class identifiers (QCIs), and high priority OAM, including both backhaul and access), and low priority mesh signaling traffic (such as interference matrix, association signaling, low priority OAM traffic and other background traffic from access that are not 10 ms latency bound).

Figure 14:
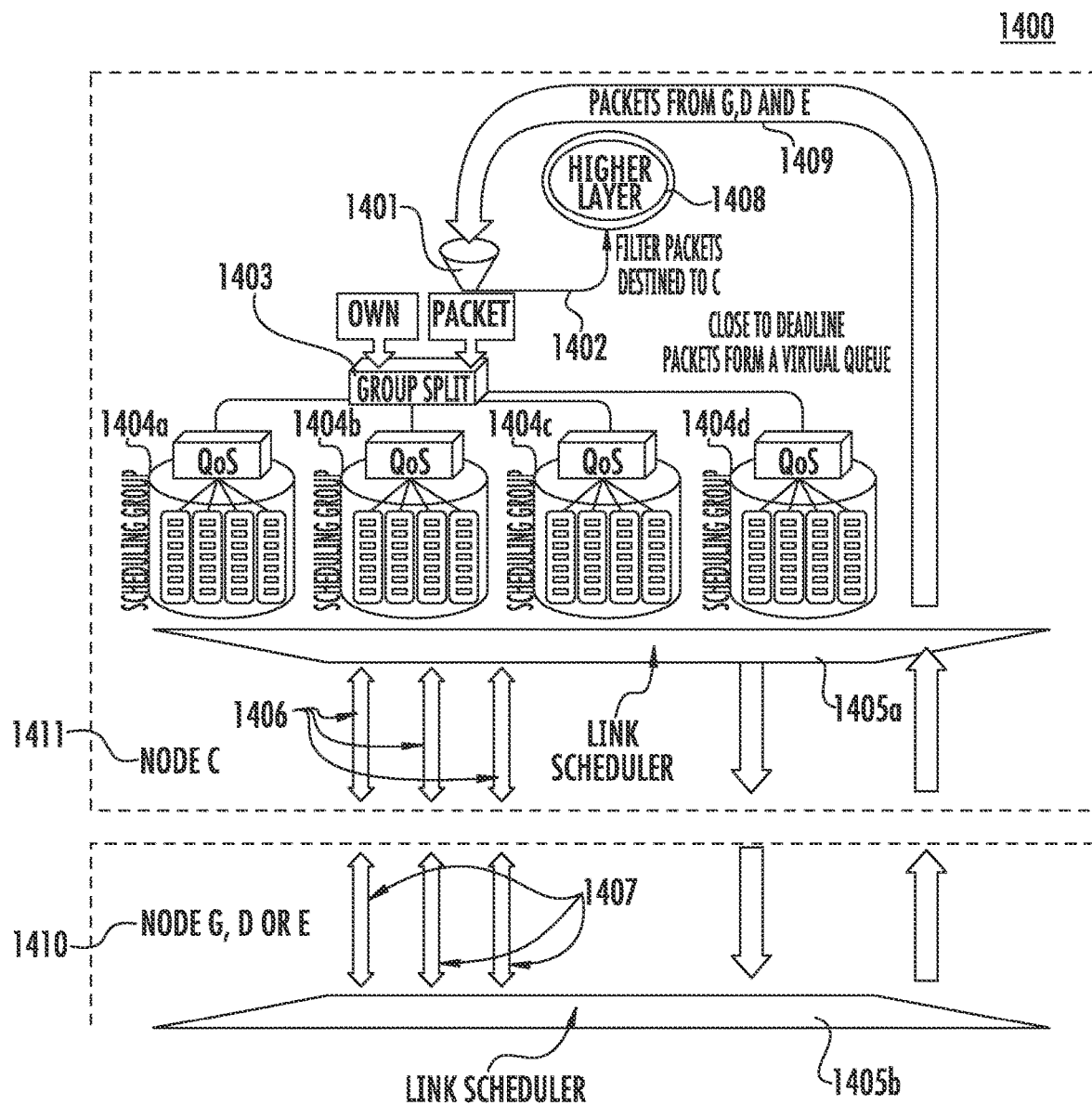
FIG. 14 shows an example MAC scheduler architecture.

FIG. 14 shows an example MAC scheduler architecture 1400 that may be used in any of the embodiments described herein. For example, a MAC scheduler architecture may include but is not limited to scheduling groups, queues, a group split function, and a link scheduler function. However, this architecture is an example and may be expanded to include any number of these entities or reduced to include a subset of these entities.

In the example architecture of FIG. 14, node C 1411 includes a link scheduler 1405a. Nodes G, D, or E 1410 (the neighboring nodes of node C) each also include a link scheduler 1405b. Any incoming traffic to node C 1411 including packets from nodes G, D, and E 1409 may first be checked for the destination address and filtered 1401. Traffic that is addressed or destined to node C 1402 may be sent to higher layer processing 1408, such as either by the MAC layer to process intra mesh related traffic or backhaul OAM traffic or may be forwarded to the access side. Traffic that is addressed to other nodes may be added to the appropriate scheduling group 1404a, 1404b, 1404c, and 1404d by the group split function 1403.

The scheduling groups 1404a, 1404b, 1404c, and 1404d may be created by the group split function 1403. There are various alternatives to forming scheduling groups. In one example, there may be one scheduling group per destination node addressed in the packet. In another example, there may be one scheduling group per each neighbor link.

The scheduling groups 1404a, 1404b, 1404c, and 1404d may include QoS queues wherein each QoS class has its own queue. Each scheduling group 1404a, 1404b, 1404c, and 1404d may also have a QoS classifier that adds data packets to the appropriate QoS queues. QoS-specific queues may allow QoS aware scheduling, in that packets belonging to different QoS classes may be handled differently. The example MAC scheduler of FIG. 14 may also identify data packets in the four queues that are close to a respective delivery deadline and place them in another virtual queue that enjoys prioritized scheduling. During the control region, each node may exchange its buffer status with its neighbors, and this buffer status may convey the occupancy of each of the four logical queues and the virtual queue.

Each packet may also have a time to live (TTL) field that denotes the time before which the packets are to be delivered to the destination node within the mesh network. The TTL value may be inserted into the packet header when it enters the mesh from an access interface. During each scheduling interval, TTL fields of queued packets may be checked against a delay path metric for the destination node, and an index may be added to the virtual queue if the packet is close to the deadline indicated by the TTL value. While transmitting grant requests, occupancy in this virtual queue may also be reported in a buffer status. The TTL value may then be decremented by the amount of delay experienced at each node along the path.

The link schedulers 1405a and 1405b may transmit grant requests and receive grant responses 1406 and 1407 respectively. While requesting resources, the link scheduler 1405a may take into account the number of neighbors and occupancy in the scheduling groups 1404a, 1404b, 1404c, and 1404d. The link scheduler 1405b on the respective neighboring node's receiver may then grant resources for these requests. The link schedulers 1405a and 1405b each may have a learning function that is aware of historical resource requirements for each of its neighbors. Since each of the neighbors may be scheduled sequentially, this historical information may help in scheduling.

For semi-persistent scheduling, a path setup may be made before the actual transmission starts. In such case, every node wishing to establish semi-persistently scheduled traffic may send a semi-persistent schedule request to its neighbor node. Neighbor node selection in such an example is based on the path metric provided by the routing/forwarding algorithm. This request may propagate up to the destination node, such as a gateway or other node. The destination node may then send the response for the semi-persistent scheduling request. Another approach to semi-persistent scheduling may be to treat the semi-persistently scheduled data as normal data and treat it with highest priority. This may not require path setup prior to the actual data transfer.

Figure 15:
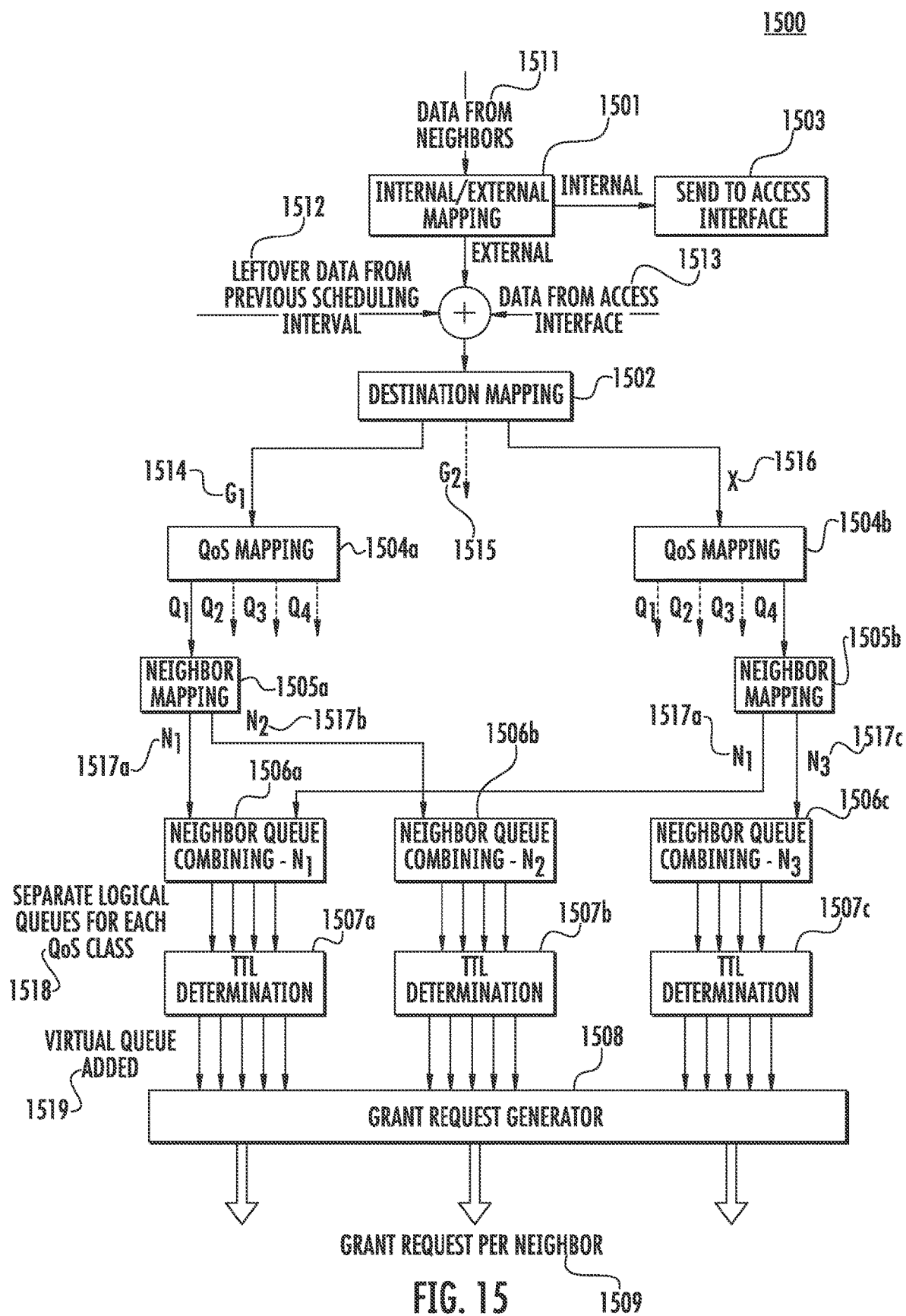
FIG. 15 is a diagram of one specific implementation of the group split function to generate neighbor-specific scheduling groups.

FIG. 15 is a diagram of one specific implementation of the group split function 1500 to generate neighbor-specific scheduling groups. However, destination-specific information may also be used in generating the scheduling groups. In the example illustrated in FIG. 15, it may be assumed that there are three destinations for the node traffic: gateways G1 1514 and G2 1515 and peer mesh node X 1516 that may handle local traffic. Further, the node may be assumed to have three neighbors: N1 1517a, N2 1517b, and N3 1517c.

The link scheduler may have two responsibilities: requesting grants (grant requests) and providing grants (grant responses). In one example, actual resources for transmission are always granted by the receiver. During each scheduling interval, every node in the mesh may provide the buffer status of its queues to its neighbor. This buffer status may capture the occupancy in each of the queues (e.g., 200 bytes in QoS class 1, 50 bytes in QoS class 2, etc.).

In the example of FIG. 15, internal and external mapping 1501 may be performed on incoming data from neighbors 1511. Data that is mapped as internal data may be sent to an access interface 1503. Destination mapping 1502 may be performed on data that is mapped as external. Destination mapping 1502 may also be performed on leftover data from the previous scheduling interval 1512 and data from the access interface 1513. Data may be mapped to G1 1514, G2 1515, and X 1516. QoS mapping 1504a and 1504b may then be performed for each destination node. Neighbor mapping 1505a and 1505b may then be performed for each destination on data within each QoS queue. Neighbor queue combining 1506a, 1506b, and 1506c may then be performed for each neighbor node N1, N2, and N3 respectively. Separate logical queues may be maintained for each QoS class 1518. A TTL determination 1507a, 1507b, and 1507c may be made. A virtual queue may be added 1519, and the data may then be forwarded to the grant request generator 1508 and grant request per neighbor 1509.

Packets from the queues may be scheduled in each link direction by the link scheduler in the respective receiver node. Scheduling decisions may, for example, be made via three messages exchanged during the control slot in any of the allocation and scheduling procedures described above. In the first message (e.g., Control Slot for C-->G link), node C may first send its transmit bitmap, receive bitmap and buffer status for all of its queues to node G. In the second message, node G may allocate time-slots for node C's transmission and may send the grant to node C. Along with node C's allocation, node G may also send its own transmit/receive bitmaps to node C. Node C may now allocate for node G's transmission in a similar fashion to the C-->G link allocation and may send the grant to node G in the third message. This may complete a three message exchange for the G<--->C link and may occupy one full control slot. Similar exchanges may occur simultaneously for all other non-conflicting nodes scheduled in the same control slot.

Figure 16:
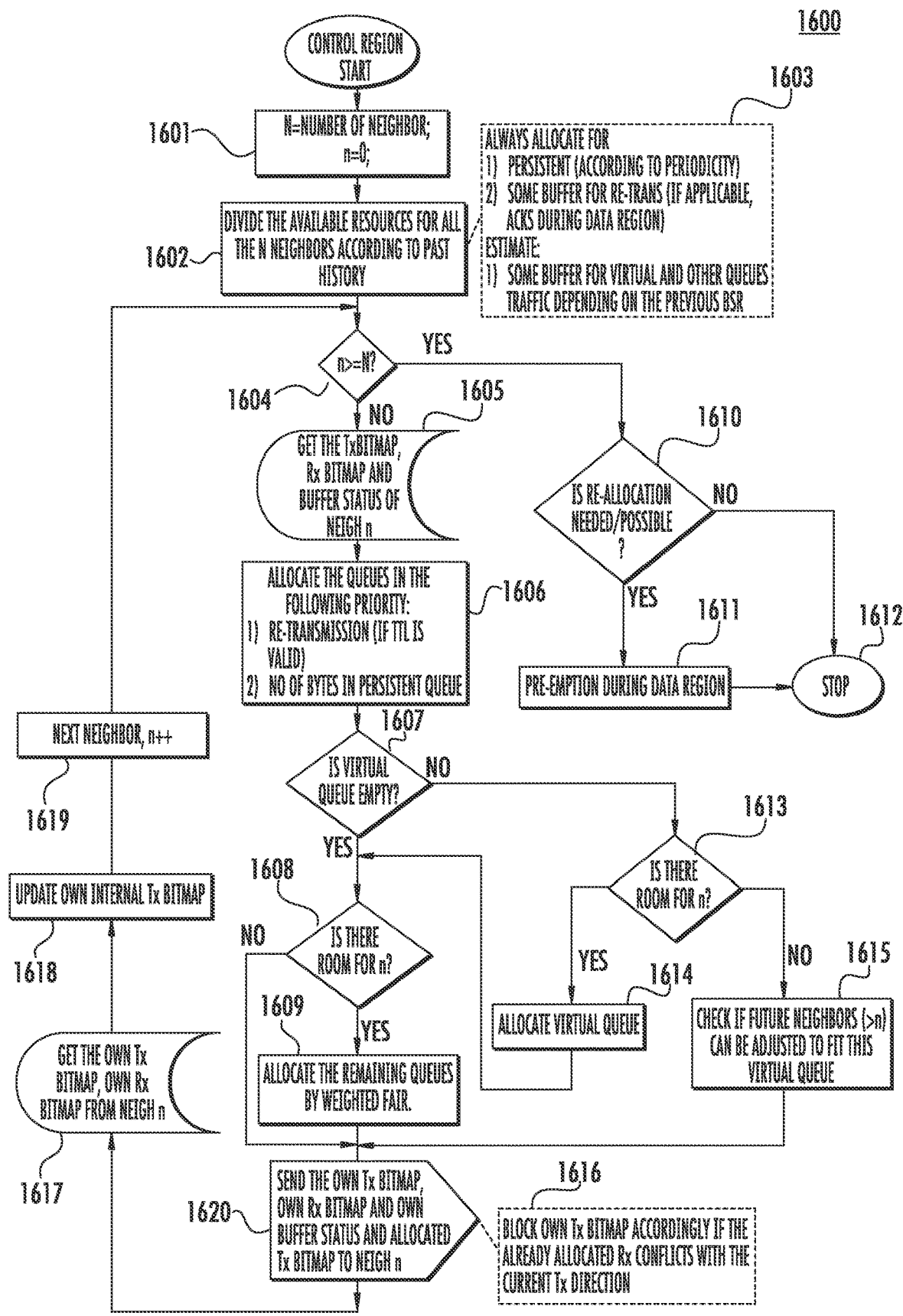
FIG. 16 is a flow chart of an example scheduling flow 1600 for the link scheduling logic in a gateway node.

FIG. 16 is a flow chart of an example scheduling flow 1600 for the link scheduling logic in Node G as described above. Once the control region scheduling flow starts, N is defined as the number of neighbors and n is set to zero 1601. The available resources for all N neighbors are divided according to past history 1602. Semi-persistent scheduling and some buffer for retransmissions (if applicable ACKs during the data region) are always allocated and some buffer for virtual and other queues traffic depending on the previous BSR is estimated 1603. If n is greater than or equal to N 1604, the transmit bitmap, receive bitmap, and buffer status of the neighbor node are obtained 1605. Queues are then allocated based on priority including but not limited to retransmissions (if the TTL is valid for example) and the number of bytes in the semi-persistent queue 1606. If the virtual queue is empty 1607, a determination is made as to whether there is room for n 1608 and if so the remaining queues are allocated by weighted fair 1609. Then the transmit bitmap, receive bitmap, buffer status, and allocated buffer status are transmitted to neighbor n 1620. The transmit bitmap nay be blocked accordingly if the receive bitmap already allocated conflicts with the current transmit direction 1616. If there is no room for n 1608, the scheduling flow precedes to transmitting the transmit bitmap, receive bitmap, buffer status, and allocated buffer status to neighbor n 1620.

If n is not greater than or equal to N 1604, a determination is made as to whether re-allocation is needed or possible 1610. If re-allocation is not needed or possible, the scheduling flow stops 1612. If re-allocation is needed or possible, and pre-emption during the data region may occur 1611, and then the scheduling flow stops 1612.

If the virtual queue is not empty 1607, a determination is made as to whether there is room for n 1613 and if so the virtual queues are allocated 1614 and the scheduling flow proceeds to determining whether there is room for n 1608. If there is no room n 1613, a check is made as to whether future neighbor nodes may be adjusted to fit the virtual queue 1615 and the scheduling flow proceeds to transmitting the transmit bitmap, receive bitmap, buffer status, and allocated buffer status to neighbor n 1620.

The scheduling flow may then proceed to obtain the transmit bitmap and receive bitmap from neighbor node n 1617, to update its own internal transmit bitmap 1618, and move to the next neighbor by incrementing n 1619.

Figure 17:
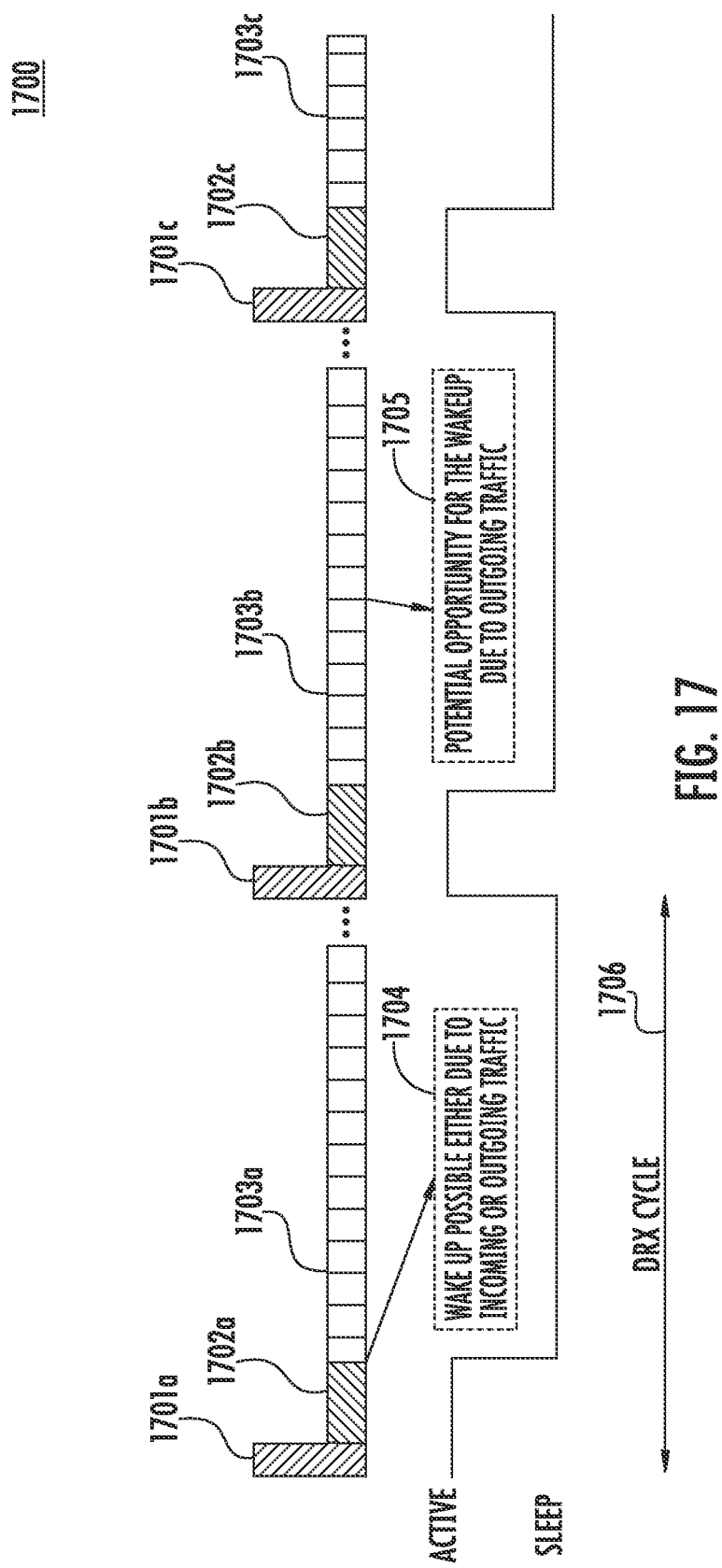
FIG. 17 is a diagram of an example of DRX operation.

FIG. 17 is a diagram of an example of DRX operation 1700. A discontinuous reception (DRX) operation may be provided where there is a powering down of selected components for selected periods. For example, a DRX operation may be implemented for small cells that may have periods where there is no user traffic. For energy efficient operation, a small cell backhaul may support a DRX mode. In such a case, a mesh node, before going into a sleep mode, may notify each of its neighbors, even those already sleeping, with a DRX mode request message transmitted during a data region. The neighbor nodes may then, for example, allow the requester node to go to sleep after verifying whether the neighbor node has other active neighbors and whether the existing paths can satisfy QoS requirements of the neighbor. The requester node may then go to sleep if all its neighbors allow it, and if all the buffers of the requesting node are empty.

In the example of FIG. 17, two modes of DRX operation may be provided, such as deep sleep and light sleep modes. In an example deep sleep mode, the mesh node may sleep during the data transmission intervals 1703a, 1703b, and 1703c and during most control schedule transmission intervals 1702a, 1702b, and 1702c. In an example light sleep mode, the mesh node may sleep only during data transmission intervals 1703a, 1703b, and 1703c. The deep sleep mode may be entered, for example, after a configured number of light sleep cycles elapse. Irrespective of the sleep mode, the mesh node may wake up to transmit beacons 1701a, 1701b, and 1701c and be active during the scheduled transmission interval immediately following a beacon transmission interval. Such a scheduled transmission interval may be seen as a paging region, so the mesh node may potentially wake up depending on the messages in the schedule transmission interval. Wakeup may occur due to either incoming traffic to a sleeping node or outgoing traffic from a sleeping node 1704.

Neighboring nodes may buffer the traffic for the mesh node in sleeping mode. In one example, a sleeping node may be paged only during the active scheduled transmission intervals, and the schedule transmission interval slot assigned to the node may not be released during sleeping periods. This may enable the sleeping node to use the scheduling slot as soon as any outgoing traffic, such as from an access network, arrives 1705.

The value for a DRX cycle 1706 may be chosen so that the internal clock drifts during the sleep intervals are kept below an acceptable limit. Consideration may also be given to the latencies involved with downstream traffic to the sleeping node. A routing/forwarding algorithm may also take DRX into account in path metrics and may avoid routes with sleeping nodes if possible.

The distributed mesh coordination function (DMCF) described above is a reservation-based channel-access mechanism that may achieve coordination among devices in a purely distributed manner. The DMCF may also enable a node to gain scheduled access to the medium within a negotiated reservation. This may enable nodes to reserve one or many data slots that the node may use to communicate with each of its neighboring nodes.

To achieve distributed scheduling, mesh nodes may send their resource allocation requests to relevant neighbors. Additionally, traffic priorities may be included in the transmitted request. The mesh nodes that receive the resource request may allocate resources based on other past and anticipated resource commitments and interference conflicts. These inputs may be used by the scheduling algorithm to make resource allocation and scheduling decisions.

Figure 18:
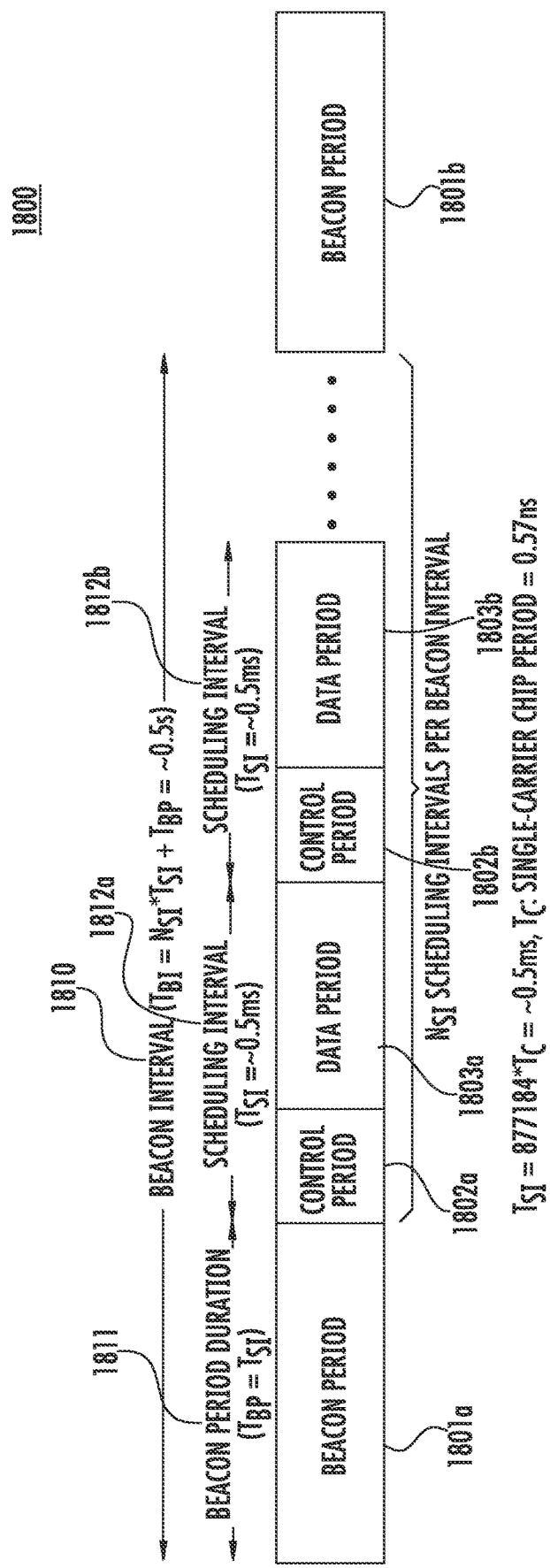
FIG. 18 is a diagram a diagram of an example mesh super-frame structure.

FIG. 18 is a diagram of an example mesh super-frame structure 1800, which may be used in any of the embodiments described herein. In the example illustrated in FIG. 18, each super-frame may start with the beacon period 1801a followed by multiple scheduling intervals 1812a and 1812b, each with a control period 1802a and 1802b respectively and data period 1803a and 1803b respectively. The next super-frame may begin with another beacon period 1801b. The control period may be, in turn, divided into multiple control slots, with each slot assigned to a different neighboring node. The beacon period duration ($T_{BP}$) 1811 may be the same as the scheduling intervals 1812a and 1812b ($T_{SI}$), which may all occur within the beacon interval 1810.

Figure 19:
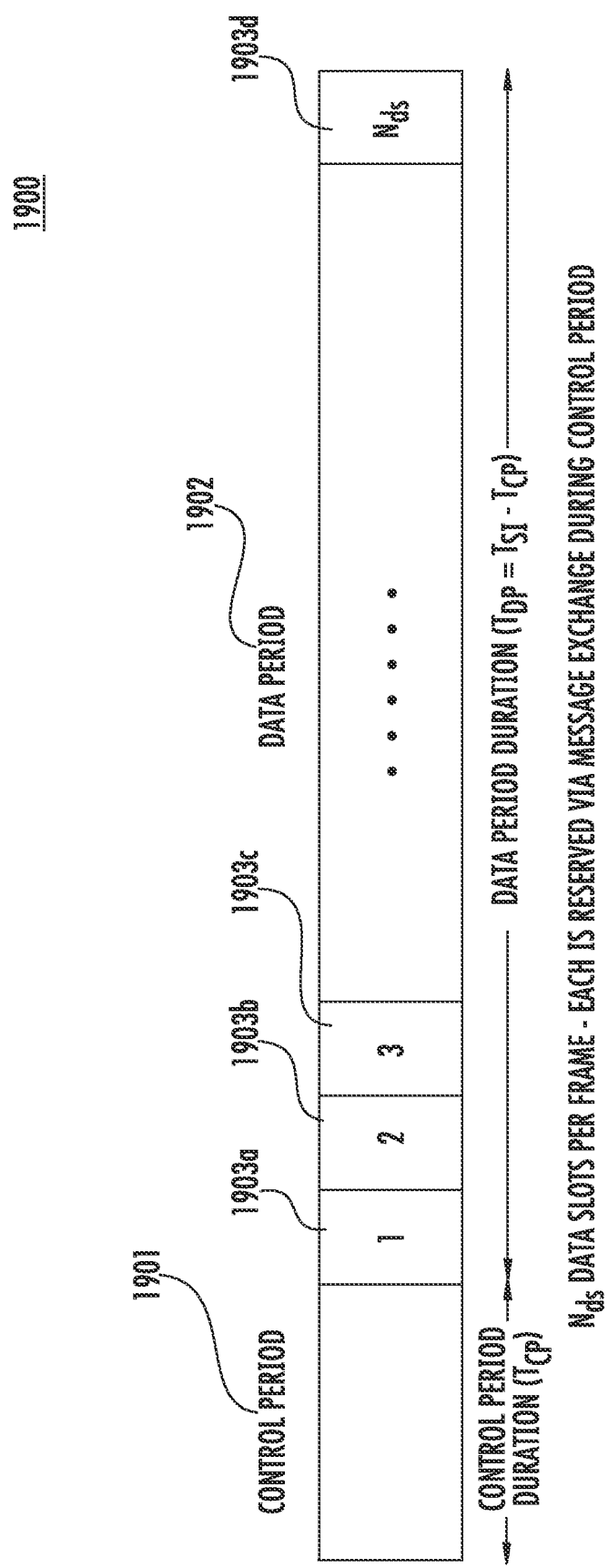
FIG. 19 is a diagram of an example frame for an example mesh super-frame structure.

FIG. 19 is a diagram of an example frame 1900 for the example mesh super-frame structure described above, which may be used in any of the embodiments described herein. In this example, control period 1901 may be followed by data period 1902 that may include data slots 1903a, 1903b, 1903c, and 1903d. In the example illustrated in FIG. 19, the data period is split into $N_{ds}$ data slots, which may be reserved by nodes via a schedule message exchange during the control period. These reservations may last only one scheduling interval for data packets belonging to low and high priority queues, which may allow the resource reservation mechanism to react to bursty traffic. At the same time, channel reservations may last multiple scheduling intervals for semi-persistent traffic, which may reduce the control message overhead.

Figure 20:
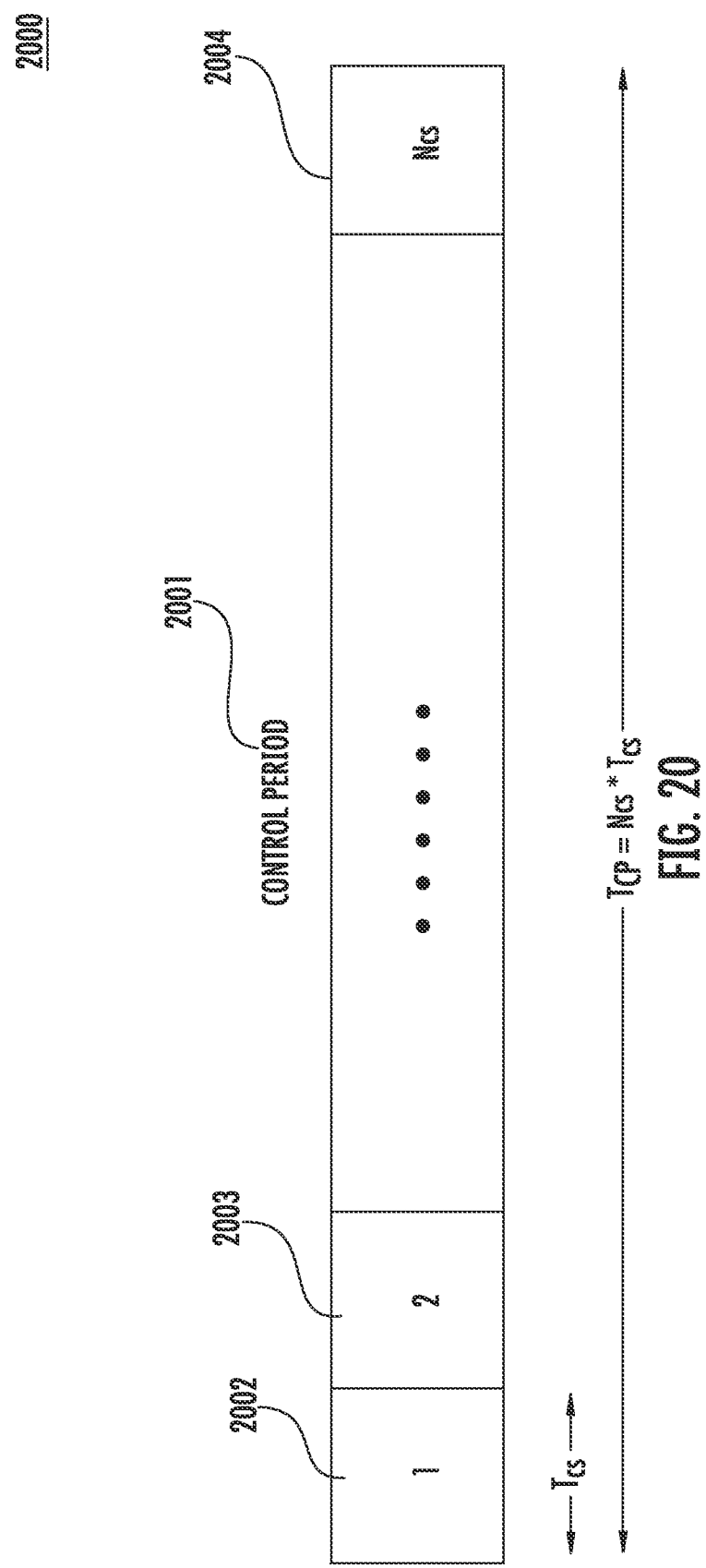
FIG. 20 is a diagram of an example control period for an example mesh super-frame structure.

FIG. 20 is a diagram of an example control period 2000 for the example mesh super-frame structure described above, which may be used in any of the embodiments described herein. In this example, control period 2001 may include control slots 2002, 2003, and 2004, each of which may be of duration $T_{cs}$. $N_{cs}$ may represent the number of control slots per frame, each of which may be reserved to exchange scheduling information with a particular neighbor. A mesh node may reserve control slots for each of its neighbors. This control slot assignment may occur right at the beginning when a node joins the mesh network. The assignment may be based on mutual availability of empty slots among neighbors and interference schedules. Once these slots are assigned they may remain fixed until changed by a mutual exchange of control messages.

Figure 21:
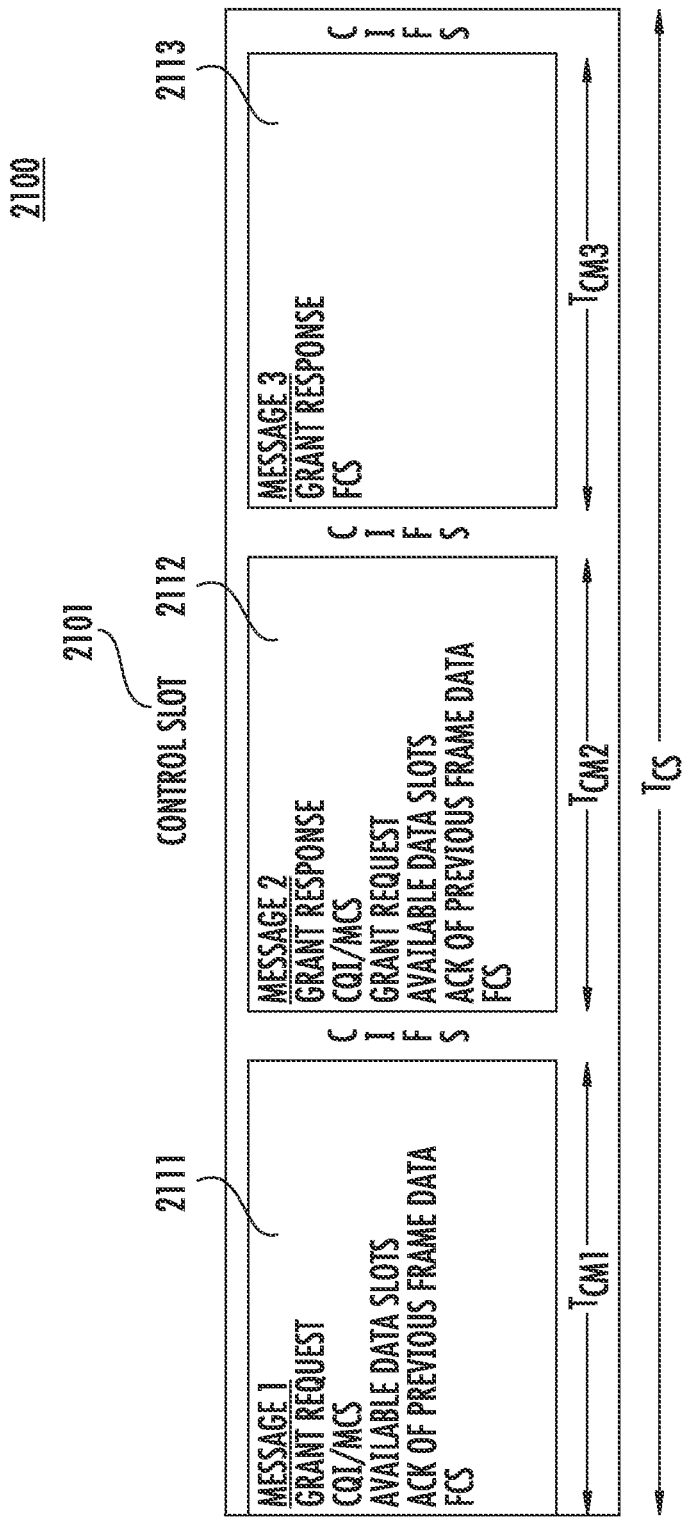
FIG. 21 is a diagram of example control slots for an example mesh super-frame structure.

FIG. 21 is a diagram of example control slots 2100 for the example mesh super-frame structure described above, which may be used in any of the embodiments described herein. With respect to control period message contents, each control slot 2101 may include three message transmissions 2111, 2112, and 2113. The message 1 2111 may be transmitted in the link's initial direction A→B, then B→A, then A→B. The messages may carry information as follows.

With respect to message 1 2111 (AB), this message may carry information including the number of data slots per queue grant request, possible transmit locations for grant, channel quality indicator information (CQI) (an estimate of the channel quality from B to A that may be signaled in terms of the requested modulation and coding scheme (MCS) level), ACK of previous frame data (B→A), and frame check sequence (FCS). With respect to the number of data slots per queue grant request, this may be a resource request from A to B and may be signaled as a combination of requested data slots and MCS/CQI, where the last known good CQI may indicate the approximate number of bits per data slot (a default value may be used if there is no last known good CQI). Resources may not be requested for data that is expected to be transmitted in semi-persistently scheduled resources. With respect to possible transmit locations for grant, Node A may indicate the data slots that are available for A to transmit to B. This may be represented either as a bitmap, with ones placed in positions corresponding to slots that A can transmit to B, or by indicating the start index and length of a consecutive series of free data slots. With respect to ACK of previous frame data (B→A), Node A may acknowledge successful reception of data packets from B in the previous scheduling interval. Two options may be included: a 1-bit ACK for the entire transmission from node B or a longer block ACK that may be used to acknowledge multiple frame segments. Frame segments may include individual MAC protocol data units (MPDUs) that are combined to form an aggregated-MPDU, and, after addition of PHY fields, a PHY protocol data unit (PPDU). Due to high correlation in the success or failure of individual MPDU reception within an A-MPDU, a 1-bit ACK may be sufficient. With respect to FCS, a short FCS is added to check for decoding errors.

With respect to message 2 2112 (B→A), this message may carry information including the number of data slots per queue grant request (this may be a resource request from B to A and may be signaled as a combination of requested data slots and MCS/CQI), possible transmit locations for grant, CQI (an estimate of the channel quality from A to B that may be signaled in terms of the requested MCS level), ACK of previous frame data (A→B), grant of resources for request in message 1 (Node B may grant data transmission slots to A based on its request and constraints due to previous allocations to other nodes), and FCS. With respect to possible transmit locations, Node B may indicate the data slots that are available for B to transmit to A. This may be represented either as a bitmap, with ones placed in positions corresponding to slots that B may transmit to A, or by indicating the start index and length of a consecutive series of free data slots. With respect to ACK of previous frame data (A→B), Node B may acknowledge successful reception of data packets from A in the previous scheduling interval. It may have the same format as the ACK present in Message 1. With respect to FCS, a short FCS may be added to check for decoding errors.

With respect to message 3 2113 (A→B), this message may carry information including grant of resources for request in message 2 (Node A may grant data transmission slots to B on its request and constraints due to previous allocations to other nodes) and FCS. With respect to FCS, a short FCS may be added to check for decoding errors.

With respect to semi-persistent traffic management, the MAC may handle semi-persistent traffic differently than bursty traffic. This is because semi-persistent traffic, which may include voice, real-time video or similar data types, is predictable and delay-sensitive. Therefore, the MAC may reserve network bandwidth beforehand for end-to-end data transfer for semi-persistent traffic. This may allow such traffic to be conveyed in a predictable manner, with approximately constant latency. Since the required transmission time is pre-allocated for semi-persistent traffic, no further resource allocation negotiation may be necessary in each scheduling interval for this traffic type.

Three phases may be involved in semi-persistent traffic management: a route management phase, a semi-persistent traffic transmission phase and a route termination phase.

During the route setup phase, an end-to-end route may be determined for the admitted semi-persistent traffic flow. Simultaneously, a transmission schedule may also be established that satisfies the required service rate of the admitted flow. The end node may send a semi-persistent traffic request message to the neighbor that lies on the optimum path to the destination. This message may be forwarded by the receiving node to its one-hop neighbor along the previously identified optimum path to destination until the message reaches the destination. The destination node may then send a semi-persistent traffic response message to the source node along the same path. When each node along the path receives the semi-persistent traffic response message, it may confirm that the route setup and resources are reserved appropriately in future scheduling intervals.

After the end-to-end route setup and schedule determination steps are completed during the route setup phase, regular data transmission may occur along the identified path according to the established schedule. Semi-persistent traffic may not be included in the reported queues for resource allocation. The initiating node may periodically compare the path metric of the currently chosen path against others to determine if an alternate better path exists to reach the destination node. This may involve evaluating the path metrics of each route reported by the routing function. If such an alternate route is identified with a better overall path metric, a route change procedure may be triggered, which may include back-to-back route setup on the new route and route termination over the old route.

Any node along a route that is previously established for semi-persistent traffic may initiate route termination by sending a semi-persistent traffic request message to nodes at either end of the route. Route termination may be confirmed by receiving semi-persistent traffic response messages from both end nodes. This phase may free up resources at each node along the route.

Semi-persistent traffic may be more robustly encoded compared to bursty traffic due to limited re-transmission opportunities at each hop between source and destination. This may be required so that the same packet error rate (PER) may be achieved for semi-persistent traffic and bursty traffic with up to one re-transmission opportunity per hop.

A route setup procedure may use semi-persistent traffic request and semi-persistent traffic response messages to the end-to-end route. In an example route setup procedure, a source node may determine the optimum route for the semi-persistent traffic flow based on destination node, QoS and current route metrics. If the source node does not know a route to the destination for required QoS class, then a first routing procedure may be performed to identify a suitable path. If a distance vector routing is employed, the source node may not know the entire route to the destination but it may know the relative metrics of the different paths flowing through different neighboring nodes. This may enable it to choose the next hop for the traffic.

A source may send a semi-persistent traffic request message to the one-hop neighbor that is part of the chosen path. The combination source node ID, destination node ID and flow ID may uniquely identify the end-to-end flow. The mean packet size, periodicity and start time of the flow may be included in the message.

The receiving mesh node may increment both the requested start time and the new start time by 2. It may then determine if it may admit the new semi-persistent traffic flow, resulting in one of the following decisions. The node does not support semi-persistent traffic, in which case a semi-persistent traffic response message may be sent to the source node along the path through which the semi-persistent traffic request message was received, with Response Code=1 failure. The requested start time may be acceptable and preferred over a new start time, if present. Here, the vote field may be decremented by one, and the semi-persistent traffic request message may be forwarded to the next node on the route. The requested start time may be acceptable, but another start time or the new start time (if present) may be preferred. The vote field may be incremented by one, and the semi-persistent traffic request message may be forwarded to the next node on the route. The requested start time may be unacceptable. Then another start time may be placed in the requested start time field, and the modify code may be changed to 1. If, in addition, the new start time is also not acceptable, then it, too, may be replaced by another start time, and vote may be reset to 0. The modified semi-persistent traffic request message may be forwarded to the next node on the route.

When the destination node receives a semi-persistent traffic request message, it may determine a preferred start time by examining the votes for the new start time. On a condition that there is a tie, the requested start time may be preferred. It may then determine if it can admit the new semi-persistent traffic flow, resulting in one of the following decisions. If neither the requested nor new start time is acceptable, a semi-persistent traffic response message may be sent to the node from which the request message was received with response code=1 (failure). If either of the requested or new start times is acceptable, then a semi-persistent traffic response message may be sent to the neighbor node that sent the request message with response code=0 (success), and the start time 1 and start time 2 fields in the semi-persistent traffic response message include the first and the second choices for the start times. If both start time 1 and start time 2 are present, then a vote field in favor of start time 1 may also be added and initialized to 1.

Each node receiving the semi-persistent traffic response message may examine whether the two start times are acceptable. If start time 1 is found unacceptable, then it may be replaced by start time 2 and the vote field may be discarded. If start time 2 is found unacceptable, then it may be discarded along with the vote field. Each node receiving the semi-persistent traffic response message may update the two start times by decrementing by 2 before forwarding to the next hop.

When the source node receives a semi-persistent traffic response message with response code=0 (success), it may indicate a successful path creation. If the semi-persistent traffic response message includes a single start time, then this phase may be terminated. If the semi-persistent traffic response message includes two start times, the source node may choose one of them based on the votes or other factors. Then a semi-persistent traffic response message may be sent to the destination node along the selected path. This may be required to inform each node along the chosen path which of the start times is selected by the source node.

If the route selection procedure results in failure, the source node may try to find an alternate path to the destination through another neighbor. Then the entire procedure may be repeated along the new route.

A central entity (e.g., OAM center) may be able to schedule semi-persistent traffic flows over multiple hops that allows aggregation possibilities along the way. To enable this, the requesting mesh node may send a semi-persistent route request message with Mode=1, which may signal a request for central scheduling.

Figure 22:
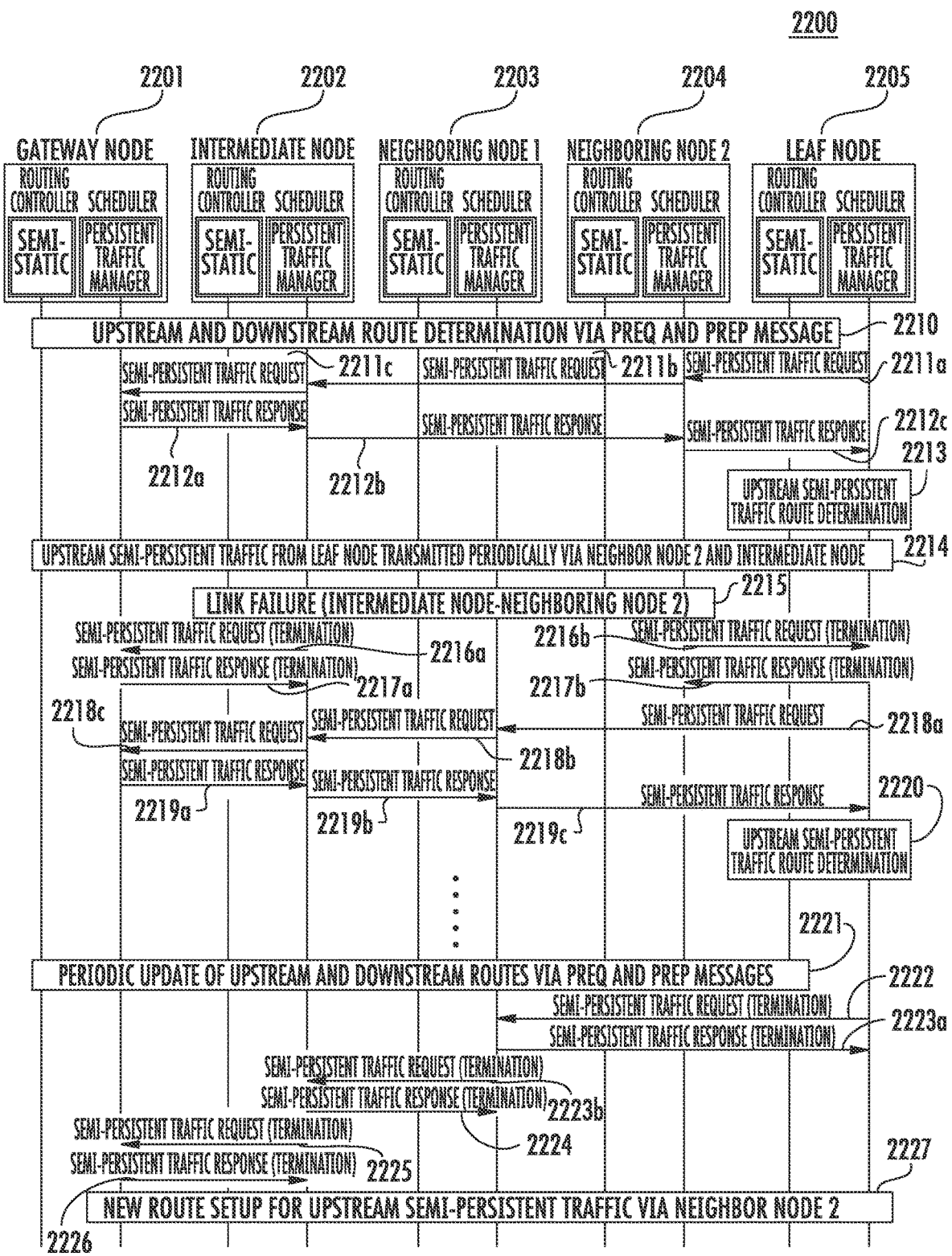
FIG. 22 is a diagram of an example semi-persistent route setup and termination procedure.

FIG. 22 is a diagram of an example semi-persistent route setup and termination procedure 2200 in accordance with the procedure described above. In this example, three situations are shown: initial end-to-end route setup, route update due to intermediate link failure, and link update due to periodic semi-static link re-evaluation. In this example, upstream and downstream routes may be determined via PREP and PREQ messages 2210. Leaf node 2205 may transmit a semi-persistent traffic request 2211a to neighboring node 2 2204, which may forward the semi-persistent traffic request 2211b to intermediate node 2202, which may forward the semi-persistent traffic request 2211c to the gateway node 2201. Gateway node 2201 then may forward a semi-persistent traffic response 2212a to intermediate node 2202, which may forward the semi-persistent traffic response 2212b to neighboring node 2 2204 and then forward the semi-persistent traffic response 2212c to leaf node 2205. Leaf node 2205 may then determine an upstream semi-persistent traffic route 2213. Upstream semi-persistent traffic may then be transmitted 2214 from leaf node 2205 periodically via neighbor 2 2204 and intermediate node 2202.

In this example, the link between the intermediate node 2202 to neighboring node 2 2204 fails 2215. Intermediate node 2202 may then transmit a semi-persistent traffic request 2216a to gateway node 2201. Gateway node 2201 may then transmit a semi-persistent traffic response 2217a to intermediate node 2202. Similarly, neighboring node 2204 may then transmit a semi-persistent traffic request 2216b to leaf node 2205. Leaf node 2205 may then transmit a semi-persistent traffic response 2217b to neighboring node 2204.

Leaf node 2205 may transmit a semi-persistent traffic request 2218a to neighboring node 1 2203, which may forward the semi-persistent traffic request 2218b to intermediate node 2202, which may forward the semi-persistent traffic request 2218c to the gateway node 2201. Gateway node 2201 then may forward a semi-persistent traffic response 2219a to intermediate node 2202, which may forward the semi-persistent traffic response 2219b to neighboring node 1 2203 and then forward the semi-persistent traffic response 2219c to leaf node 2205. Leaf node 2205 may then determine an upstream semi-persistent traffic route 2220.

The upstream and downstream routes may also be updated periodically via PREQ and PREP messages 2221. In this example, leaf node 2205 may transmit a semi-persistent traffic request termination 2222 to neighboring node 1 2203, which may respond with a semi-persistent traffic response termination 2223a. Neighboring node 1 2203 may then transmit a semi-persistent traffic request termination 2223b to intermediate node 2202, which may respond with a semi-persistent traffic response termination 2224. Intermediate node 2202 may then transmit a semi-persistent traffic request termination 2225 to gateway node 2201, which may respond with a semi-persistent traffic response termination 2226. A new route may then be setup for upstream semi-persistent traffic via neighbor node 2 2227.

Figure 23:
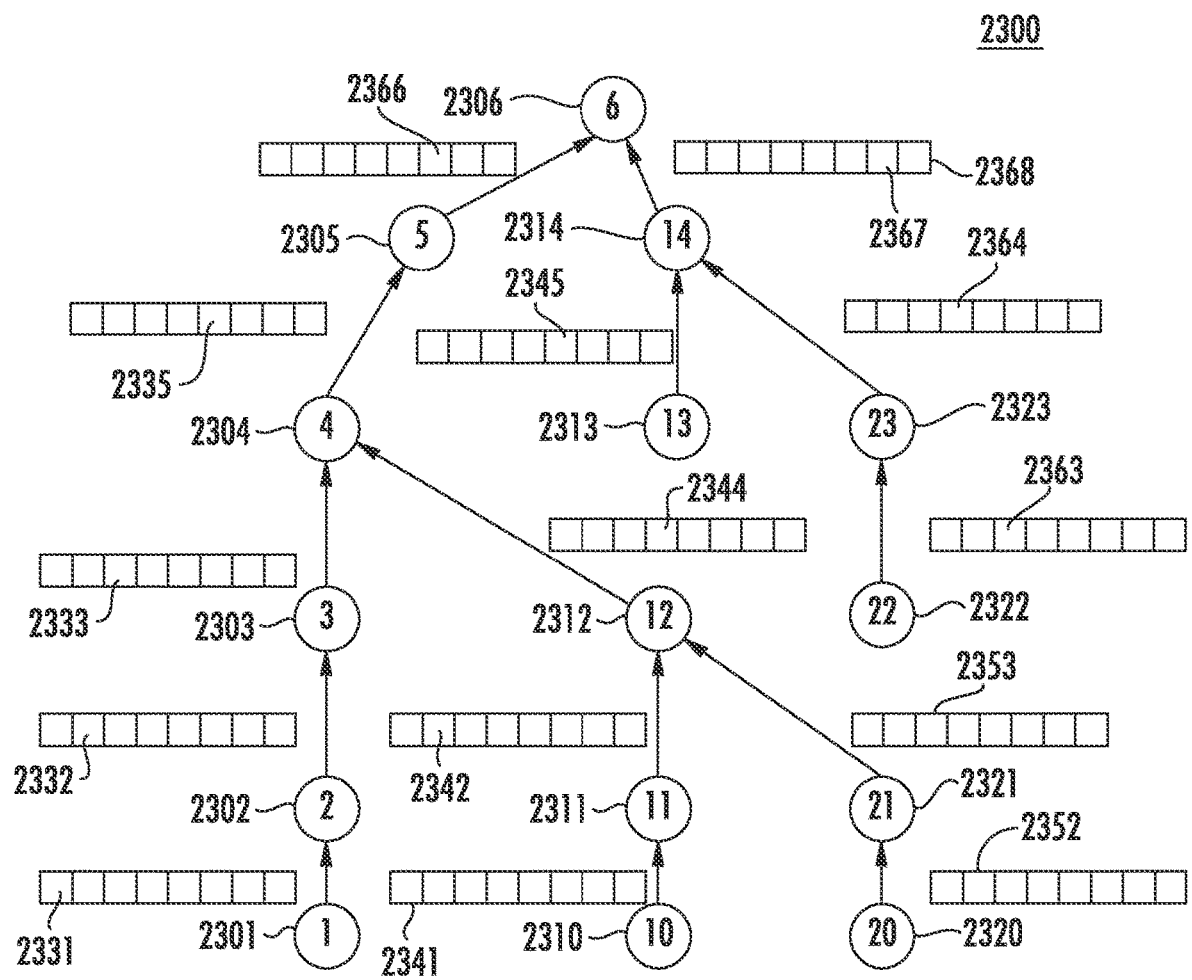
FIG. 23 is a diagram of an example centrally scheduled semi-persistent schedule that allows aggregation of multiple traffic streams in the upstream direction.

FIG. 23 is a diagram of an example centrally scheduled semi-persistent schedule that allows aggregation of multiple traffic streams in the upstream direction 2300. Similar scheduling of traffic in the downstream direction may also be possible. A number of route setup options may be possible for semi-persistent traffic flow. For example, a route for semi-persistent traffic may be set up only when required. Here, the mesh node may initiate route setup only when admission control indicates semi-persistent flow admittance. As shown in the example of FIG. 23, the next hop is granted only if the next hop shortly follows the previous hops in all links of sink tree such that the shortest delay is achieved. In the path from node 1 2301 to node 6 2306 via node 2 2302, node 3 2303, node 4 2304, and node 5 2305, slots 2331, 2332, 2333, 2335, and 2366 are used. In the path from node 10 2310 to node 6 2306 via node 11 2311, node 12 2312, node 4 2304, and node 5 2305, slots 2341, 2342, 2344, 2335, and 2366 are used. In the path from node 13 2313 to node 6 2306 via node 14 2314, slots 2345 and 2367 are used. In the path from node 20 2320 to node 6 2306 via node 21 2321, node 12 2312, node 4 2304, and node 5 2305, slots 2352, 2353, 2344, 2335, and 2366 are used. In the path from node 22 2322 to node 6 2306 via node 23 2323, node 14 2314, slots 2363, 2364, and 2368 are used.

In another example, the semi-persistent route may be set up in advance. Moreover, these routes may be set up with appropriate delays so that latency constraints on the traffic flows are satisfied. Here, advance knowledge of semi-persistent traffic admission may not be required at the mesh node. For another example, a semi-persistent traffic route may be set up for an existing traffic flow when it is determined to meet semi-persistent traffic criteria. So, here, the packets from the flow may initially be treated as ordinary bursty traffic, and upon determination of semi-persistent characteristics, an end-to-end route may be set up as described above. Similar to the previous option, no prior knowledge of semi-persistent traffic admission from the access side may be required here.

FIG. 24 is a diagram of an example initial path setup and data transfer initialization at a newly associated node 2400. For example, a gateway node may periodically send out path request (PREQ) messages to all its neighbors. These messages may be, in turn, forwarded by the receiving nodes until they reach the leaf nodes. These messages may be updated with link metrics at each stage. Each mesh node may receive multiple PREP messages but may forward only the best cumulative path metric to its one-hop neighbors, after waiting for a certain duration to make sure that it receives all PREQ messages. The new node may determine the best routes to the gateway node for each QoS class and then send path response (PREP) messages along each identified path. These messages may be sent through all paths in decreasing order of cumulative link metrics. This may establish multiple end-to-end downstream routes from the leaf node to the gateway node for each QoS class. When the PREP messages reach the gateway node, they may establish upstream routes from the leaf node to the gateway node.

Figure 24A:
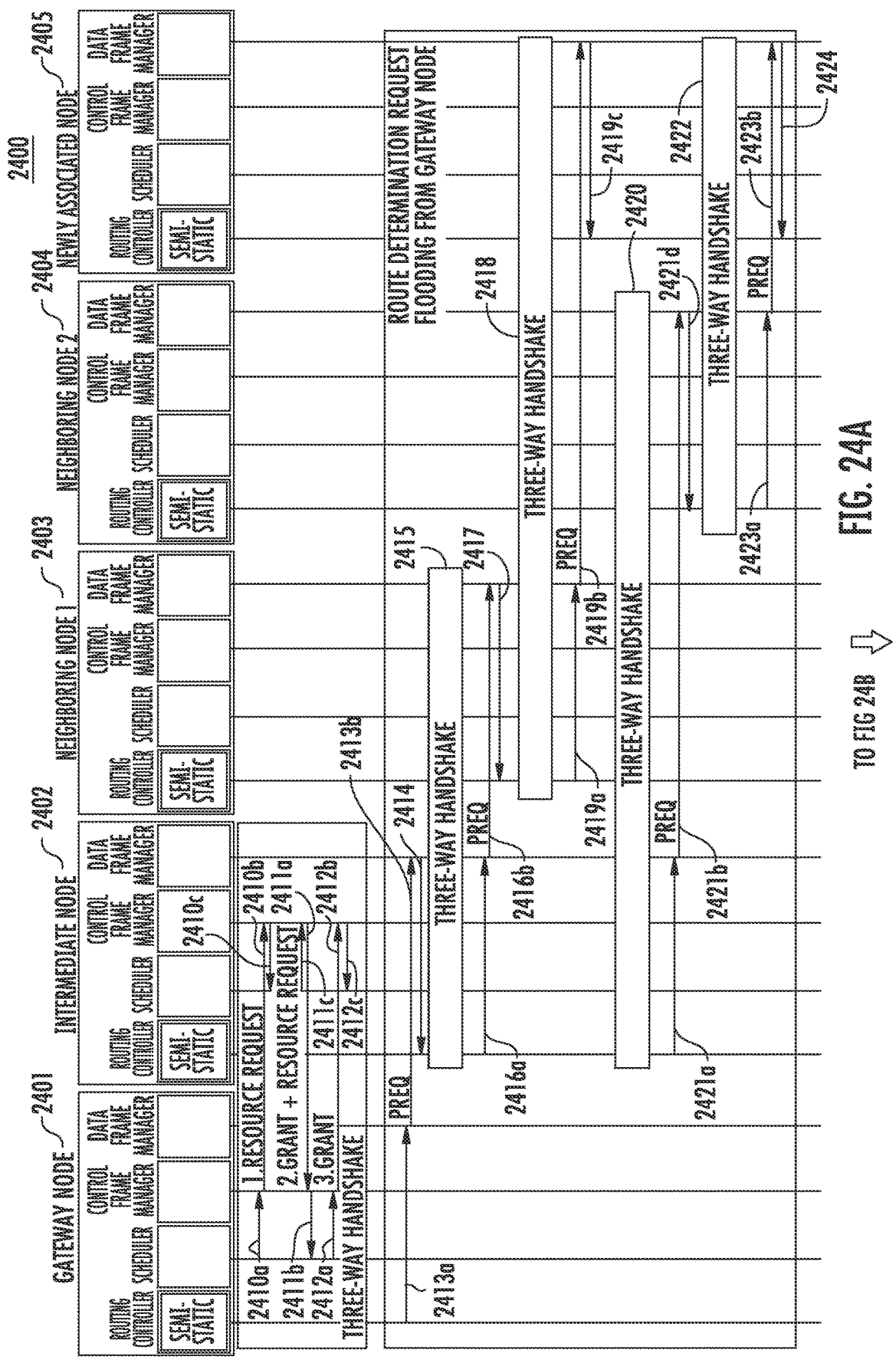
FIG. 24A is a diagram of an example initial path setup and data transfer initialization at a newly associated node.
Figure 24B:
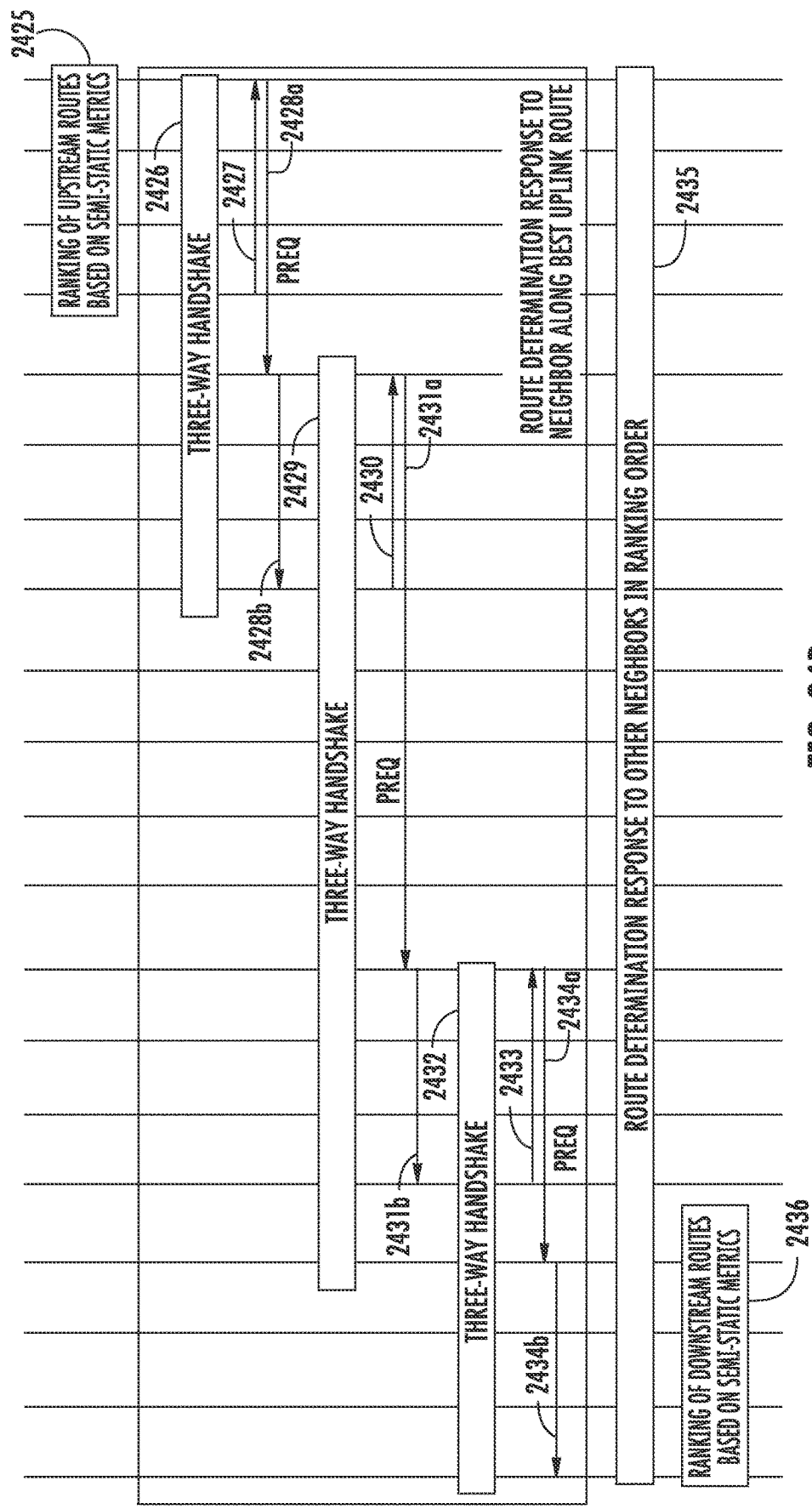
FIG. 24B is a diagram continuing the example initial path setup and data transfer initialization at a newly associated node.

In the example of FIG. 24A-24B, gateway node 2401 and intermediate node 2402 may perform a three way handshake comprising a resource request 2410b, a grant and resource request 2411a, and grant 2412b message. Gateway node 2401 may perform this signaling by exchanging messages between its internal scheduler and control frame manager 2410a, 2411b, and 2412a. Similarly, intermediate node 2402 may perform this signaling by exchanging messages between its internal scheduler and control frame manager 2410c, 2411c, and 2412c. Route determination is also shown in this example. Following receipt by its data frame manager of routing control message 2413a from its internal routing controller, gateway node 2401 may send PREQ 2413b to intermediate node 2402. The routing controller of intermediate node 2402 may then receive a data frame management message 2414 from its data frame manager.

Intermediate node 2402 and neighboring node 1 2403 may then perform three way handshake 2415. Following receipt by its data frame manager of routing control message 2416a from its internal routing controller, intermediate node 2402 may send PREQ 2416b to neighboring node 1 2403. The routing controller of neighboring node 1 2403 may then receive a data frame management message 2417 from its data frame manager.

Neighboring node 1 2403 and newly associated node 2405 may then perform three way handshake 2418. Following receipt by its data frame manager of routing control message 2419a from its internal routing controller, neighboring node 1 2403 may send PREQ 2419b to newly associated node 2405. The routing controller of newly associated node 2405 may then receive a data frame management message 2419c from its data frame manager.

Intermediate node 2402 and neighboring node 2 2404 may then perform three way handshake 2420. Following receipt by its data frame manager of routing control message 2421a from its internal routing controller, intermediate node 2402 may send PREQ 2421b to neighboring node 2404. The routing controller of neighboring node 2404 may then receive a data frame management message 2421d from its data frame manager.

Neighboring node 2 2404 and newly associated node 2405 may then perform three way handshake 2422. Following receipt by its data frame manager of routing control message 2423a from its internal routing controller, neighboring node 2404 may send PREQ 2423b to newly associated node 2405. The routing controller of newly associated node 2405 may then receive a data frame management message 2424 from its data frame manager.

Following these exchanges, a ranking of upstream routes based on semi-static metrics may be produced 2425.

Newly associated node 2405 and neighboring node 2 2404 may then perform three way handshake 2426. Following receipt by its data frame manager of routing control message 2427 from its internal routing controller, newly associated node 2405 may send PREQ 2428a to neighboring node 2 2404. The routing controller of neighboring node 2 2404 may then receive a data frame management message 2428b from its data frame manager.

Neighboring node 2 2404 and intermediate node 2402 may then perform three way handshake 2429. Following receipt by its data frame manager of routing control message 2430 from its internal routing controller, neighboring node 2 2404 may send PREQ 2431a to intermediate node 2402. The routing controller of intermediate node 2402 may then receive a data frame management message 2431b from its data frame manager.

Intermediate node 2402 and gateway node 2401 may then perform three way handshake 2432. Following receipt by its data frame manager of routing control message 2433 from its internal routing controller, intermediate node 2402 may send PREQ 2434a to gateway node 2401. The routing controller of gateway node 2401 may then receive a data frame management message 2434b from its data frame manager.

Following these exchanges, a route determination response in ranking order may then be transmitted to the neighboring nodes 2435. Finally, a ranking of downstream routes based on semi-static metrics may be produced 2436.

In an embodiment, a scheduler that is based on the initial scheduler design described above, but is modular in nature, may be used. A scheduler operation for this example scheduler may include a transmission resource allocation step and a channel reservation step.

Both objectives may be achieved via three-way exchange of information between the pair of nodes described above. In the first message, the initiating node may request transmission resources in terms of required data slots and CQI. It may indicate its availability for data transmission in the slots via transmission schedule bitmap. The responding node may determine resource allocation based on received requests and other requests received or anticipated from its other one-hop neighbors. The transmission schedule may be determined based on resource allocation decisions and mutually available data slots that are free for transmission by the initiating node and for reception by the receiving node. In addition, interference from other mesh nodes may limit scheduling choices. The scheduling decision may be conveyed to the initiating node in the second message. This may include the allotted data transmission slots and associated MCS. Additionally, the responding node may also include its resource request and transmission schedule in the same message sent to the initiating node. The initiating node may then determine the resource allocation and transmission schedule for the reverse direction and convey its decision in the third message in the exchange.

As described above, semi-persistent traffic may not be scheduled in each scheduling interval as with bursty traffic. Instead, semi-persistent traffic packets may be sent across the route and in accordance with the schedule determined during flow admittance. Due to the fact that a data packet may be required to cover 5 hops to reach its destination within the mesh, and each hop may require a 0.5 ms scheduling interval, the end-to-end delay for sending a data packet may be up to 2.5 ms. Imposing a 5 ms latency limit for end-to-end packet delivery may lead to 5 additional scheduling interval opportunities for re-transmissions. Spreading out these re-transmission opportunities across each hop may result in one possible re-transmission opportunity per hop. This may also ensure that packet arrivals at a destination experience minimal latency jitter.

Figure 25:
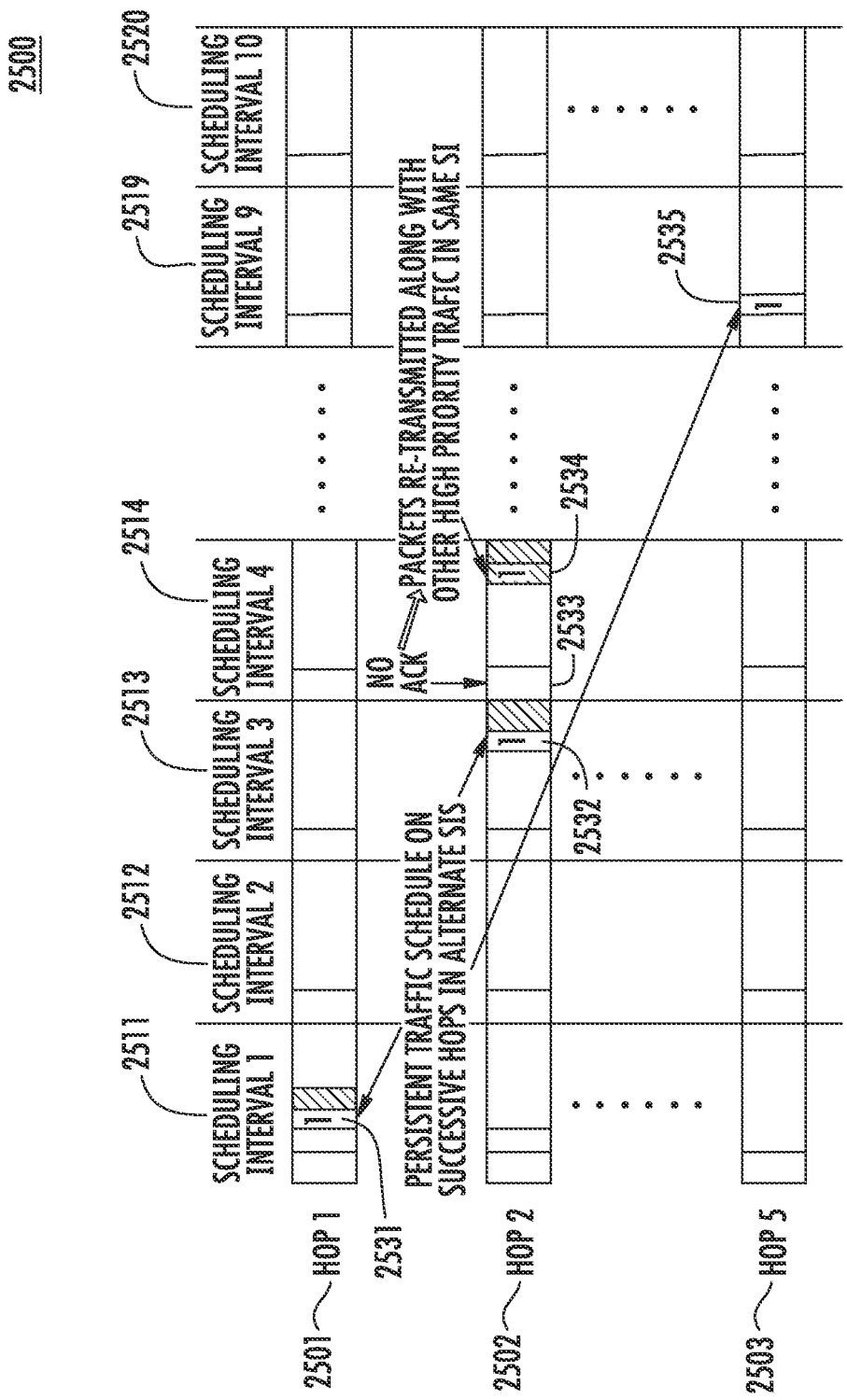
FIG. 25 is a diagram of an example semi-persistent traffic scheduling scheme across multiple hops.

FIG. 25 is a diagram of an example semi-persistent traffic scheduling scheme across multiple hops 2500, which may be performed in any of the embodiments described herein. In order to meet the PER requirements for semi-persistent traffic, more robust encoding of data packets may be required. Bursty traffic packets may be allowed more than one re-transmission opportunity per hop, as required, because they may follow hop-by-hop routing and scheduling. So, it is possible to schedule multiple re-transmissions on some hops and still meet the end-to-end timing budget. On the other hand, persistent traffic across multiple hops may be scheduled every alternate scheduling interval to allow for one re-transmission opportunity at each. In this example traffic may be scheduled from through hop 1 2501 and hop 2 2502 to hop 5 2503 during the available scheduling intervals, scheduling interval 1 2511, scheduling interval 2 2512, scheduling interval 3 2513, scheduling interval 4 2514 to scheduling interval 9 2519, and scheduling interval 10 2520. As shown, the data packet is scheduled to be transmitted from hop 1 2531 to hop 2 2532 in scheduling interval 1 2511. When no ACK is received 2533 following transmission in scheduling interval 3 2513, the data packet is retransmitted 2534 in scheduling interval 4 2514. The data packet 2535 is then received at hop 5 during scheduling interval 9 2519.

Due to limited re-transmission opportunities for semi-persistent traffic on each hop, these data packets may be encoded more robustly than bursty data packets, both for initial transmission and re-transmission. As a result, semi-persistent and bursty traffic packets between a node pair in the same scheduling interval may be transmitted as two separate Physical Layer Convergence Protocol (PLCP) protocol data units (PPDUs), each with their own preamble and header.

The scheduler may classify data into three priority levels: close-to-deadline data traffic+high-priority control messages, high priority data traffic and low priority data traffic+ low priority control messages. Traffic from priority levels 1 and 2 may be serviced in the current scheduling interval, whereas priority level 3 traffic may be serviced on a best effort basis, with some minimum service guarantee. This may ensure that the higher priority traffic is adequately serviced without completely starving low priority traffic. Priority levels 2 and 3 include multiple QoS levels each. Two such classifications are high priority data traffic (e.g., LTE QCI 1-4; IEEE 802.11 AC_VO, AC_VI) and low priority data traffic (e.g., LTE QCI 5-9; IEEE 802.11 AC_BE, AC_BK). Control messages may be classified in different priority classes, including high priority control messages (e.g., route error message, semi-persistent traffic request/response) and low priority control messages (e.g., interference measurement reports and semi-static link metric reports).

Scheduler operation may be split in two phases: resource allocation and scheduling. The resource allocation phase may involve message exchange between a pair of nodes to allocate mutually available transmission resources. For example, node A may send queue lengths (BSRs) and available data transmission slots to node B. The BSR may be signaled via a combination of data slot requests and MCS level or actual queue lengths. Resource allocation may be performed by the receiving node. The Node B may determine resource allocation based on three factors: requested resources for each priority level, mutually available data slots (transmission slots of node A and reception slots of node B), and a scheduling algorithm that may ensure fairness in resource sharing. During the scheduling phase, the transmitting node (node A in this example) may determine the actual packets to fetch from appropriate queues based on the resource allocation grant received from the receiving node.

The scheduler block may include three major functions or sub-blocks: resource allocation, scheduler and semi-persistent traffic manager. Resource allocation and scheduling may include several steps, including resource allocation for semi-persistent traffic, resource allocation split estimation for bursty traffic in a current scheduling interval, actual resource allocation, and scheduling allocated resources.

With respect to resource allocation for semi-persistent traffic, transmission resources for semi-persistent traffic may not be reserved first. Bursty traffic may be accommodated in the remaining resources in the scheduling interval.

Resource allocation split estimation for bursty traffic in a current scheduling interval may be based on the average of past $N_{avg}$ resource requests from each neighbor for each priority level. This may produce the long-term baseline for each priority level. The resource allocation for priority levels 1+2 may be capped at a particular threshold so that priority level 3 traffic receives some minimum service in each scheduling interval. The threshold value may depend on the resource estimate of priority level 3 traffic load.

Actual resource allocation may depend on the actual resource allocation request received from each neighbor in a scheduling interval. These requests may be more or less than the allocation estimates calculated based on previous estimates. If the actual request is less than the calculated estimate, the requested resources may be allocated. If the requested resources are more than the estimated value, the actual allocation may exceed the estimate by a certain amount. This excess allocation is related to the "burstiness" of traffic or resource requests in that specific priority level. Essentially, the standard deviation of the last $N_{avg}$ resource requests for a particular priority level sets the excess resource allocation amount limit for that priority level. This excess resource allocation may allow the scheduler to react to spikes in demand from certain neighbors and provide fairness to all neighbors, while at the same time maintaining baseline traffic estimates based on long-term averages.

With respect to scheduling allocated resources, an actual transmission schedule may be determined based on the resource allocation, mutually available data slots and any interference schedules, if available.

Figure 26:
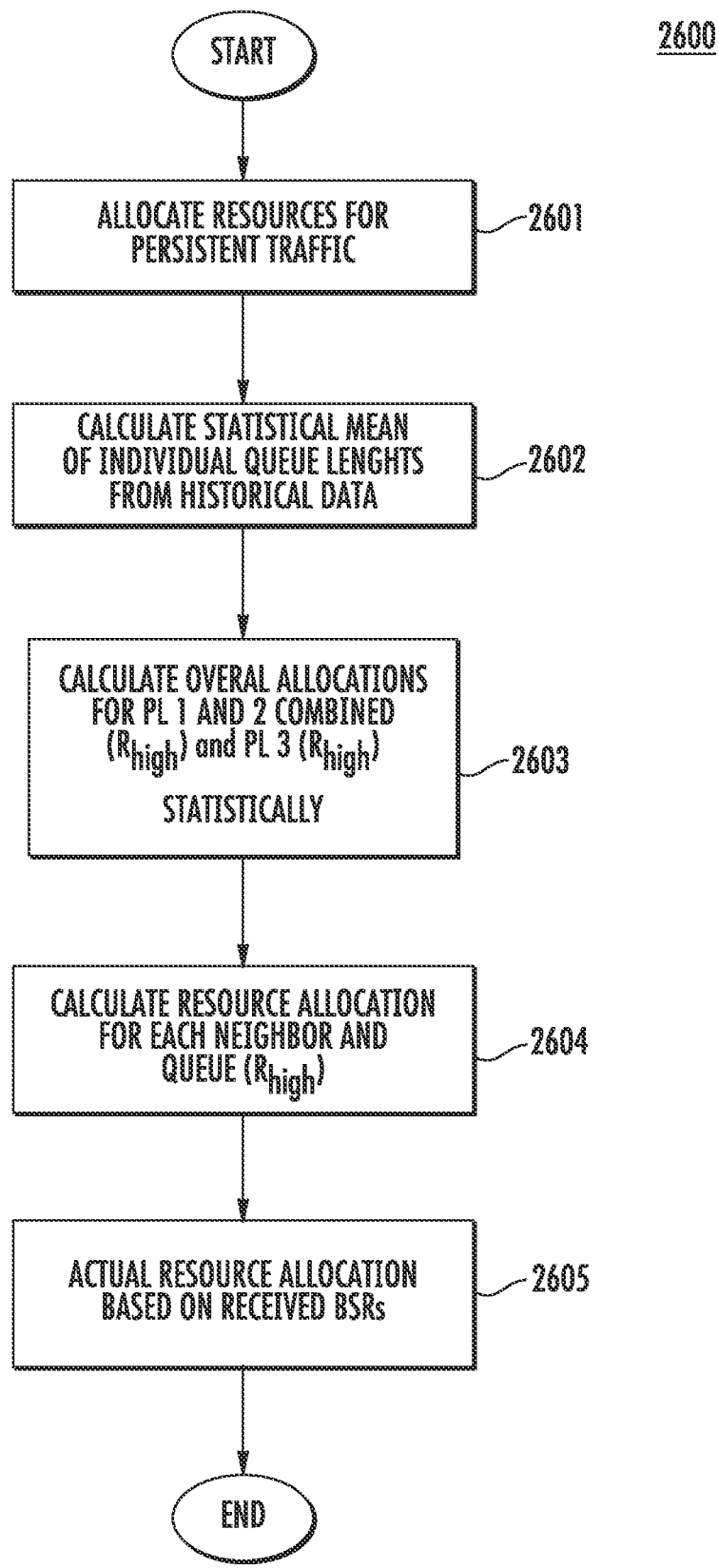
FIG. 26 is an example resource allocation and scheduling operation.

FIG. 26 is an example resource allocation and scheduling operation 2600. The resource allocation and scheduling operation may begin by allocating resources for semi-persistent traffic 2601.

Next, the statistical mean of individual queue lengths from historical data may be calculated 2602 in accordance with the following:

$$\overline{q}_{ij} = \frac{1}{N_{avg}} \sum_{k=1}^{N} q_{i,j}(k) \quad \text{(Equation 1)}$$

wherein $q_{i,j}(k)$ is the length of $j^{th}$ queue of $i^{th}$ neighbor received at $k^{th}$ previous scheduling interval.

$$\sigma_q = \sqrt{\frac{1}{N_{avg}} \sum_{k=1}^{N} (q_{i,j}(k) - \overline{q}_{i,j})^2} \quad \text{(Equation 2)}$$

wherein $\sigma_{q_{i,j}}$ is the standard deviation of previously reported lengths of $j^{th}$ queue of $i^{th}$ neighbor.

$$Q_j = \Sigma_{i=1}^{N_{link}} \overline{q}_{i,j}, j=1,2,3 \quad \text{(Equation 3)}$$

wherein $Q_1$ is the estimated total traffic volume belonging to $j_{th}$ priority level from all neighbors.

Next, the overall allocations for priority level 1 and priority level 2 combined ($R_{high}$) and priority level 3 ($R_{low}$) statistically may be calculated 2603 in accordance with the following:

(1) In this case, statistically, required resources for all queues are less than available resources:

$$R_{high} = Q_1 + Q_2; R_{low} = Q_3 \quad \text{(Equation 4)}$$

(2) In this case, statistically, $Q_1+Q_2$ is small, but $Q_3$ large (i.e. there are not enough resources:

$$R_{low\_min} = \text{Min allocation required for } R_{low} \quad \text{(Equation 5)}$$

$$R_{high} = Q_1 + Q_2; R_{low} = R - R_{high} \quad \text{(Equation 6)}$$

$$R_{low\_min} = n * Q_3; n: \text{configurable parameter} \quad \text{(Equation 7)}$$

(3) In this case, both $Q_1+Q_2$ and $Q_3$ are large (i.e. there are not enough resources:

$$R_{low_{min}}=\text{Min allocation required for } R_{low} \quad \text{(Equation 8)}$$

$$R_{high}=R-R_{low\_min}; R_{low}=R_{low\_min} \quad \text{(Equation 9)}$$

$$R_{low\_min}=n*Q_3; n: \text{configurable parameter} \quad \text{(Equation 10)}$$

Next, the resource allocation for each neighbor and queue may be calculated 2604 in accordance with the following:

$$\text{For } j=1,2 \; R_{i,j}=\left\lceil \frac{\overline{q}_{i,j}}{Q_j} \cdot R_{high} \right\rceil; \quad \text{(Equation 11)}$$

$$\text{For } j=3 \; R_{i,j}=\left\lceil \frac{\overline{q}_{i,j}}{Q_j} \cdot R_{low} \right\rceil \quad \text{(Equation 12)}$$

Finally, the actual resource allocation based on received BSRs may be calculated 2605 in accordance with the following:

$$\text{For } j=1,2 \; R'_{i,j}=\min(q_{i,j}(0),R_{i,j}+\sigma_{qij}-R_i^{unavailable}) \quad \text{(Equation 13)}$$

$$\text{For } j=3 \; R'_{i,j}=\min(q_{i,j}(0),R_{i,j}-R_i^{unavailable}) \quad \text{(Equation 14)}$$

wherein $q_{i,j}(0)$ is the length of $j^{th}$ queue of $i^{th}$ neighbor received in current BSR and $R_i^{unavailable}$ is the unavailable resources for $i^{th}$ neighbor due to scheduling conflicts.

The determination of the packets that are transmitted in the data period of the current scheduling interval may be made by the transmitting node based on the received schedule determined by the receiving node and conveyed in the control period. Based on the received schedule, the transmitting node may decide the number of packets from each queue that will be transmitted in the allotted time. The transmitting node may compute the resources split among the priority levels in the same way as done at the receiving node and may determine the resources allocated for high priority traffic $R_{High}$ (priority levels 1 and 2 combined) and low priority traffic, $R_{Low}$ (priority level 3), such that $R_{High}+R_{Low}=R_{Total}$ is satisfied. It may then construct the PPDU to be transmitted.

Figure 27:
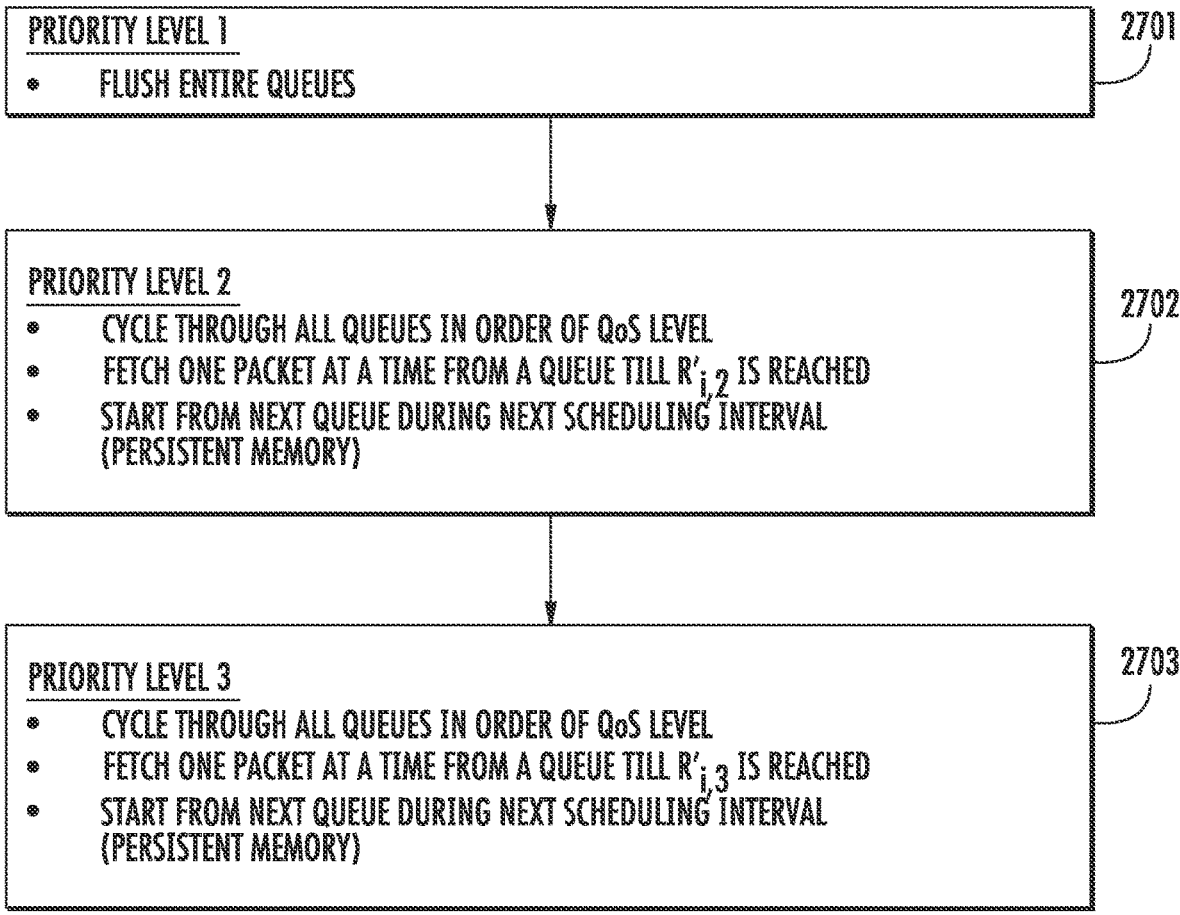
FIG. 27 is a flow diagram of an example queue servicing protocol.

FIG. 27 is a flow diagram of an example queue servicing protocol 2700. The protocol illustrated in this example may include three steps. In step one 2701, all contents in the queues belonging to priority level 1 are included in the PPDU. In a second step 2702, one packet from each queue belonging to priority level 2 is chosen in a round-robin fashion until $R_{High}$ is reached. In a third step 2703, packets are chosen from queues belonging to priority level 3 in round-robin fashion until $R_{Low}$ is reached. This protocol may assume that the queue manager retains memory of the queues serviced in priority levels 2 and 3, in between consecutive scheduling intervals.

The semi-static routing algorithm described above may produce multiple candidate paths between the source and the destination nodes that may exceed some path metric threshold level. However, the semi-static path metrics may be exchanged somewhat infrequently to limit signaling overhead. Therefore, the frequency of nodes reacting to network condition changes may be limited to the metric refresh rate. However, based on scheduler decisions, nodes may react to local traffic variations in between complete path metric refresh instances.

The semi-static routing algorithm output may include multiple paths between the source and destination nodes. Consider one such route that may be selected by the routing algorithm with $N_i$ hops. Then its airtime link metric may be:

$$c_{a_i} = \sum_{i=1}^{N_i} \left(O_i + \frac{B_t}{r_i}\right)\frac{1}{1-e_{f_i}}, \quad \text{(Equation 15)}$$

with the numbering starting from the source node. The routing function at the source node may obtain the values of $0_1(k)$, $r_1(k)$ and $e_{f_1}(k)$ from the scheduler at time $t=k$. Then the metric evaluated at time $t=k-1$ may be updated as:

$$c_{a_i}(k) = c_{a_i}(k-1) - \left(O_i(k-1) + \frac{B_t}{r_i(-1)}\right)\frac{1}{1-e_{f_i}(k-1)} + \quad \text{(Equation 16)}$$
$$\left(O_i(k) + \frac{B_t}{r_i(k)}\right)\frac{1}{1-e_{f_i}(k)}.$$

The updated metric may be used for path selection by comparing against the corresponding metric for an alternate path, $c_{a_j}(k)$. This may allow the scheduler to affect routing decisions. The full semi-static path metrics may be used when available. For the subsequent time instants (scheduling intervals), the path metrics may be updated locally, and new optimum paths may be selected, until the arrival of the next full path metric. This procedure may allow network nodes to rapidly react to network changes without requiring frequent full path metric updates.

Figure 28A:
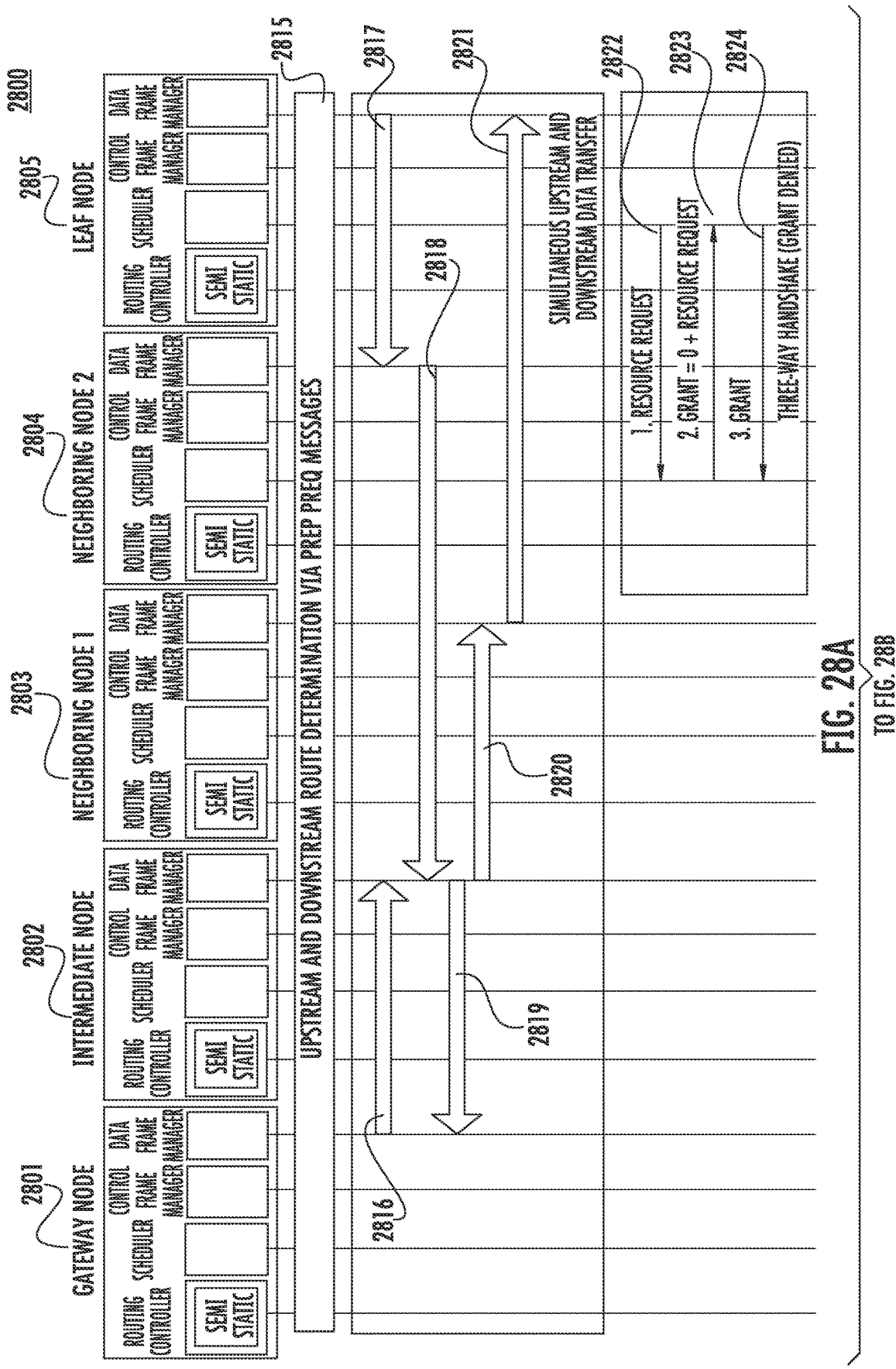
FIG. 28A is a diagram of an example optimized routing procedure.
Figure 28B:
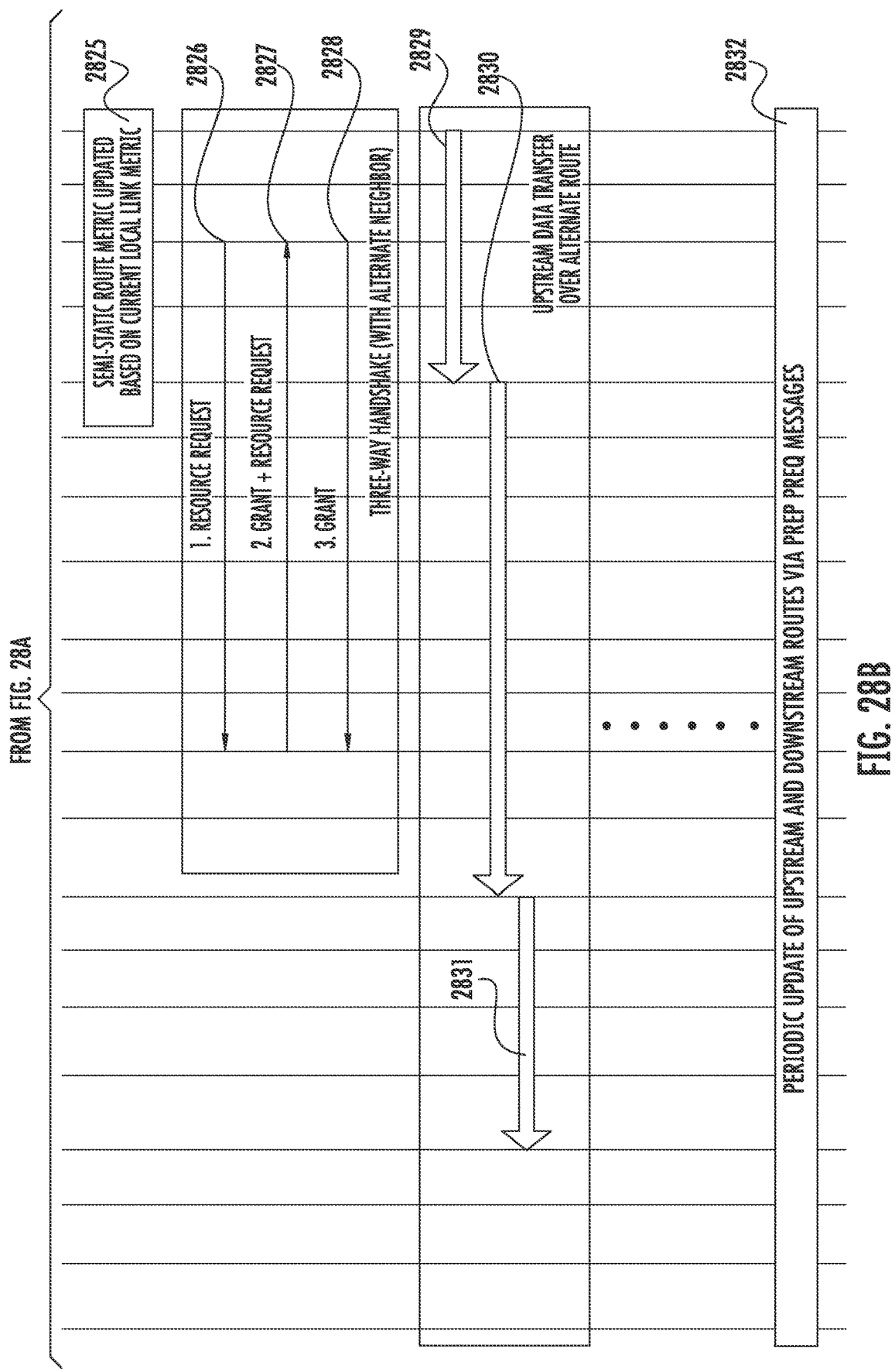
FIG. 28B is a diagram continuing the example optimized routing procedure.

FIG. 28A-28B is a diagram of an example optimized routing procedure 2800. Upstream and downstream routes may be determined via PREP and PREQ messages 2815. Leaf node 2805 may initially transfer data upstream 2817, which is identified as optimum by the routing algorithm based on semi-static routing metrics, through neighboring node 2 2804, which may be then be transferred 2818 through neighboring node 1 2803 to intermediate node 2802 and then transferred 2819 to gateway node 2801. Gateway node 2801 may then transfer data downstream 2816 to intermediate node 2802, which may transfer the data 2820 to neighboring node 1 2803 and then transfer the data 2821 to leaf node 2805.

Thereafter, the neighboring node 2 2804 may reject the grant request of leaf node 2805 in a scheduling interval that changes the link metric according to the above equation following a resource request 2822, grant and resource request 2823, and grant response 2824 exchange with neighboring node 2 2804.

The semi-static route metric may then be updated based on a current local metric 2825. Then the route may pass through the neighboring node 1 2803 in a smaller cumulative path metric than the original route, and the leaf node 2805 may re-route the traffic through the neighboring node 1 2803 following a resource request 2826, grant and resource request 2827, and grant response 2828 exchange with neighboring node 1 2803. The smaller cumulative path hops from leaf node 2805 to neighboring node 2 2804 over link 2829, from neighboring node 2 2804 to intermediate node 2802 over link 2830, and then from intermediate node 2802 to gateway node 2801 over link 2831. The end-to-end routes may be re-evaluated as part of the next periodic link status update 2832.

The control slot assignment may be considered to be fixed in the examples described herein. However, it may be possible to change the node pairs associated with the control slots. Here, all mesh nodes may need to transition to new control slot assignments simultaneously to ensure mutual orthogonality of slots. The slot rotation procedure may either be periodic with adjustable periodicity or may be triggered by the central OAM center by transmitting a slot rotation request message. Control slot assignment changes may occur as frequently as every scheduling interval.

Periodic control slot rotation may be system-wide, and the periodicity may be a configuration parameter. Further, control slot assignment changes may be triggered by the central OAM center by broadcasting a control slot announce message throughout the mesh network. The mode field within the announcement may signal whether the slot change is one-time or periodic. If the change is periodic, the periodicity field may include the number of scheduling intervals between each assignment change. The start time field may indicate the number of scheduling intervals until a slot change or a start of a rotation. The start time must be larger than 2*(Max network depth) to ensure that the announcement reaches all nodes before the targeted start time. The slot change may either be triggered independently by the OAM center or generated in response to a previously received slot rotation request from a mesh node.

Figure 29:
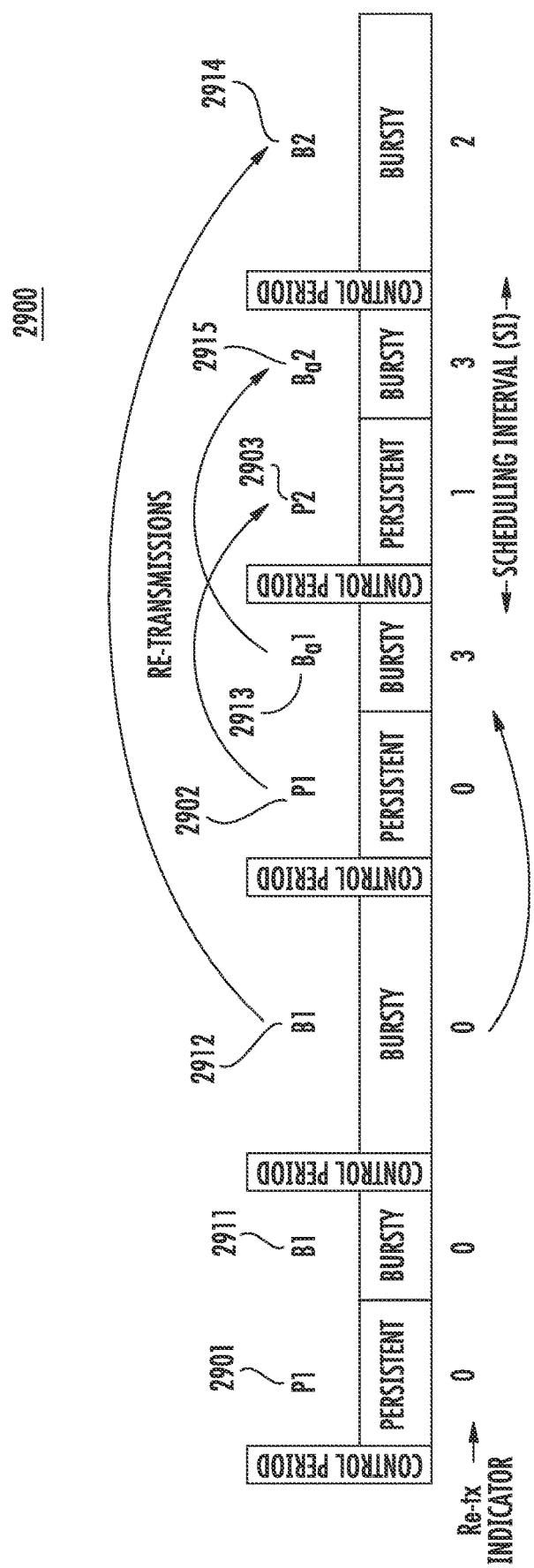
FIG. 29 is a diagram of example Hybrid Automatic Repeat request (HARQ) re-transmissions.

FIG. 29 is a diagram of example Hybrid Automatic Repeat request (HARQ) re-transmissions 2900. HARQ is a combination of high-rate forward error correcting coding and ARQ error control. HARQ with soft combining using chase combining may be employed here. Every transmission may include the same information (data and parity bits). The receiver may use maximum-ratio combining (MRC) to combine the received bits with the same bits from previous transmissions. Multiple concurrent HARQ processes may be necessary to support persistent and bursty traffic transmissions because they may employ different MCS levels within the same scheduling interval due to different PER targets resulting from re-transmission limitations. At a minimum, two processes may be required: one for persistent traffic and another for bursty traffic. However, more processes for bursty traffic may offer more scheduling flexibility and may lead to greater efficiencies. HARQ re-transmissions may be signaled via a couple of bits in the PHY header. In the example of FIG. 29, semi-persistent traffic 2901 is transmitted followed by burst traffic 2911. As shown in this example, bursty traffic 2912 may be retransmitted in the next available slot 2914. Similarly semi-persistent traffic 2902 is retransmitted in the next available slot 2903 and bursty traffic 2913 is retransmitted in the next available slot 2915.

As aforementioned, a semi-persistent traffic request may be sent to set up end-to-end route for semi-persistent traffic and route termination. The body of the semi-persistent traffic request message may include the elements listed in Table 3 below.

TABLE 3

Semi-Persistent Traffic Request Message Contents

| Order | Element | Size [bits] | Notes |
|---|---|---|---|
| 1 | Subtype | 8 | 0001000 |
| 2 | Source ID | 12 | Source node identifier |
| 3 | Destination ID | 12 | Destination node identifier |
| 4 | Flow ID | 4 | Flow identifier |
| 5 | Mode | 1 | 0: Setup; 1: Termination. Following elements are reserved when Mode = 1. |
| 6 | Mean packet size | 12 | Mean packet size in bytes |
| 7 | Periodicity | 12 | Periodicity of packet occurrence in units of scheduling interval |
| 8 | Start time | 12 | Start time of traffic in units of scheduling intervals, relative to current scheduling interval. |
| 9 | Bidirectional | 1 | Is reverse direction path setup required? |
| 10 | Modify code (optional) | 1 | 0: Requested start time acceptable, new start time preferred; 1: Requested start time modified, new start time added. |
| 11 | New start time (optional) | 12 | New proposed start time in units of scheduling interval, relative to current scheduling interval. |
| 12 | Vote (optional) | 3 | Count of nodes favoring new start time. |

As aforementioned, a semi-persistent traffic response may be sent to set up an end-to-end route for semi-persistent traffic and route termination. The body of the semi-persistent traffic response message may include the elements listed in Table 4 below.

TABLE 4

Semi-Persistent Traffic Response Message Contents

| Order | Element | Size [bits] | Notes |
|---|---|---|---|
| 1 | Subtype | 8 | 00010001 |
| 2 | Source ID | 12 | Source node identifier |
| 3 | Destination ID | 12 | Destination node identifier |
| 4 | Flow ID | 4 | Flow identifier |
| 5 | Mode | 1 | 0: Setup; 1: Termination. Following elements are reserved when Mode = 1. |
| 6 | Response code | 1 | 0: Success; 1: Failure. |
| 7 | Start time 1 | 12 | Start time of traffic in units of scheduling intervals, relative to current scheduling interval. |
| 8 | Start time 2 (optional) | 12 | Start time of traffic in units of scheduling intervals, relative to current scheduling interval. |
| 9 | Vote (optional) | 3 | Count of nodes favoring start time 1. |

A slot rotation request message may be sent by a mesh node to a gateway node and onward to the OAM center to request a control slot assignment change. This may be a one-time shift of slots or a periodic shift where the periodicity may be configurable. The control slot index may be incremented at each shift with wrap-around. The body of the slot rotation request message may include the elements listed in Table 5 below.

TABLE 5

Slot Rotation Request Message

| Order | Element | Size [bits] | Notes |
|---|---|---|---|
| 1 | Subtype | 8 | 00010010 |
| 2 | Source ID | 12 | Source node identifier |
| 3 | Mode | 1 | 0: one-time shift; 1: periodic shift |

TABLE 5-continued

Slot Rotation Request Message

| Order | Element | Size [bits] | Notes |
|---|---|---|---|
| 4 | Periodicity | 12 | Periodicity of control slot shift in units of scheduling intervals. Value of zero in this field indicates that the transmitting node is requesting that slot rotation be stopped. |
| 5 | Step size | 4 | Slot index increment value at each shift. |

The slot rotation decision may be conveyed by a slot rotation announce message, which may be generated by the OAM center and sent to all mesh nodes via the gateway nodes. This may either be generated independently by the OAM center or sent in response to a slot rotation request message received previously from a mesh node. The body of the slot rotation response message may include the elements listed in Table 6 below.

TABLE 6

Slot Rotation Response Message Contents

| Order | Element | Size [bits] | Notes |
|---|---|---|---|
| 1 | Subtype | 8 | 00010011 |
| 2 | Mode | 1 | 0: one-time shift; 1: periodic shift |
| 3 | Periodicity | 12 | Periodicity of control slot shift in units of scheduling intervals. Value of zero in this field indicates that the slot rotation stops at the indicated time. |
| 4 | Step size | 4 | Slot index increment value at each shift. |
| 5 | Start time | 12 | Slot shift start time in units of scheduling intervals, relative to current scheduling interval. This value is appropriately decremented at each hop before forwarding. |

Scheduling period messages may follow a different MCS than other control and data packets and may not include the mesh header. Example message 1, message 2 and message 3, which may be used in a control slot as described above, are provided, respectively, in Table 7, 8 and 9 below.

TABLE 7

Message 1

| Order | Field | Size [Bits] | Description |
|---|---|---|---|
| 1 | BSR | 13 | This is a resource request from A to B. It is signaled as a combination of requested data slots. |
| 2 | MCS/CQI | 4 | Estimate of the channel quality from Node B to Node A, and is signaled in terms of a requested MCS level. |
| 3 | Tx Bitmap | 32 | Indication of available data slots for Node A to transmit to Node B. Each bit refers to a data slot. |
| 4 | ACK | 2/9 | Node A acknowledges successful reception of data packets from B in the previous scheduling interval. Option 1 (default): [2 bits] 1-bit acknowledge for entire MAC protocol data unit (MPDU). 1-bit acknowledge for semi-persistent traffic PHY protocol data unit (PPDU) Option 2: [9 bits] 8-bit acknowledgement. 1-bit per MPDU, given maximum of 8 MPDUs per PPDU. 1-bit acknowledge for semi-persistent traffic PHY protocol data unit (PPDU) |
| 5 | FCS | 12 | Frame check CRC sequence |
| | Total | 63/70 | |

TABLE 8

Message 2

| Order | Field | Size [Bits] | Description |
|---|---|---|---|
| 1 | BSR | 13 | This is a resource request from B to A. It is signaled as a combination of requested data slots and MCS/CQI. |
| 2 | Tx Bitmap | 32 | Indication of available data slots for Node B to transmit to Node A. Each bit refers to a data slot. |
| 3 | ACK | 2/9 | Node B acknowledges successful reception of data packets from A in the previous scheduling interval. Option 1: [2 bits] 1-bit acknowledge for entire MAC protocol data unit (MPDU). 1-bit acknowledge for semi-persistent traffic PHY protocol data unit (PPDU) Option 2: [9 bits] 8-bit acknowledgement. 1-bit per PPDU, given maximum of 8 MPDUs per PPDU. 1-bit acknowledge for semi-persistent traffic PHY protocol data unit (PPDU) |
| 4 | Grant | 32 | Node B grants data transmission slots to Node A based on its request and constraints due to previous allocations to other nodes. This is a bitmap of data slots granted for transmission. |
| 5 | MCS/CQI | 4 | Estimate of the channel quality from Node B to Node A, and is signaled in terms of a requested MCS level. |
| 6 | FCS | 12 | Frame Check CRC sequence |
| | Total | 100/107 | |

TABLE 9

Message 3

| Order | Field | Size [Bits] | Description |
|---|---|---|---|
| 1 | Grant | 32 | Node A grants data transmission slots to Node B based on its request and constraints due to previous allocations to other nodes. This is a bitmap of data slots granted for transmission. |
| 2 | FCS | 12 | Frame check CRC sequence |
| | Total | 44 | |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a station (STA) in a directional millimeter wave mesh network, the method comprising:
   receiving, from a first neighbor STA, a first request message that includes a first transmit and receive bitmap of the first neighbor STA for directional transmission and reception with the STA, wherein the first transmit and receive bitmap indicates at least one available time slot for the directional transmission and reception of the first neighbor STA;
   receiving, from a second neighbor STA, a second request message that includes a second transmit and receive bitmap of the second neighbor STA for directional transmission and reception with the STA, wherein the second transmit and receive bitmap indicates at least one available time slot for the directional transmission and reception of the second neighbor STA;
   transmitting, to the first neighbor STA, a first response frame that includes a first bitmap indicating at least one mutually available time slot between the STA and the first neighbor STA and a first element indicating a first start time of traffic in units of scheduling intervals comprising the at least one mutually available time slot between the STA and the first neighbor STA, wherein the first bitmap is a type of transmission bitmap;
   transmitting, to the second neighbor STA, a second response frame that includes a second bitmap indicating at least one mutually available time slot between the STA and the second neighbor STA and a second element indicating a second start time of traffic in units of scheduling intervals comprising the at least one mutually available time slot between the STA and the second neighbor STA, wherein the second bitmap is a type of transmission bitmap; and
   based on the first and second bitmaps, transmitting, via one or more directional antenna, first data to the first neighbor STA at the first start time and second data to the second neighbor STA at the second start time.

2. The method of claim 1, further comprising:
   generating, based on the first and second transmit and receive bitmaps, the first and second bitmaps of the STA for directional transmission and reception with the first and second neighbor STAs.

3. The method of claim 1, further comprising:
   based on the first and second bitmaps, receiving, via the one or more directional antenna, the first data from the first neighbor STA at the first start time and the second data from the second neighbor STA at the second start time, wherein the first and second bitmaps are types of reception bitmap.

4. The method of claim 1, further comprising:
   based on the first and second bitmaps, transmitting, via the one or more directional antenna, the first data to the first neighbor STA at the first start time while receiving, via the one or more directional antenna, the second data from the second neighbor STA at the second start time, wherein the first bitmap is a type of transmission bitmap and the second bitmap is a type of reception bitmap.

5. The method of claim 1, further comprising:
   based on the first and second bitmaps, receiving, via the one or more directional antenna, the first data from the first neighbor STA at the first start time while transmitting, via the one or more directional antenna, the second data to the second neighbor STA at the second start time, wherein the first bitmap is a type of reception bitmap and the second bitmap is a type of transmission bitmap.

6. The method of claim 1, wherein the STA is a millimeter wave base station (mB).

7. The method of claim 1, wherein transmission of the first data to the first neighbor STA at the first start time and transmission of the second data to the second neighbor STA at the second start time are performed simultaneously.

8. A station (STA) in a directional millimeter wave mesh network, the STA comprising:
   a receiver configured to:
   receive, from a first neighbor STA, a first request message that includes a first transmit and receive bitmap of the first neighbor STA for directional transmission and reception with the STA, wherein the first transmit and receive bitmap indicates at least one available time slot for the directional transmission and reception of the first neighbor STA; and
   receive, from a second neighbor STA, a second request message that includes a second transmit and receive bitmap of the second neighbor STA for directional transmission and reception with the STA, wherein the second transmit and receive bitmap indicates at least one available time slot for the directional transmission and reception of the second neighbor STA; and
   a transmitter configured to:
   transmit, to the first neighbor STA, a first response frame that includes a first bitmap indicating at least one mutually available time slot between the STA and the first neighbor STA and a first element indicating a first start time of traffic in units of scheduling intervals comprising the at least one mutually available time slot between the STA and the first neighbor STA, wherein the first bitmap is a type of transmission bitmap;
   transmit, to the second neighbor STA, a second response frame that includes a second bitmap indicating at least one mutually available time slot between the STA and the second neighbor STA and a second element indicating a second start time of traffic in units of scheduling intervals comprising the at least one mutually available time slot between the STA and the second neighbor STA, wherein the second bitmap is a type of transmission bitmap,
   wherein the transmitter is further configured to, based on the first and second bitmaps, transmit, via one or more directional antenna, first data to the first neighbor STA at the first start time and second data to the second neighbor STA at the second start time.

9. The STA of claim 8, further comprising:
   a processor configured to generate, based on the first and second transmit and receive bitmaps, the first and second bitmaps of the STA for directional transmission and reception with the first and second neighbor STAs.

10. The STA of claim 8, wherein the receiver is further configured to, based on the first and second bitmaps, receive, via the one or more directional antenna, the first data from the first neighbor STA at the first start time and the second data from the second neighbor STA at the second start time, wherein the first and second bitmaps are types of reception bitmaps.

11. The STA of claim 8, wherein the transmitter and the receiver are further configured to, based on the first and second bitmaps, transmit and receive, via the one or more directional antenna, the first data to the first neighbor STA at the first start time and the second data from the second neighbor STA at the second start time, respectively, wherein the first bitmap is a type of transmission bitmap and the second bitmap is a type of reception bitmap.

12. The STA of claim 8, wherein the transmitter and the receiver are further configured to, based on the first and second bitmaps, receive and transmit, via the one or more directional antenna, the first data from the first neighbor STA at the first start time and the second data to the second neighbor STA at the second start time, respectively, wherein the first bitmap is a type of reception bitmap and the second bitmap is a type of transmission bitmap.

13. The STA of claim 8, wherein the STA is a millimeter wave base station (mB).

14. The STA of claim 8, wherein transmission of the first data to the first neighbor STA at the first start time and transmission of the second data to the second neighbor STA at the second start time are performed simultaneously.

* * * * *